US012646119B2

(12) United States Patent
Bleazard et al.

(10) Patent No.: US 12,646,119 B2
(45) Date of Patent: Jun. 2, 2026

(54) BUILDING AN ONLINE APPLICATION PLATFORM FOR A CLIENT FINANCIAL INSTITUTION

(71) Applicant: eCU Technology, LLC, Houston, TX (US)

(72) Inventors: John David Bleazard, Katy, TX (US); Gary Wayne Petty, Conroe, TX (US); Ethan Caleb Ferrell, Houston, TX (US)

(73) Assignee: eCU Technology, LLC, Houston, TX (US)

(*) Notice: Subject to any disclaimer, the term of this patent is extended or adjusted under 35 U.S.C. 154(b) by 397 days.

(21) Appl. No.: 18/152,543

(22) Filed: Jan. 10, 2023

(65) Prior Publication Data

US 2023/0244480 A1      Aug. 3, 2023

Related U.S. Application Data

(60) Provisional application No. 63/305,578, filed on Feb. 1, 2022.

(51) Int. Cl.
| | |
|---|---|
| *G06Q 40/06* | (2012.01) |
| *G06F 8/20* | (2018.01) |
| *G06F 8/76* | (2018.01) |
| *G06F 8/77* | (2018.01) |
| *G06Q 40/02* | (2023.01) |

(52) U.S. Cl.
CPC ............... *G06Q 40/06* (2013.01); *G06F 8/20* (2013.01); *G06F 8/76* (2013.01); *G06F 8/77* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 3,775,214 | A | 11/1973 | Winters et al. |
| 6,433,802 | B1 | 8/2002 | Ladd |
| 6,928,625 | B2 | 8/2005 | Makinen |
| 7,577,598 | B2 | 8/2009 | Rousseau et al. |
| 9,026,991 | B2 * | 5/2015 | Ross .......................... G06F 8/30 717/109 |
| 10,032,218 | B1 * | 7/2018 | Denbo ................... G06Q 40/02 |
| 10,108,997 | B2 | 10/2018 | Joy |
| 10,621,669 | B2 | 4/2020 | Albert et al. |
| 11,562,326 | B2 * | 1/2023 | Bleazard ............... G06N 20/00 |
| 2008/0097810 | A1 | 4/2008 | Sadowski et al. |

(Continued)

*Primary Examiner* — Allan J Woodworth, II
(74) *Attorney, Agent, or Firm* — HAYNES AND BOONE, LLP

(57)      ABSTRACT

A method and system according to which an online application platform for a client financial institution may be built. The online application platform may include a default configuration, which includes a default theme and a default application framework. A management interface is accessible by the client financial institution. The management interface includes a framework tool for converting the default application framework into a customized application framework. The management interface includes a theme tool for converting the default theme into a customized theme. A customized configuration of the online application platform is provided to applicants of the client financial institution.

17 Claims, 35 Drawing Sheets

(56) References Cited

U.S. PATENT DOCUMENTS

2010/0100469 A1 *  4/2010  Buchanan ............. G06Q 10/06
                                              705/35
2019/0297155 A1   9/2019  Baumgarten et al.

* cited by examiner

3100

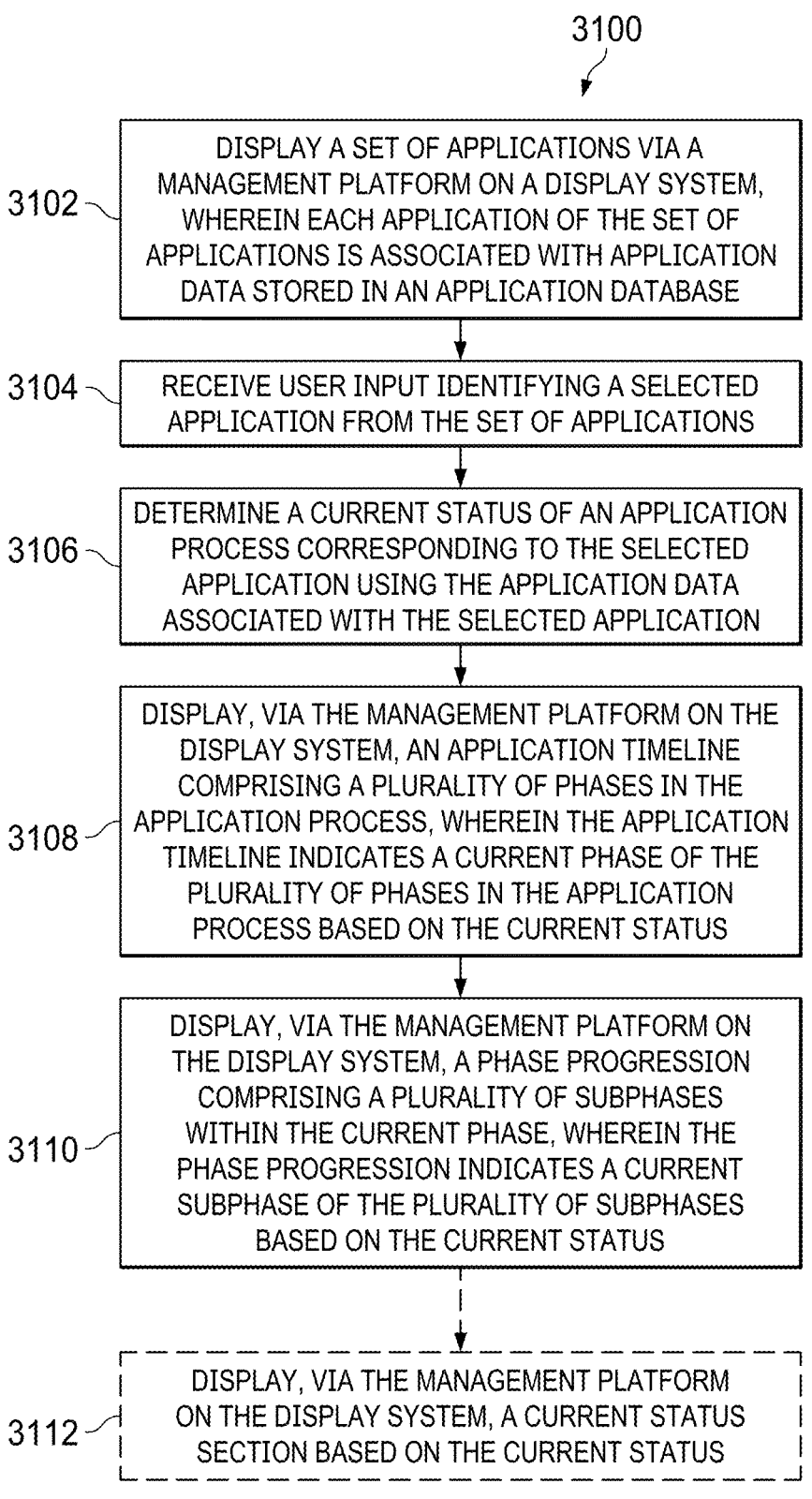

3102 — DISPLAY A SET OF APPLICATIONS VIA A MANAGEMENT PLATFORM ON A DISPLAY SYSTEM, WHEREIN EACH APPLICATION OF THE SET OF APPLICATIONS IS ASSOCIATED WITH APPLICATION DATA STORED IN AN APPLICATION DATABASE

3104 — RECEIVE USER INPUT IDENTIFYING A SELECTED APPLICATION FROM THE SET OF APPLICATIONS

3106 — DETERMINE A CURRENT STATUS OF AN APPLICATION PROCESS CORRESPONDING TO THE SELECTED APPLICATION USING THE APPLICATION DATA ASSOCIATED WITH THE SELECTED APPLICATION

3108 — DISPLAY, VIA THE MANAGEMENT PLATFORM ON THE DISPLAY SYSTEM, AN APPLICATION TIMELINE COMPRISING A PLURALITY OF PHASES IN THE APPLICATION PROCESS, WHEREIN THE APPLICATION TIMELINE INDICATES A CURRENT PHASE OF THE PLURALITY OF PHASES IN THE APPLICATION PROCESS BASED ON THE CURRENT STATUS

3110 — DISPLAY, VIA THE MANAGEMENT PLATFORM ON THE DISPLAY SYSTEM, A PHASE PROGRESSION COMPRISING A PLURALITY OF SUBPHASES WITHIN THE CURRENT PHASE, WHEREIN THE PHASE PROGRESSION INDICATES A CURRENT SUBPHASE OF THE PLURALITY OF SUBPHASES BASED ON THE CURRENT STATUS

3112 — DISPLAY, VIA THE MANAGEMENT PLATFORM ON THE DISPLAY SYSTEM, A CURRENT STATUS SECTION BASED ON THE CURRENT STATUS

FIG. 31

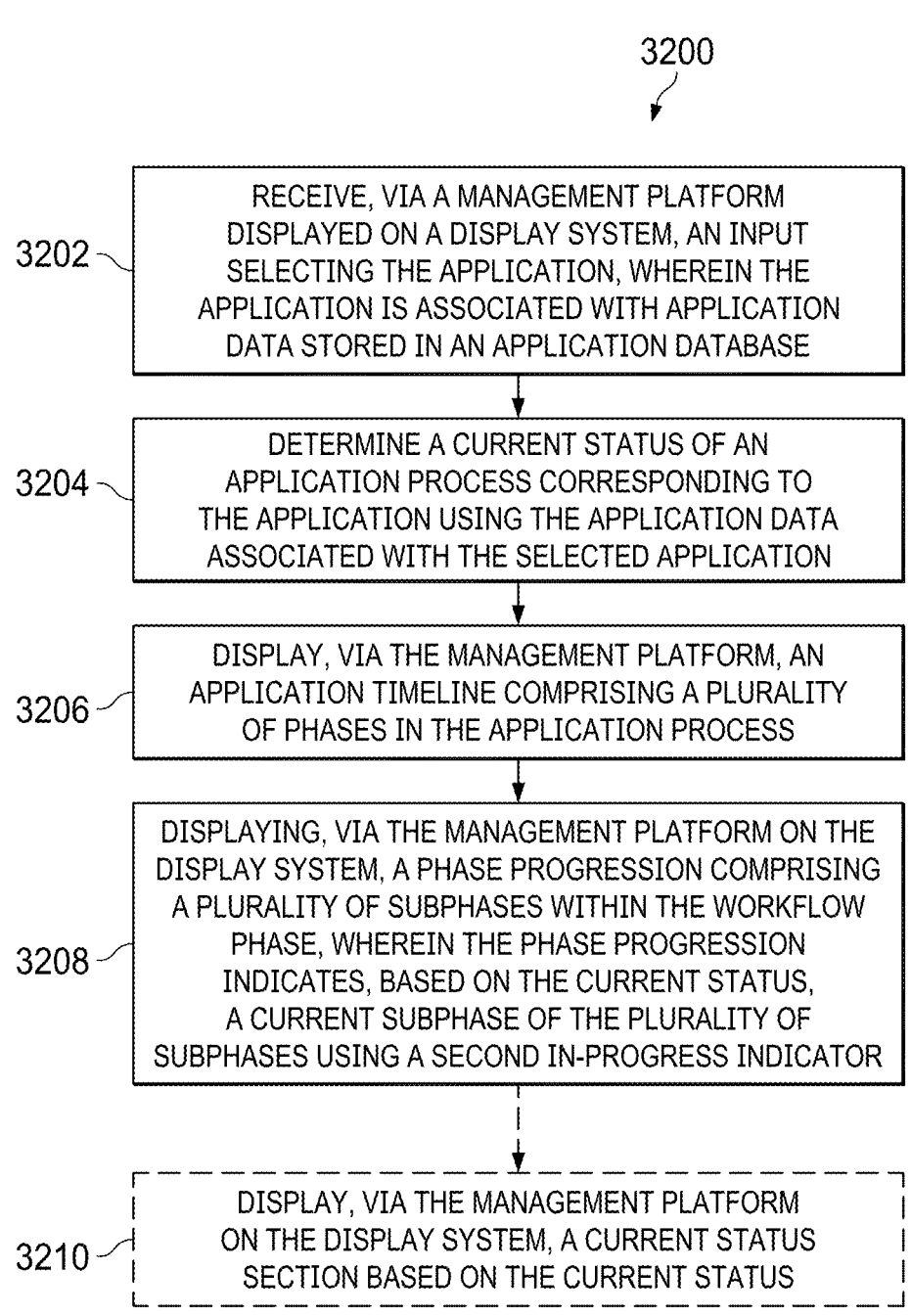

3200

3202 — RECEIVE, VIA A MANAGEMENT PLATFORM DISPLAYED ON A DISPLAY SYSTEM, AN INPUT SELECTING THE APPLICATION, WHEREIN THE APPLICATION IS ASSOCIATED WITH APPLICATION DATA STORED IN AN APPLICATION DATABASE

3204 — DETERMINE A CURRENT STATUS OF AN APPLICATION PROCESS CORRESPONDING TO THE APPLICATION USING THE APPLICATION DATA ASSOCIATED WITH THE SELECTED APPLICATION

3206 — DISPLAY, VIA THE MANAGEMENT PLATFORM, AN APPLICATION TIMELINE COMPRISING A PLURALITY OF PHASES IN THE APPLICATION PROCESS

3208 — DISPLAYING, VIA THE MANAGEMENT PLATFORM ON THE DISPLAY SYSTEM, A PHASE PROGRESSION COMPRISING A PLURALITY OF SUBPHASES WITHIN THE WORKFLOW PHASE, WHEREIN THE PHASE PROGRESSION INDICATES, BASED ON THE CURRENT STATUS, A CURRENT SUBPHASE OF THE PLURALITY OF SUBPHASES USING A SECOND IN-PROGRESS INDICATOR

3210 — DISPLAY, VIA THE MANAGEMENT PLATFORM ON THE DISPLAY SYSTEM, A CURRENT STATUS SECTION BASED ON THE CURRENT STATUS

FIG. 32

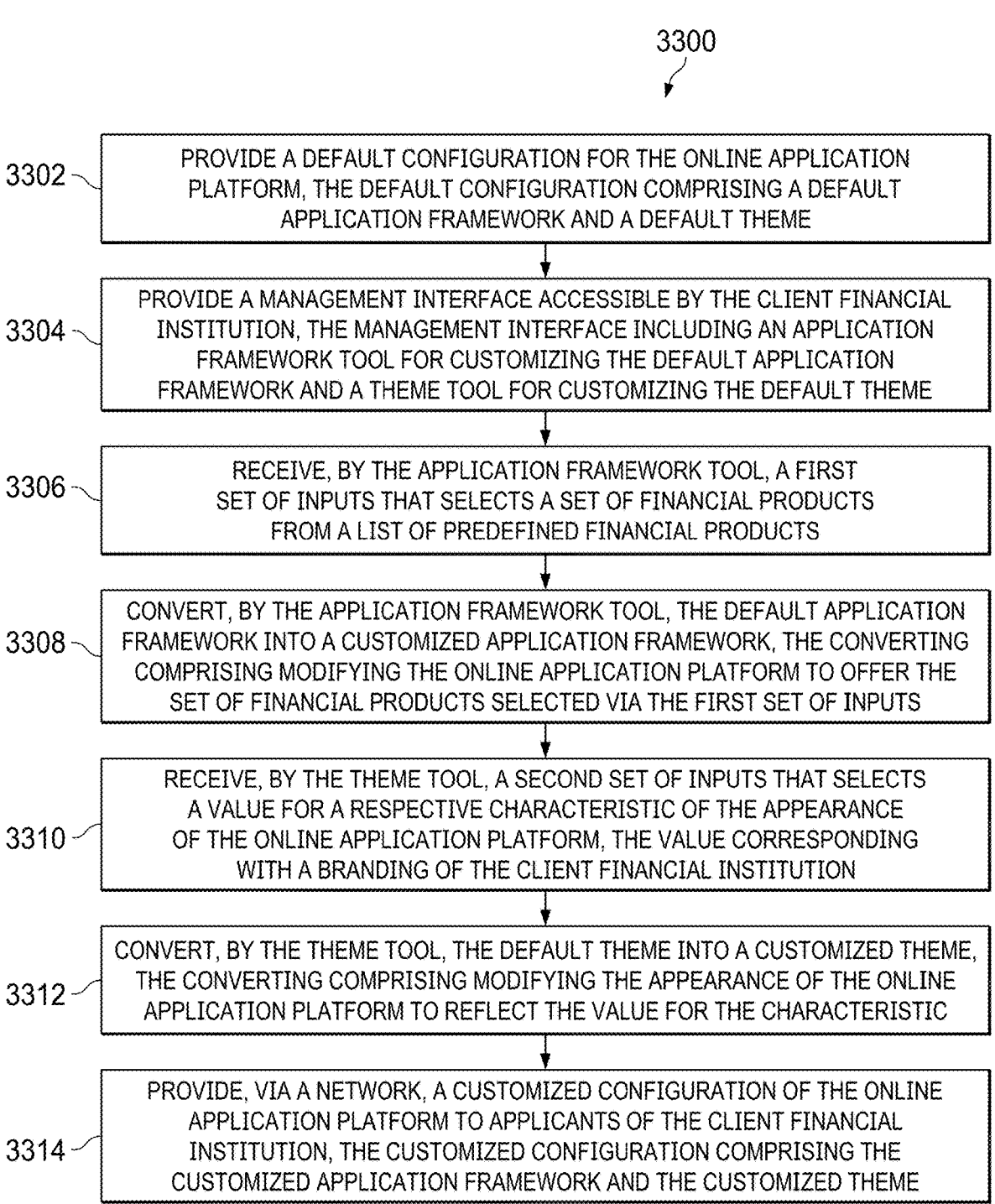

3300

3302 — PROVIDE A DEFAULT CONFIGURATION FOR THE ONLINE APPLICATION PLATFORM, THE DEFAULT CONFIGURATION COMPRISING A DEFAULT APPLICATION FRAMEWORK AND A DEFAULT THEME

3304 — PROVIDE A MANAGEMENT INTERFACE ACCESSIBLE BY THE CLIENT FINANCIAL INSTITUTION, THE MANAGEMENT INTERFACE INCLUDING AN APPLICATION FRAMEWORK TOOL FOR CUSTOMIZING THE DEFAULT APPLICATION FRAMEWORK AND A THEME TOOL FOR CUSTOMIZING THE DEFAULT THEME

3306 — RECEIVE, BY THE APPLICATION FRAMEWORK TOOL, A FIRST SET OF INPUTS THAT SELECTS A SET OF FINANCIAL PRODUCTS FROM A LIST OF PREDEFINED FINANCIAL PRODUCTS

3308 — CONVERT, BY THE APPLICATION FRAMEWORK TOOL, THE DEFAULT APPLICATION FRAMEWORK INTO A CUSTOMIZED APPLICATION FRAMEWORK, THE CONVERTING COMPRISING MODIFYING THE ONLINE APPLICATION PLATFORM TO OFFER THE SET OF FINANCIAL PRODUCTS SELECTED VIA THE FIRST SET OF INPUTS

3310 — RECEIVE, BY THE THEME TOOL, A SECOND SET OF INPUTS THAT SELECTS A VALUE FOR A RESPECTIVE CHARACTERISTIC OF THE APPEARANCE OF THE ONLINE APPLICATION PLATFORM, THE VALUE CORRESPONDING WITH A BRANDING OF THE CLIENT FINANCIAL INSTITUTION

3312 — CONVERT, BY THE THEME TOOL, THE DEFAULT THEME INTO A CUSTOMIZED THEME, THE CONVERTING COMPRISING MODIFYING THE APPEARANCE OF THE ONLINE APPLICATION PLATFORM TO REFLECT THE VALUE FOR THE CHARACTERISTIC

3314 — PROVIDE, VIA A NETWORK, A CUSTOMIZED CONFIGURATION OF THE ONLINE APPLICATION PLATFORM TO APPLICANTS OF THE CLIENT FINANCIAL INSTITUTION, THE CUSTOMIZED CONFIGURATION COMPRISING THE CUSTOMIZED APPLICATION FRAMEWORK AND THE CUSTOMIZED THEME

FIG. 33

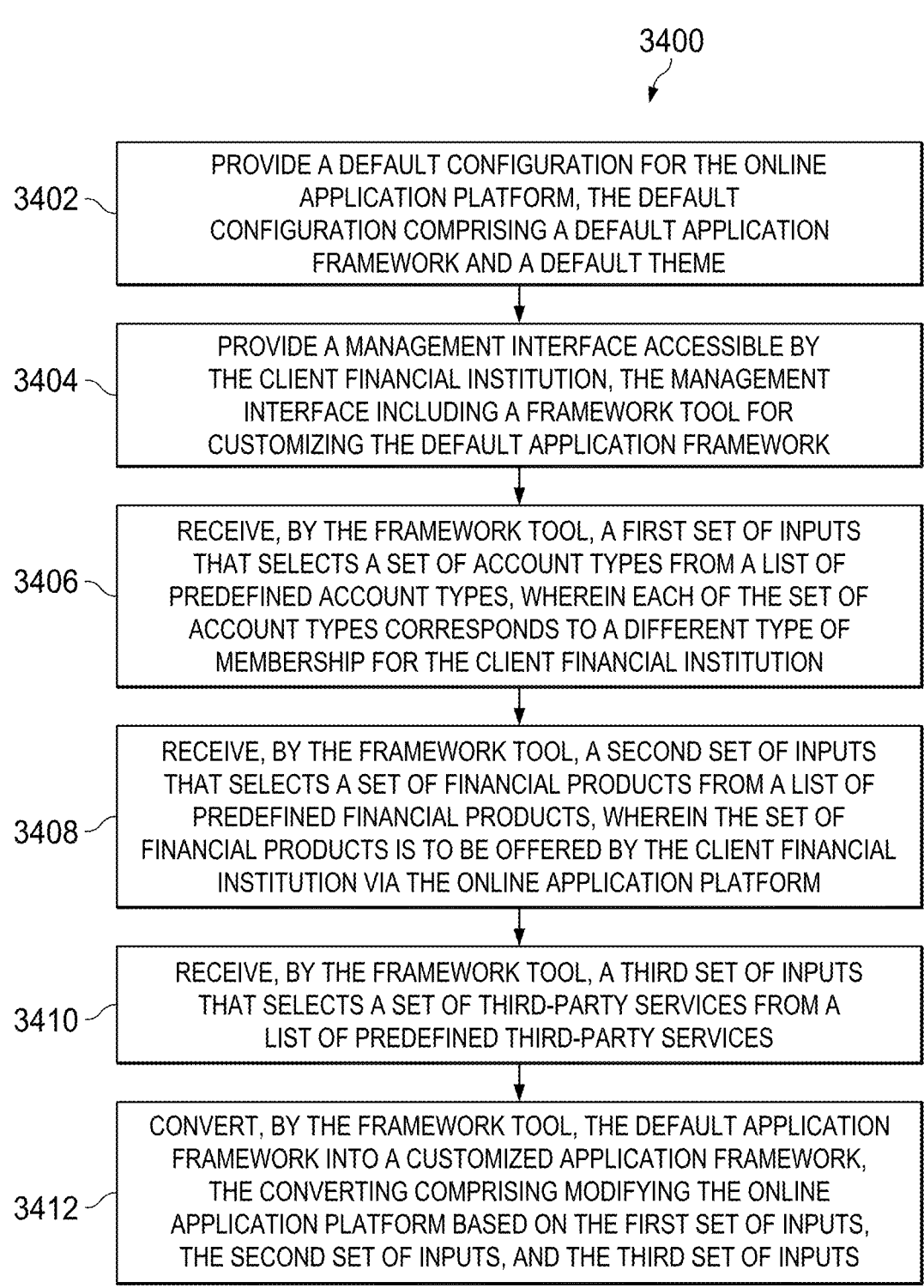

3400

3402 — PROVIDE A DEFAULT CONFIGURATION FOR THE ONLINE APPLICATION PLATFORM, THE DEFAULT CONFIGURATION COMPRISING A DEFAULT APPLICATION FRAMEWORK AND A DEFAULT THEME

3404 — PROVIDE A MANAGEMENT INTERFACE ACCESSIBLE BY THE CLIENT FINANCIAL INSTITUTION, THE MANAGEMENT INTERFACE INCLUDING A FRAMEWORK TOOL FOR CUSTOMIZING THE DEFAULT APPLICATION FRAMEWORK

3406 — RECEIVE, BY THE FRAMEWORK TOOL, A FIRST SET OF INPUTS THAT SELECTS A SET OF ACCOUNT TYPES FROM A LIST OF PREDEFINED ACCOUNT TYPES, WHEREIN EACH OF THE SET OF ACCOUNT TYPES CORRESPONDS TO A DIFFERENT TYPE OF MEMBERSHIP FOR THE CLIENT FINANCIAL INSTITUTION

3408 — RECEIVE, BY THE FRAMEWORK TOOL, A SECOND SET OF INPUTS THAT SELECTS A SET OF FINANCIAL PRODUCTS FROM A LIST OF PREDEFINED FINANCIAL PRODUCTS, WHEREIN THE SET OF FINANCIAL PRODUCTS IS TO BE OFFERED BY THE CLIENT FINANCIAL INSTITUTION VIA THE ONLINE APPLICATION PLATFORM

3410 — RECEIVE, BY THE FRAMEWORK TOOL, A THIRD SET OF INPUTS THAT SELECTS A SET OF THIRD-PARTY SERVICES FROM A LIST OF PREDEFINED THIRD-PARTY SERVICES

3412 — CONVERT, BY THE FRAMEWORK TOOL, THE DEFAULT APPLICATION FRAMEWORK INTO A CUSTOMIZED APPLICATION FRAMEWORK, THE CONVERTING COMPRISING MODIFYING THE ONLINE APPLICATION PLATFORM BASED ON THE FIRST SET OF INPUTS, THE SECOND SET OF INPUTS, AND THE THIRD SET OF INPUTS

FIG. 34

BUILDING AN ONLINE APPLICATION PLATFORM FOR A CLIENT FINANCIAL INSTITUTION

CROSS-REFERENCE TO RELATED APPLICATIONS

This application claims the benefit of the filing date of, and priority to U.S. Patent Application No. 63/305,578, filed on Feb. 1, 2022, the entire disclosure of which is hereby incorporated herein by reference.

This application is related to U.S. application Ser. No. 18/151,519, filed Jan. 9, 2023, entitled "Managing the Display of Applications for Financial Institutions," the entire disclosure of which is incorporated herein by reference.

FIELD

The present disclosure relates generally to managing applications for financial institutions. More particularly, the present disclosure relates to methods and systems for managing applications for membership to financial institutions and/or applications for financial products provided by financial institutions and to methods and systems for customizing an online application platform through which such applications are processed (e.g., initiated and completed).

BACKGROUND

Different types of financial institutions offer different types of financial products such as, for example, checking accounts, savings accounts, loans, trust accounts, etc. Examples of financial institutions include traditional banks and credit unions. A "credit union" is a member-owned financial cooperative that is non-profit and provides its members with financial rates (e.g., loans, certificates of deposit, etc.), financial products (e.g., checking shares and loans), and other services that are competitive and exclusive to its members. While a bank may offer many of the same financial products as a credit union, a bank differs from a credit union in that a bank is typically a for-profit institution that is not member-owned.

Currently, financial institutions may employ electronic, software-based platforms to accept and manage applications for membership to and/or applications for the financial products provided by these financial institutions. These known, software-based platforms offer limited functionality and are difficult to design, build, and maintain-especially for smaller, community-based banking institutions such as credit unions. For example, at any given point in time, a financial institution may need to monitor or track tens to hundreds or thousands of applications simultaneously, with many of these applications being at different stages in the application process. Monitoring these applications over time may be difficult, time-consuming, and overly cumbersome using existing software platforms. Further, with both commercially-available software platforms and custom-built software platforms, a financial institution may find it inefficient or difficult to initially customize or make desired modifications to an already-deployed applicant-facing user interface.

Therefore, it may be desirable to have methods and/or systems that address one or more of the issues described above, as well as other possible issues.

SUMMARY

In one or more embodiments, a method is provided for monitoring a set of applications for a set of financial products provided by a financial institution. The set of applications is displayed via a management platform on a display system. Each application of the set of applications is associated with application data stored in an application database. User input identifying a selected application from the set of applications is received. A current status of an application process corresponding to the selected application is determined using the application data associated with the selected application. An application timeline comprising a plurality of phases in the application process is displayed via the management platform on the display system. The application timeline indicates a current phase of the plurality of phases in the application process based on the current status. A subphase progression comprising a plurality of subphases within the current phase is displayed via the management platform on the display system. The subphase progression indicates a current subphase of the plurality of subphases based on the current status.

In one or more embodiments, a system is provided for monitoring a set of applications for a set of financial products provided by a financial institution. The system comprises a memory containing a machine-readable medium containing instructions; and a processor coupled to the memory. The processor is configured to execute the instructions to cause the processor to: display the set of applications via a management platform on a display system, wherein each application of the set of applications is associated with application data stored in an application database; receive user input identifying a selected application from the set of applications; determine a current status of an application process corresponding to the selected application using the application data associated with the selected application; display, via the management platform, an application timeline comprising a plurality of phases in the application process, wherein the application timeline indicates a current phase of the plurality of phases in the application process based on the current status; and display, via the management platform, a subphase progression comprising a plurality of subphases within the current phase, wherein the subphase progression indicates a current subphase of the plurality of subphases based on the current status.

In one or more embodiments, a method is provided for monitoring an application of a user for a set of financial products provided by a credit union. An input selecting the application is received via a management platform displayed on a display system. The application is associated with application data stored in an application database. A current status of an application process corresponding to the application is determined using the application data associated with the selected application. An application timeline comprising a plurality of phases in the application process is displayed via the management platform. The plurality of phases includes a workflow phase and at least one of a qualify phase, a decision phase, or a processing phase. The application timeline indicates, based on the current status, that the workflow phase is a current phase in the application process using a first in-progress indicator. A subphase progression comprising a plurality of subphases within the workflow phase is displayed via the management platform on the display system. The subphase progression indicates, based on the current status, a current subphase of the plurality of subphases using a second in-progress indicator.

In one or more embodiments, a method is provided for building an online application platform for a client financial institution. A default configuration for the online application platform is provided. The default configuration comprises a default application framework and a default theme. The default application framework defines a default set of account types and a default set of financial products for an application. The default theme defines an appearance of the online application platform. A management interface acces- sible by the client financial institution is provided. The management interface includes a framework tool for cus- tomizing the default application framework and a theme tool for customizing the default theme. A first set of inputs that selects a set of financial products from a list of predefined financial products is received by the framework tool. The set of financial products is to be offered by the client financial institution via the online application platform. The default application framework is converted by the framework tool into a customized application framework, the converting comprising modifying the online application platform to offer the set of financial products selected via the first set of inputs. A second set of inputs is received by the theme tool, each input of the second set of inputs selecting a value for a respective characteristic of the appearance of the online application platform, the value corresponding with a brand- ing of the client financial institution. The default theme is converted by the theme tool into a customized theme, the converting comprising modifying the appearance of the online application platform to reflect the value for the respective characteristic. The customized configuration of the online application platform is provided, via a network, to one or more applicants of the client financial institution. The customized configuration comprises the customized appli- cation framework and the customized theme.

In one or more embodiments, a system is provided for building an online application platform for a client financial institution. The system comprises a memory containing a machine-readable medium containing instructions; and a processor coupled to the memory. The processor is config- ured to execute the instructions to cause the processor to provide a default configuration for an online application platform. The default configuration comprises a default application framework and a default theme. The default application framework defines a default set of account types and a default set of financial products for an application. The default theme defines an appearance of the online applica- tion platform. The processor is configured to execute the instructions to cause the processor to provide a management interface accessible by the client financial institution. The management interface includes a framework tool for cus- tomizing the default application framework and a theme tool for customizing the default theme. The processor is config- ured to execute the instructions to cause the processor to receive, by the framework tool, a first set of inputs that selects a set of financial products from a list of predefined financial products. The set of financial products is to be offered by the client financial institution via the online application platform. The processor is configured to execute the instructions to cause the processor to convert, by the framework tool, the default application framework into a customized application framework, the converting compris- ing modifying the online application platform to offer the set of financial products selected via the first set of inputs. The processor is configured to execute the instructions to cause the processor to receive, by the theme tool, a second set of inputs, each input of the second set of inputs selecting a value for a respective characteristic of the appearance of the online application platform, the value corresponding with a branding of the client financial institution. The processor is configured to execute the instructions to cause the processor to convert, by the theme tool, the default theme into a customized theme, the converting comprising modifying the appearance of the online application platform to reflect the value for the respective characteristic selected by each input of the second set of inputs. The processor is configured to execute the instructions to cause the processor to provide, via a network, a customized configuration of the online application platform to applicants of the client financial institution, the customized configuration comprising the customized application framework and the customized theme.

In one or more embodiments, a method is provided for customizing an application platform for a client financial institution. A default configuration for the online application platform is provided, the default configuration comprising a default application framework and a default theme. The default application framework defines a default set of account types and a default set of financial products for an application. A management interface accessible by the client financial institution is provided, the management interface including a framework tool for customizing the default application framework. A first set of inputs that selects a set of account types from a list of predefined account types is received by the framework tool. Each of the set of account types corresponds to a different type of membership for the client financial institution. A second set of inputs that selects a set of financial products from a list of predefined financial products is received by the framework tool. The set of financial products is to be offered by the client financial institution via the online application platform. A third set of inputs that selects a set of third-party services from a list of predefined third-party services is received by the framework tool. The default application framework is converted, by the framework tool, into a customized application framework, the converting comprising modifying the online application platform based on the first set of inputs, the second set of inputs, and the third set of inputs.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustra- tive embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 31 is a flowchart of a process for monitoring a set of applications for a set of financial products provided by a financial institution in accordance with one or more embodiments.

FIG. 32 is a flowchart of a process for monitoring an application of a user for a set of financial products provided by a credit union in accordance with one or more embodiments.

FIG. 33 is a flowchart of a process for building an online application platform for a client financial institution in accordance with one or more embodiments.

FIG. 34 is a flowchart of a process for customizing an application platform for a client financial institution in accordance with one or more embodiments.

DETAILED DESCRIPTION

Figure 1:
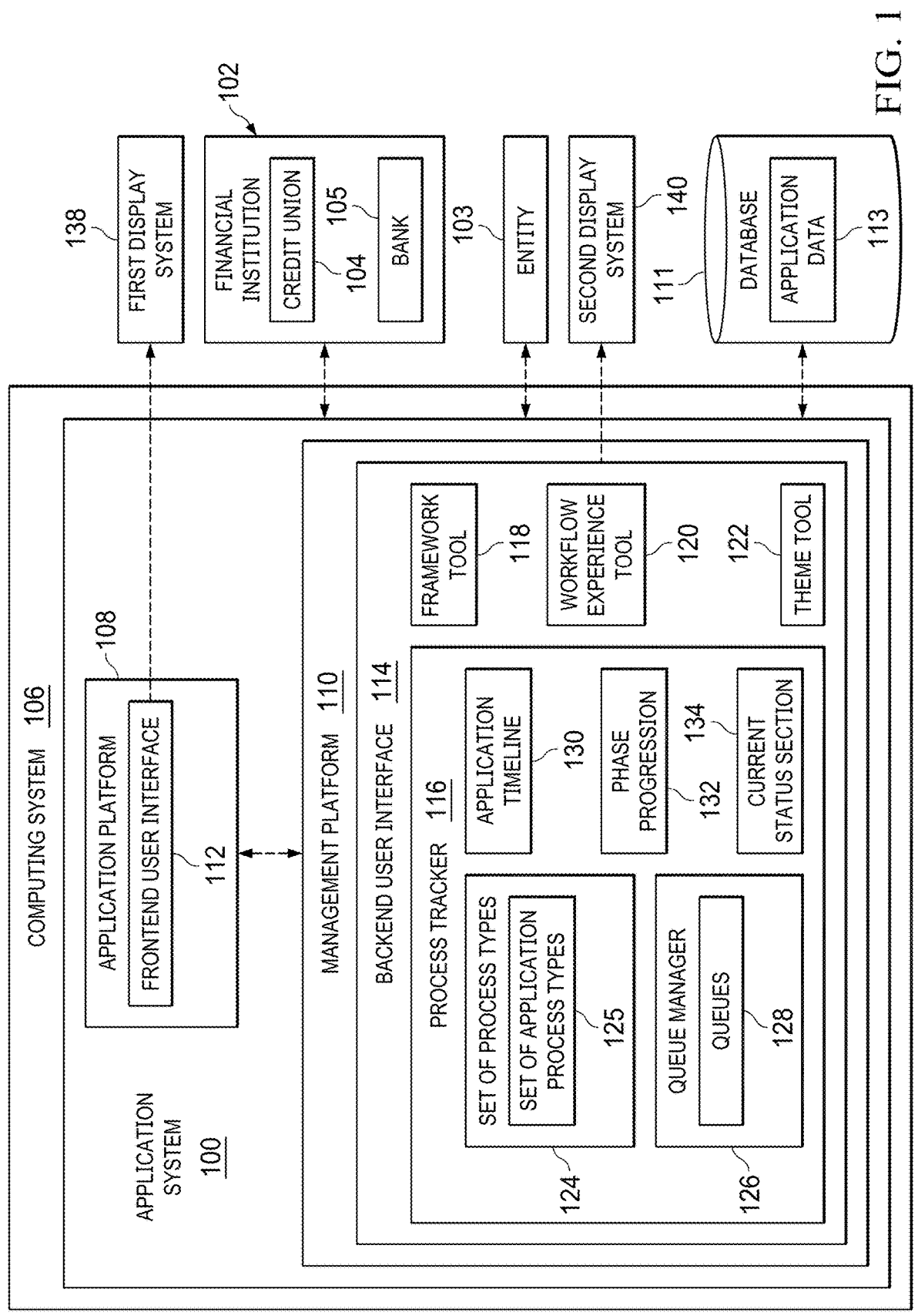
FIG. 1 is an illustration of an application system 100 in accordance with one or more embodiments.

Managing (e.g., monitoring, facilitating, etc.) the applications of applicants for membership to and/or for the financial products offered by financial institutions (e.g., credit unions, banks) may be more difficult, time-consuming, and cumbersome than desired for financial institutions. Currently existing computing systems and user interfaces may be unable to simply and efficiently provide a snapshot of the progress and current status of any selected application of the multiple applications being managed by a financial institution. For example, some currently existing platforms may be unable to indicate both whether an application is in progress, and if so, where the application is at in the overall process.

In some cases, an applicant seeking membership in a financial institution (e.g., a credit union) may initiate an application but not complete the application. Currently existing platforms may not provide financial institutions with a way of tracking the progress of such applications and taking action (e.g., sending reminder emails, generating alerts, etc.) based on the progress of such applications. Currently existing platforms may be unable to, within a single visual area, provide both a visual snapshot of the progress and current status of an application, as well as information about the current status of the application and/or one or more controls for initiating actions based on the current status.

Accordingly, the embodiments described herein provide methods and systems for managing (e.g., monitoring, tracking, facilitating, etc.) a set of applications for a financial institution. In one or more embodiments, a set of applications may be displayed via a management platform on a display system. For example, the set of applications may be displayed via a backend user interface of the management platform. Each application of the set of applications may be associated with application data stored in an application database. User input identifying a selected application from the set of applications may be received via the backend user interface. A current status of an application process corresponding to the selected application may be determined using the application data associated with the selected application. The backend user interface may display an application timeline comprising a plurality of phases in the application process. The application timeline indicates a current phase of the plurality of phases in the application process based on the current status. Further, the backend user interface may display a subphase progression comprising a plurality of subphases within the current phase. The subphase progression indicates a current subphase of the plurality of subphases based on the current status.

In this manner, the backend user interface is able to provide a multi-layered snapshot of the progress and current status of the application process. This multi-layered approach (using both the application timeline and subphase progression) to track the status of an application may reduce the number of layers or data that the user would otherwise need to drill down through in order to discern the status of the application. By visually summarizing the most relevant information (e.g., current phase and current subphase) regarding the progress of an application in an application timeline and subphase progression, the backend user interface allows the user to quickly discern the progress and current status of the application without the user needing to actually pull up the application itself, analyze the application data stored in the application database, and/or perform other time-consuming actions. For example, the user can quickly understand where an application stands without needing to open up the application process via the online application platform and view the application itself via the frontend user interface.

Further, currently existing platforms that host user interfaces for financial institutions may not provide these financial institutions with a way to quickly and easily self-customize the user interface that is provided to an applicant. Currently, a user interface package may be provided to a financial institution where the configuration for that user interface is generally static. After receiving the user interface package, the financial institution may be unable to customize, for example, the account types offered, the financial products offered, the integration of third-party services, and/or the document types that can be automatically or semi-automatically generated without having to go back to the entity that provided the user interface package.

Thus, the embodiments described herein provide methods and systems that allow a financial institution to quickly and easily customize a default configuration for an online application platform and/or further customize a previously customized configuration for the online application platform. With the methods and systems described herein, a financial institution may independently perform such customization without needing to reach out to the entity that provided the online application platform.

Referring now to the figures and, in particular, with reference to FIG. 1, an illustration of an application system 100 in accordance with one or more embodiments. Application system 100 is one example of a system that can be used to manage (e.g., monitor, facilitate, etc.) applications to financial institution 102. Application system 100 may be provided to financial institution 102 by entity 103 (e.g., financial institution 102 is a client of entity 103, where entity 103 may be a software developer or distributor). Accordingly, financial institution 102 may also be referred to as a client financial institution. Financial institution 102 may take the form of a credit union (e.g., credit union 104), a bank (e.g., bank 105), or some other type of financial institution. Bank 105 may be, for example, a local or regional bank, a community bank, or some other type of bank.

Application system 100 may be implemented using software, hardware, firmware, or any combination thereof. Application system 100 may be implemented using, for example, without limitation, computing system 106. Computing system 106 may include memory and one or more processors. In one or more embodiments, computing system 106 include a single computer or multiple computers in communication with each other, one or more servers, one or more storage devices, one or more display systems, one or more input devices, or any combination thereof. In one or more embodiments, computing system 106 may include a cloud computing system or platform. In one or more embodiments, computing system 106 includes multiple computers, servers, or computing devices that are located in at least two different locations. In one or more embodiments, computing system 106 is a server system and application system 100 may be implemented as part of the server system. In one or more embodiments, computing system 106 provides application system 100 as software-as-a-service (SaaS) to entity 103.

Application system 100 includes application platform 108 and management platform 110. Each of application platform 108 may be implemented using software, hardware, firmware, or any combination thereof. Application platform 108, management platform 110, or both may be in communication with database 111. Database 111 may include one or more databases and/or other types of data structures or data stores.

Application platform 108 includes frontend user interface 112, which is a graphical user interface that may be accessed using any type of computing device (e.g., desktop, laptop, tablet, mobile phone, smart watch, wearable device, etc.). In one or more embodiments, frontend user interface 112 includes a web user interface (or web-based user interface) that is accessed by members, customers, or applicants, and/or potential members, potential customers, or applicants of financial institution 102 over a network (e.g., the Internet). Accordingly, in one or more embodiments, application platform 108 may also be referred to as an online application platform.

In one or more embodiments, frontend user interface 112 takes the form of a n applicant-facing user interface intended for primary use by the applicant of financial institution 102. In other embodiments, frontend user interface 112 takes the form of an institution-facing user interface intended for primary use by agents (e.g., employees) of financial institution 102.

Frontend user interface 112 allows an applicant and/or agent of financial institution 102 to initiate, progress through, and complete an application for financial institution 102. In one or more embodiments, this application is an application for membership to financial institution 102. For example, an applicant may use frontend user interface 112 to apply for membership to financial institution 102 to thereby apply for a set of financial products provided by financial institution 102. The set of financial products may include at least one of a checking account, a savings account, a money market account, a certificate of deposit (CD), a loan, a trust, or some other type of financial product.

Data entered via frontend user interface 112 may be stored in database 111. Accordingly, database 111 may also be referred to as an application database or may include an application database for storing the data. The data associated with applications is referred to as application data 113.

Management platform 110 may be used to manage (e.g., monitor, facilitate, etc.) applications entered via frontend user interface 112, customize a default version of online application platform 108 (e.g., change an appearance of frontend user interface 112), further customize an already-customized version of online application platform 108, manage the security of and/or access to management platform 110 and/or online application platform 108, and/or manage application platform 108 in another manner.

Management platform 110 includes backend user interface 114. Backend user interface 114 is a graphical user interface that may be accessed using any type of computing device (e.g., desktop, laptop, tablet, mobile phone, smart watch, wearable device, etc.). In one or more embodiments, backend user interface 114 includes a web user interface (or web-based user interface) that is accessed by agents of financial institution 102 over a network (e.g., the Internet). Accordingly, in one or more embodiments, management platform 110 may also be referred to as an online management platform.

Backend user interface 114, which may also be referred to as a management interface, is accessible by users who are agents of financial institution 102 or those authorized by financial institution 102. Backend user interface 114 includes process tracker 116, framework tool 118, workflow experience tool 120, and theme tool 122. Process tracker 116 may track, for example, application processes that are initiated using application platform 108. For example, process tracker 116 may be capable of tracking the progress and current status for the various application processes of set of process types 124. Each process type may be a different type of process that can be initiated and completed via frontend user interface 112 of application platform 108. A process type may be, for example, an application process, an account editing process, or some other type of process that can be stepped through using frontend user interface 112. For example, set of process types 124 may include set of application process types 125.

Set of application process types 125 may include, for example, at least one of a membership application process, a trust application process, a loan application process, or another type of application process. Each application process type of set of application process types 125 may include one or more phases. These phases may include at least a workflow phase. The workflow phase (or workflow) may be the process or steps by which an application of a particular application type is initiated and completed by an applicant or an agent of financial institution 102 assisting the applicant. For example, a workflow for a membership application process may be similar to or different from the workflow for a trust application process, which may be similar to or different from the workflow for a loan application process.

An applicant using frontend user interface 112 can initiate and complete an application for membership to financial institution 102 via a workflow corresponding a membership application process. An applicant using frontend user interface 112 can initiate and complete an application for a trust provided by financial institution 102 via a workflow corresponding a trust application process. An applicant using frontend user interface 112 can initiate and complete an application for a loan provided by financial institution 102 via a workflow corresponding a loan application process.

In one or more embodiments, each of these different application processes may further include other phases such as, for example, without limitation, at least one of a qualify phase, a decision phase, or a processing phase. In one or more embodiments, these other phases may be automated such that little to no manual interaction or intervention may be needed to qualify an application, approve or deny the application, and/or process the application. For example, these other phases may not be presented to an applicant via frontend user interface 112.

Process tracker 116 may further include a queue manager 126 for managing any number of queues 128 associated with each process type of set of process types 124. For example, each application process type of set of application process types 125 may be associated with one or more queues 128. In one or more embodiments, each application of an applicant may be assigned or placed into a particular queue corresponding to the application process type for that application. Each queue may represent a different "category" of application where the category is based on the level of completion of that application, characteristics associated with a reason as to why the application was not completed, and/or other characteristics associated with the application. For example, without limitation, a membership application may have been saved for later completion and thus only partially complete. The membership application may have been rejected because an applicant failed to comply with the membership rules of financial institution 102, or the application may have been rejected because of funding issues. For each one of these different categories of applications, a respective queue is used to track and maintain the corresponding one or more applications that fall within that category. The category to which an applicant's application belongs may change over time as the applicant progresses through the application. Although queues have been described above with respect to applications, queues may also be used for other types of processes.

Process tracker 116 may include application timeline 130 and subphase progression 132 for tracking the progress and status of the application process for any selected application (e.g., any selected membership application). Application timeline 130 includes a plurality of phases in the application process. Application timeline 130 may indicate a current phase of the plurality of phases in the application process based on the current status of the application process. Each of these phases may be associated with a set of subphases. The user may use backend user interface 114 to view the set of subphases associated with any phase. For example, in response to a user selecting a phase for viewing, subphase progression 132 identifies the set of subphases within the selected phase. Where a current phase in the application process has a plurality of subphases, subphase progression 132 indicates a current subphase of the plurality of subphases based on the current status of the application progress.

Process tracker 116 may further include or may be associated with current status section 134. In one or more embodiments, current status section 134 includes information about at least one of a current phase of the application process or the current subphase within the current phase. In one or more embodiments, current status section 134 identifies a most recent action of an applicant (i.e., the frontend user) who is progressing through the application process for a selected application and identifies whether the applicant has completed the selected application. Current status section 134 may also include controls that enable the backend user of backend user interface 114 to open the application of the applicant via the frontend user interface 112 of application platform 108.

Although application timeline 130, subphase progression 132, and current status section 134 have been described have been described above with respect to applications, in one or more embodiments, similar elements may be included in process tracker 116 for other types of processes.

Framework tool 118 is used to enable customization of the process framework for any one or more of set of process types 124. A framework may define, for example, the foundational elements of a process type or the entire set of process types 124. A framework, which may be referred to as a core, may define, for example, without limitation, the type of information collected via a process, the type of documentation needed for the process, requirements for the process, and/or other characteristics associated with the process.

For example, framework tool 118 may be used to customize the application framework for set of application process types 125 that are presented to an applicant via frontend user interface 112. In such cases, framework tool 118 may be referred to as an application framework tool. An application framework may be the "core" of one or more application process types and may define these type of application processes, the type of documentation needed for the application processes, eligibility requirements for the application processes, the types of financial products that can be applied for with a given type of application process, and/or other characteristics or features associated with the application processes.

Framework tool 118 allows financial institution 102 to customize the application framework based on the individual preferences of financial institution 102. In one or more embodiments, the application framework is a framework that spans the various types of application processes offered by financial institution 102. For example, at least a portion of the application framework may apply to each type of application process made available by financial institution 102.

In one or more embodiments, a single framework may serve as the basis for set of process types 124. In other embodiments, a framework may be customizable for each of the different process types. In still other embodiments, a single framework may be used for set of application process types 125, while one or more other frameworks may be used for other process types.

Workflow experience tool 120 is used to customize the applicant's experience progressing through the workflow of the one or more different application processes of set of application process types 125. For example, workflow experience tool 120 may be used to customize the text presented via frontend user interface 112, the types of controls that are presented via frontend user interface 112, and/or other features. For example, workflow experience tool 120 may be used to customize the workflow for an application for membership to financial institution 102 as the workflow is presented via frontend user interface 112. The various features that may be customized include, but are not limited to, the types of inputs that are solicited from the applicant, the text that is presented to the applicant, the type of information (e.g., social security information versus tax ID information) that is required to initiate the workflow, the various branches in the workflow that may be traversed given an applicant's input during the workflow, and/or other types of features.

Theme tool 122 may be used to customize the appearance of application platform 108. For example, theme tool 122 may be used to customize the appearance of frontend user interface 112 of application platform 108. The appearance of frontend user interface 112 includes the "visual look" of frontend user interface 112 with respect to colors, logos, fonts, background graphics, and/or other visual features. Theme tool 122 allows financial institution 102 to, for example, customize frontend user interface 112 to reflect or match the branding of financial institution. For example, if financial institution 102 undergoes a rebranding in which its color scheme is changed, an agent of financial institution 102 can use theme tool 122 to quickly and easily modify the appearance of frontend user interface 112 to reflect this rebranding (as opposed to an agent of entity 103 making such modifications).

In one or more embodiments, frontend user interface 112 of application platform 108 and backend user interface 114 of management platform 110 may be accessed via a network (e.g., the Internet) for display on display systems. For example, an applicant of financial institution 102 may access frontend user interface 112 using a web browser that is displayed on first display system 138. First display system 138 may include, for example, the screen of a mobile phone. As another example, an agent of financial institution 102 may access backend user interface 114 using a web browser that is displayed on second display system 140. Second display system 140 may include, for example, a display screen of a laptop, a computer monitor, or some other type of display device. In one or more embodiments, first display system 138 and second display system 140 are located remotely with respect to each other. Computing system 106 (e.g., a server system) may host frontend user interface 112 and backend user interface 114. In one or more embodiments, computing system 106 is managed by entity 103. In other embodiments, computing system 106 is managed by financial institution 102. In still other embodiments, computing system 106 is managed jointly by entity 103 and financial institution 102.

In some embodiments, application system 100 provides solutions to problems that are unique to the Internet, specifically to the technical field of processing an application for a particular membership to a financial institution and/or a financial product. For example, conventional online application portals do not allow for easy customization of the membership, products, and design of the frontend user interface 112. As noted above, financial institutions want to make the managing and processing of applications for financial products as easy and efficient as possible so that applicants will want to continue banking at that particular financial institution. Additionally, credit unions may particularly benefit from a system that can simultaneously process an application for membership along with an application for one or more financial product. Being able to simultaneously process an application for membership along with an application for one or more financial products may reduce the overall computing resources that would otherwise be needed to first manage and process the membership application and subsequently manage and process multiple applications for different financial products.

Further, backend user interface 114 provides a technical improvement over conventional technology because the backend user interface 114 provides a comprehensive and complete view of the status of the membership application and/or one or more applications for a financial product. The backend user interface 114 also provides more granularity regarding the status of the application and/or product. This solves problems in the technical field of application monitoring and error detection by allowing a user monitoring the application from the backend to quickly identify any issues within the application and to identify what stage in the application process the applicant is in. By providing these capabilities in a single backend user interface 114 that is easily navigable, fewer overall computing resources (e.g., display resources) may be needed.

Backend user interface 114 further enables a financial institution (e.g., credit union) to make edits or customizations for the specific credit union's application system without requesting third-party assistance. For example, if a credit union wants to change its requirements for membership, change the products it offers, change its branding, or etc., the credit union can access backend user interface 114 to make these changes without having to engage a third party (e.g., the initial builder of backend user interface 114). By reducing third-party reliance, costly delays may be prevented.

Backend user interface 114 also provides a multi-layered approach (using both an application timeline and subphase progression) to track the status of an application. This multi-layered approach reduces the number of layers or data that would otherwise need to be utilized in order to discern the status of an application and improves the efficiency of the computer being used to track the status of the application. Using a multi-layered approach to visually summarize the relevant information (e.g., current phase and current subphase) regarding the progress of an application in an application timeline and subphase progression, backend user interface 114 allows the user to quickly discern the progress and current status of the application without the user needing to actually pull up the application itself, analyze the application data stored in the application database, and/or perform other time-consuming actions that may inefficiently use computing resources. By visually summarizing the relevant information as describe above, backend user interface 114 can display more information to the user in a more easily navigable form using less visual space, which may improve the functioning of the computer. In this manner, using a multi-layered approach that is also easily customizable improves the technical field of online application systems, as well as user interfaces in general.

The illustration of application system 100 in FIG. 1 is not meant to imply physical or architectural limitations to the manner in which an example embodiment may be implemented. Other components in addition to or in place of the ones illustrated may be used. Some components may be optional.

FIGS. 2-30 are illustrations of examples of implementations for user interfaces of application system 100 in FIG. 1. For example, FIGS. 2-22, 24, 26, 28, and 30 are illustrations of one example of an implementation for backend user interface 114 in FIG. 1 in accordance with one or more embodiments. Further, FIGS. 23, 25, 27, and 29 are illustrations of one example of an implementation for front end user interface 112 in FIG. 1 in accordance with one or more embodiments.

Figure 2:
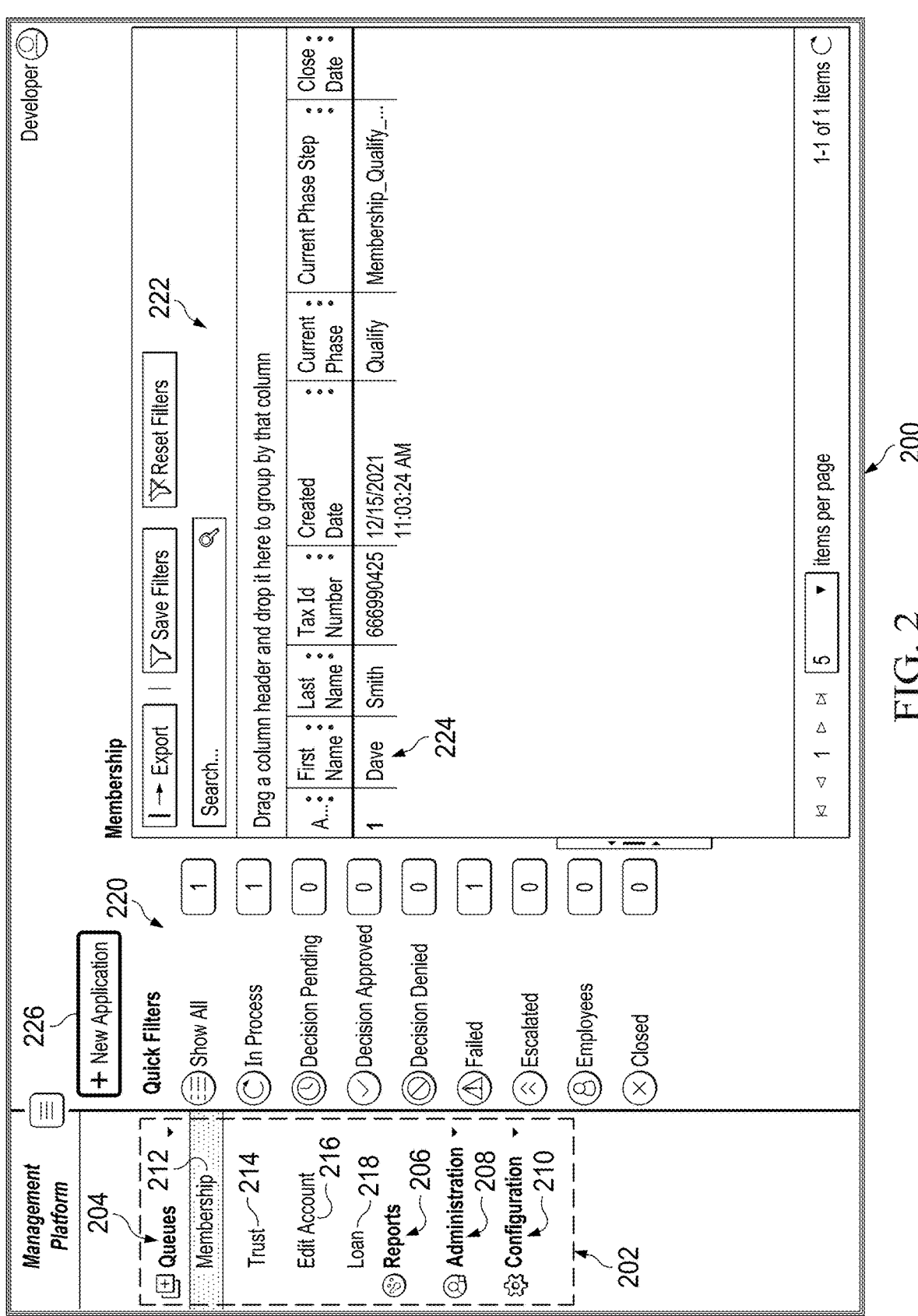
FIG. 2 is an illustration of a backend user interface in accordance with one or more embodiments.

FIG. 2 is an illustration of a backend user interface in accordance with one or more embodiments. Backend user interface 200 may be displayed on a display system such as, for example, without limitation, second display system 140 in FIG. 1. Backend user interface 200, which may also be referred to as a management interface, may be one example of an implementation for backend user interface 114 in FIG. 1. Backend user interface 200 may be used to manage application platform 108 in FIG. 1 and/or the applications initiated and/or completed via application platform 108. Accordingly, FIG. 2 is described with continuing reference to FIG. 1.

Backend user interface 200 enables a user (e.g., an agent) of financial institution 102 to monitor a set of applications for a set of financial products provided by financial institution 102, build application platform 108 (e.g., online application platform) for financial institution 102, reconfigure application platform 108, and/or otherwise manage the set of applications, application platform 108, or both.

Backend user interface 200 includes main menu 202 for navigating within backend user interface 200. Main menu 202 presents a plurality of menu options to the user including, for example, queues option 204, reports option 206, administration option 208, configuration option 210, and/or one or more other options. Queues option 204, when expanded, allows a user to view different queues for different application processes. For example, when expanded, queues option 204 may include membership sub-option 212, trust sub-option 214, edit account sub-option 216, loan sub-option 218, and/or one or more other sub-options.

Selecting a sub-option from queues option 204 causes one or more corresponding queues to be displayed. For example, a user selecting membership sub-option 212 causes backend user interface 200 to present queues 220 for membership sub-option 212. Each of queues 220 corresponds to a different category for an application for membership (or "membership application") to financial institution 102. An application may belong to one or more different queues based on the level of completion of that application, characteristics associated with a reason as to why the application was not completed, and/or other characteristics associated with the application. The different queues 220 for membership sub-option 212 may include for example, without limitation: an "all" queue that indicates the total number of applications that have been processed using application platform 108; an "in process" queue that indicates the total number of applications in process (or in progress); a "decision pending" queue that indicate the number of applications where a decision regarding membership is pending; a "decision approved" queue that indicates the number of applications where the decision was made to approve the application; a "decision denied" queue that indicates the number of applications where the decision was made to deny the application; a "failed" queue that indicates the number of failed applications; an "escalated" queue that indicates the number of applications escalated (e.g., referred to upper management); an "employees" queue that indicates the number of applications belonging to employees of financial institution 102; a "closed" queue that indicates the number of closed applications; and/or one or more other queues.

In this manner, queues 220 allow the backend user interface 200 to differentiate visually, with ease, between different applications depending on their levels of completion or rather, their respective statuses. In some embodiments, each queue may be associated with a reminder or alert engine that may trigger an alert to the applicant and/or financial institution 102 that informs of the application's current status. For example, if an application has been placed within the "in process" queue, the alert engine may trigger an alert to be transmitted to the applicant on a periodic schedule to remind the applicant that his/her application needs to be completed in order to engage with financial institution 102. The periodicity or frequency of these alerts may be set to any value, such as, but not limited to, an established number of hours, days, weeks, months, or even years.

Further, when membership sub-option 212 is selected, backend user interface 200 also presents membership application section 222. Membership application section 222 presents applications for membership to financial institution 102 and information about these applications. For example, membership application section 222 may present application records, with each corresponding to a particular application. Application record 224 is one example of such an application record that corresponds to a particular application for membership to financial institution 102. A user may select application record 224 to view more detailed information about the corresponding application and/or a status of the application. Accordingly, a selection of an application record such as application record 224 is a selection of the corresponding application.

The total number of applications listed in membership application section 222 may be reduced by filtering using queues 220. For example, selecting the "in process" queue may cause backend user interface 200 to display in membership application section 222 only those applications that are in process. Selecting the "decision denied" queue may cause backend user interface 200 to display in membership application section 222 only those applications where membership was denied.

New application control 226 allows a user to manually initiate a new application and thereby cause a new application record to be displayed in membership application section 222. In one or more embodiments, new application control 226, when selected, directs the user to a frontend user interface (e.g., frontend user interface 112) of application platform 108 in FIG. 1.

Although queues 220, membership application section 222, and new application control 226 are shown for membership sub-option 212 in FIG. 2, similar elements may be similarly presented in backend user interface 200 when trust sub-option 214, edit account sub-option 216, or loan sub-option 218 is selected by the user.

As noted above, main menu 202 also includes reports option 206, administration option 208, and configuration option 210. Reports option 206 may allow a user (e.g., an agent of financial institution 102) to create, edit, print, and/or otherwise manage one or more reports. These reports may provide different types of information about the applications being processed via application platform 108 in FIG. 1. Administration option 208 may allow a user to perform administrative functions with respect to application platform 108, management platform 110, or both. For example, administration option 208 may allow the user to manage the security for and/or access to application platform 108, management platform 110, or both. Configuration option 210 may allow a user to customize application platform 108 by, for example, customizing frontend user interface 112 of application platform 108.

Figure 3:
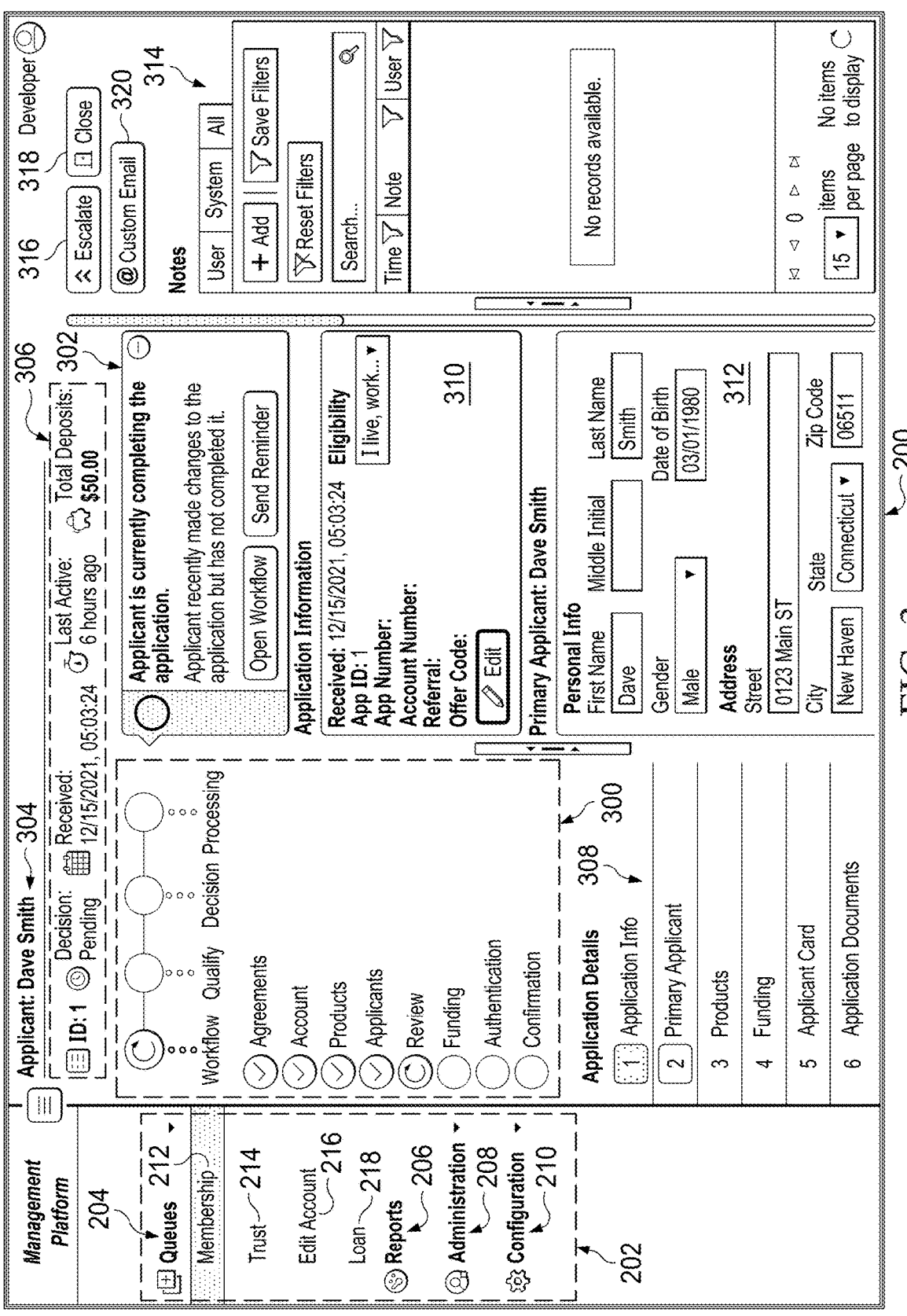
FIG. 3 is another illustration of the backend user interface from FIG. 2 in accordance with one or more embodiments.

FIG. 3 is another illustration of backend user interface 200 from FIG. 2 in accordance with one or more embodiments. Backend user interface 200 may present process tracker 300, current status section 302, or both within application section 304 in response to a user (e.g., an agent of financial institution 102) selecting an application record (e.g., application record 224) presented within membership application section 222 in FIG. 2. Application section 304 may be, for example, a section of backend user interface 200 designated for displaying information about the selected application record.

Process tracker 300 may include or be associated with current status section 302. Process tracker 300 may be one example of an implementation for process tracker 116 in FIG. 1. Current status section 302 may be one example of an implementation for current status section 134 in FIG. 1.

Process tracker 300 allows the user to get a snapshot view of the current status of the application process for the selected application. Process tracker 300 is described in greater detail in FIGS. 6-9 below. Current status section 302 may provide a brief note regarding the current status of the application. In one or more embodiments, current status section 302 identifies a most recent action of the applicant who is progressing through the application process for the selected application and whether the applicant has completed the selected application.

Within application section 304, backend user interface 200 may further present application process snapshot 306. Application process snapshot 306 may provide a brief overview of the application process for the selected application. This brief overview may include, for example, an identifier for the application (or applicant), a status regarding a decision about the application, a date and/or timestamp for when data was last received for the application, an indication of how long it has been since the application was last active, a total amount that has been deposited by the applicant, and/or other types of information.

Application section 304 may further include, for example, application details navigator 308. Applicant details navigator 308 provides a way for the user to navigate through the various sections of information provided within application section 304. For example, application details navigator 308 allows the user to "jump to" different portions of the information presented in application section 304, which may be in, for example, scrollable form. As noted by applicant details navigator 308, application section 304 may further provide application information 310, primary applicant information 312, and/or other types of information (e.g., products information, funding information, applicant card information, application documents information) related to the selected application.

Backend user interface 200 may further includes notes section 314. Notes section 314 allows the user to create and/or view notes regarding the selected application. These notes may be created by the user (e.g., agent of financial institution 102), the system (which is management platform 110), or both.

Backend user interface 200 may further include escalate control 316, close control 318, and email control 320. Escalate control 316 may be selected by the user to escalate the selected application. Escalation may include, for example, but is not limited to, sending the application to upper management, increasing a priority of the application, and/or flagging the application as important. Close control 318 may be selected to close the selected application. Closing the application may, in some cases, close the application and prevent the applicant from inputting any further data via frontend user interface 112 of application platform 108. In some embodiments, closing the application may be selected after an application has been denied or approved to indicate that the application has been fully addressed. Email control 320 may be selected by the user to generate a customized email. This customized email may be sent to the applicant, another agent of financial institution 102, or some other person or entity.

Figure 4:
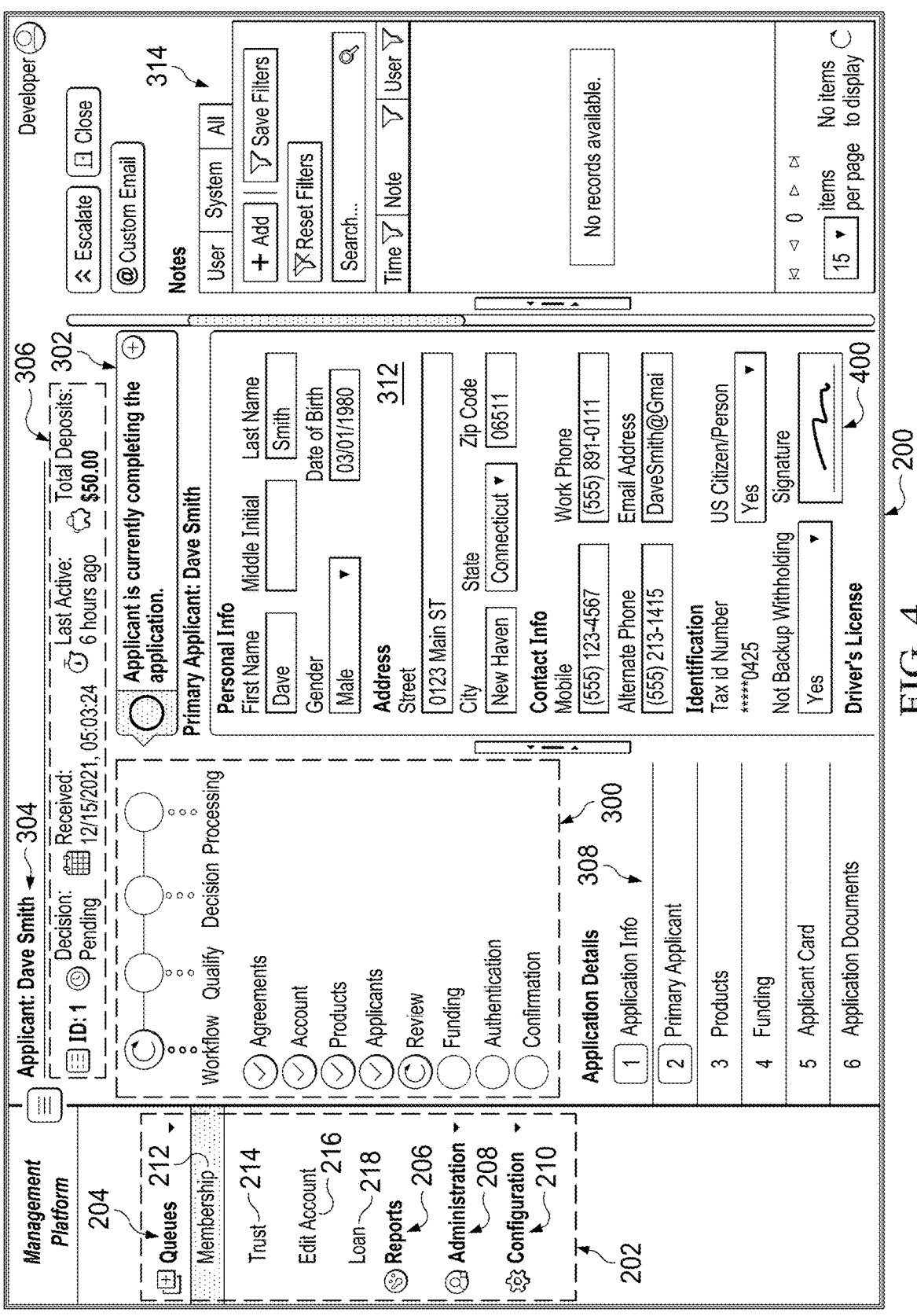
FIG. 4 is another illustration of the backend user interface from FIGS. 2-3 in accordance with one or more embodi- ments.

FIG. 4 is another illustration of backend user interface 200 from FIGS. 2 and 3 in accordance with one or more embodiments. In FIG. 4, a different portion of information is shown in application section 304. For example, more of primary applicant information 312 can be viewed. Primary applicant information 312 may include, for example, signature 400 of the applicant. Signature 400 may be a digital signature that was either uploaded by the applicant via frontend user interface 112 of application platform 108 or generated via frontend user interface 112 of application platform 108.

In one or more embodiments, signature 400 is stored and used, with authorization by the applicant, by management platform 110 for one or more documents that are generated via the application process requiring the applicant's signature. For example, once an application is completed online, a set of financial disclosure documents may need to be generated with the applicant's signature. Rather than the applicant having to enter his or her signature for each and every financial disclosure document, management platform 110 may simply insert signature 400 into each of the financial disclosure documents if the applicant has provided such authorization. This saves time and effort as compared to electronic platforms in which an applicant must separately enter a signature for each document requiring a signature.

Further, by including signature 400 in primary applicant information 312, the user (e.g., agent of financial institution 102) of backend user interface 114 may be able to review signature 400 and confirm whether or not signature 400 is sufficient (e.g., sufficiently legible, etc.).

Figure 5:
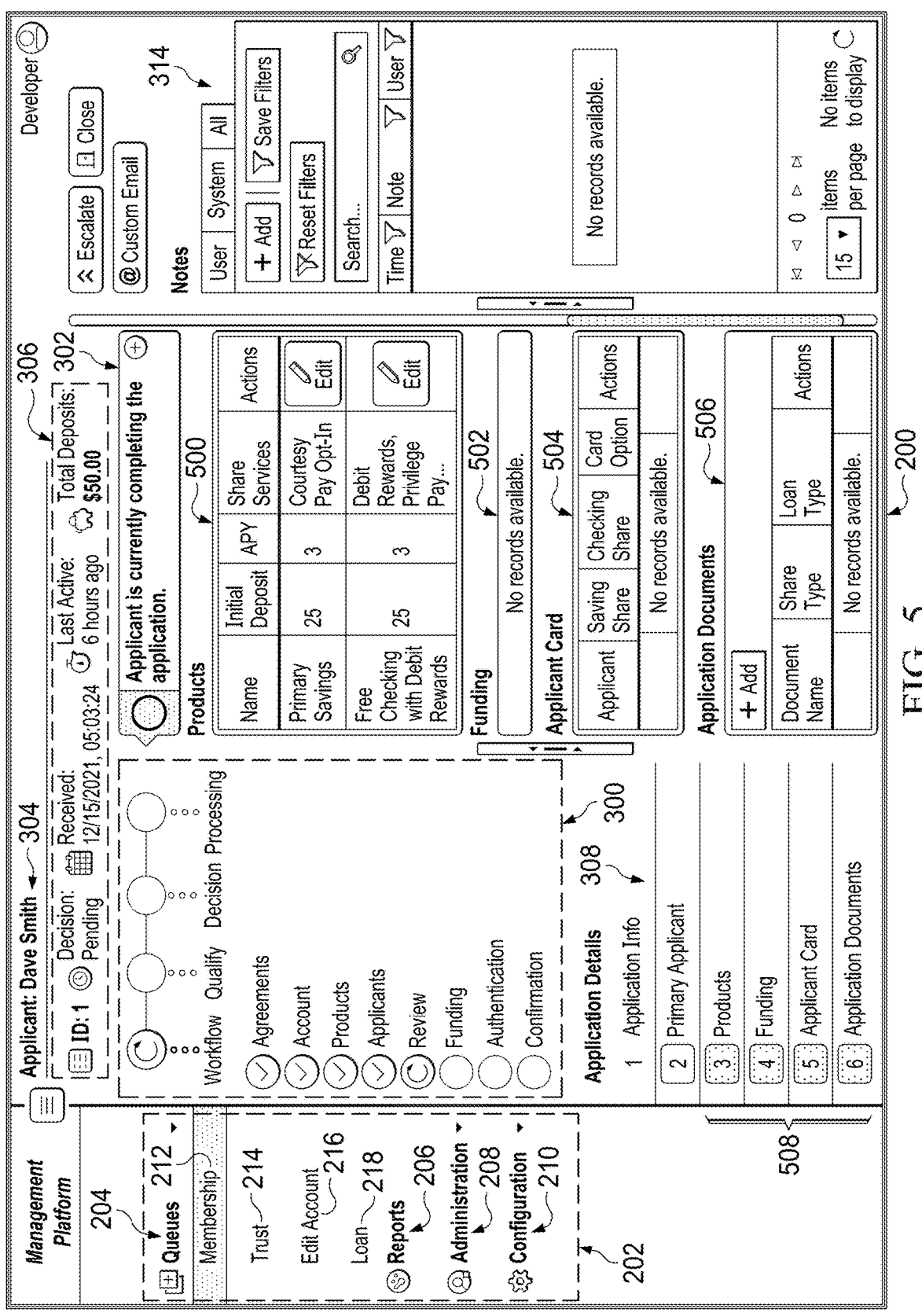
FIG. 5 is another illustration of the backend user interface from FIGS. 2-4 in accordance with one or more embodi- ments.

FIG. 5 is another illustration of backend user interface 200 from FIGS. 2-4 in accordance with one or more embodiments. In FIG. 5, yet another portion of information is shown in application section 304. For example, products information 500, funding information 502, applicant card information 504, and application documents information 506 can be viewed. As shown in FIG. 5, the display of products information 500, funding information 502, applicant card information 504, and application documents information 506 within application section 304 cause applicant details navigator 308 to graphically indicate to the user that these are the types of information being shown. For example, graphical indicators 508 are used within applicant details navigator 308 to denote that products information 500, funding information 502, applicant card information 504, and application documents information 506 are currently displayed within application section 304.

Figure 6:
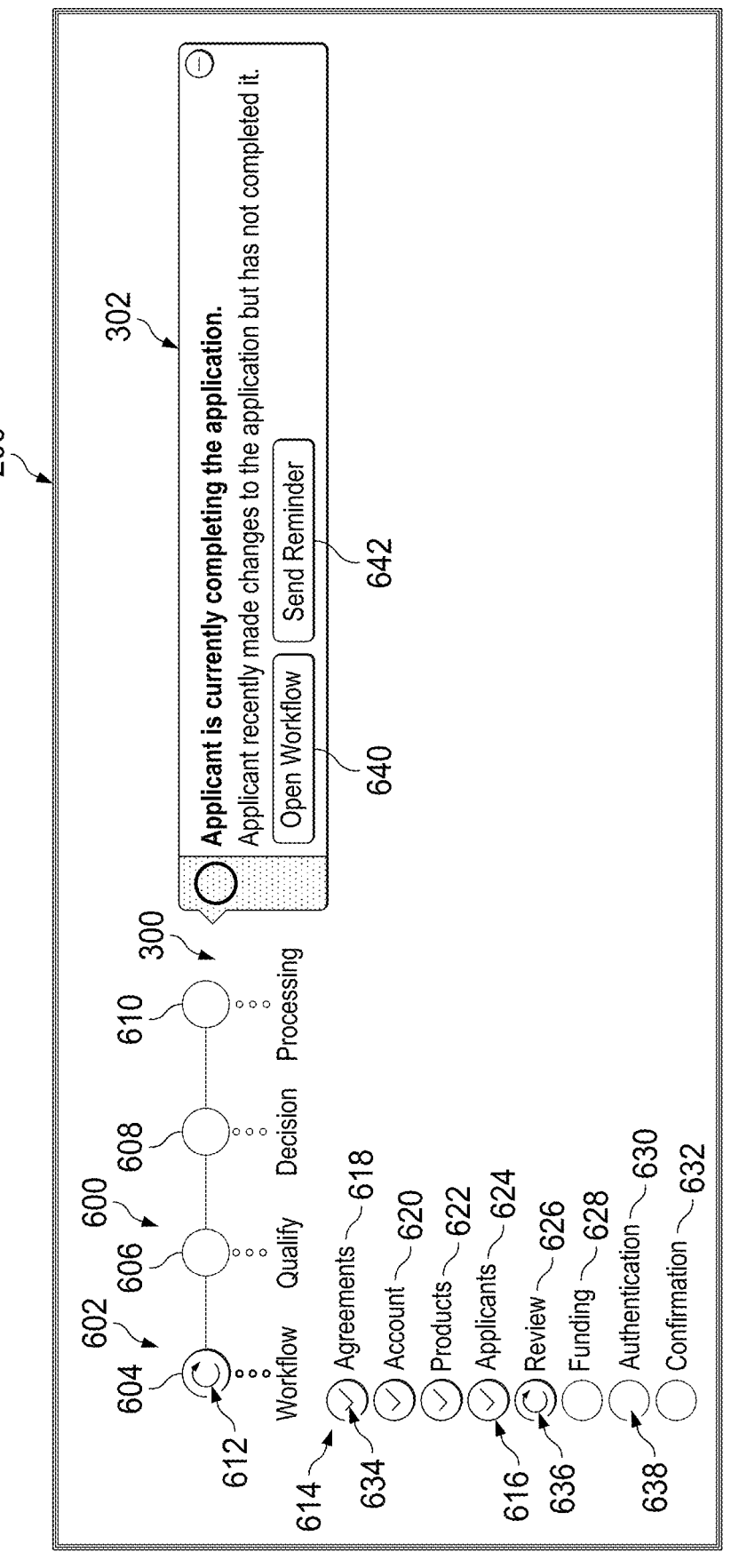
FIG. 6 is an illustration of an enlarged view of tracking information and a current status section of an application section within the backend user interface from FIG. 3 in accordance with one or more embodiments.

FIG. 6 is an illustration of an enlarged view of process tracker 300 and current status section 302 of application section 304 within backend user interface 200 from FIG. 3 in accordance with one or more embodiments. As depicted, process tracker 300 includes application timeline 600 that includes plurality of phases 602. Application timeline 600 may be one example of an implementation for application timeline 130 in FIG. 1. Each of plurality of phases 602 may be a different phase associated with the application process for an application (e.g., application for membership to financial institution 102). Plurality of phases 602 may include, for example, workflow phase 604, qualify phase 606, decision phase 608, and processing phase 610.

Based on a determination of the current status of the application process corresponding to a selected application (e.g., selected via the selection of an application record in membership application section 222 in FIG. 2) using the application data associated with the selected application, the current phase of plurality of phases 602 for the selected application may be determined. In one or more embodiments, backend user interface 200 displays a graphical indication (e.g., graphical indicator 612) of this current phase. Graphical indicator 612 may include, for example, without limitation, a certain color, a symbol, a graphical icon, an animation, or some other type of visual indicator for indicating the current phase.

Each of plurality of phases 602 may itself be comprised of one or more subphases. Process tracker 300 may include a subphase progression that includes the one or more subphases for a default phase of plurality of phases 602 or for a selected phase that is selected by the user. In some embodiments, the default phase is the current phase.

In FIG. 6, workflow phase 604 is the selected phase and process tracker 300 includes workflow subphase progression 614 corresponding to workflow phase 604. Workflow subphase progression 614 may be one example of an implementation for subphase progression 132 in FIG. 1. Workflow subphase progression 614 includes plurality of subphases 616. Each of plurality of subphases 616 corresponds to a different step(s) in workflow phase 604. Plurality of subphases 616 may include, for example, without limitation, agreements subphase 618, account subphase 620, products subphase 622, applicants subphase 624, review subphase 626, funding subphase 628, authentication subphase 630, and confirmation subphase 632.

Graphical indicators may be used to indicate which of plurality of subphases 616, if any, has been completed, which of plurality of subphases 616 is in progress, and which of plurality of subphases 616, if any, has yet to be initiated. For example, graphical indicator 634 may be used to indicate that agreements subphase 618 has been completed. Graphical indicator 634 may include, a color, a symbol, a graphical icon, an animation, or some other type of visual indicator that distinguishes the corresponding subphase as "completed."

Graphical indicator 636 may be used to indicate that review subphase 626 is in progress. Graphical indicator 636 may include, a color, a symbol, a graphical icon, an animation, or some other type of visual indicator that distinguishes the corresponding subphase as "in progress." Further, graphical indicator 638 may be used to indicate that authentication subphase 630 has yet to be initiated. Graphical indicator 638 may include, a color, a symbol, a graphical icon, an animation, or some other type of visual indicator that distinguishes the corresponding subphase as "yet to be initiated."

In one or more embodiments, current status section 302 includes information about the current phase of plurality of phases 602, the current subphase of plurality of subphases 616, or both. In one or more embodiments, current status section 302 identifies a most recent action of the applicant who is progressing through the application process for the selected application and whether the applicant has completed the selected application.

In one or more embodiments, current status section 302 includes a brief indication of the status of the application with respect to the selected phase of plurality of phases 602. For example, when workflow phase 604 is selected, current status section 302 may provide information about the status of the workflow for the selected application. In some embodiments, current status section 302 includes open workflow control 640 and reminder control 642. The user may select open workflow control 640 to open the current workflow for the selected application. For example, a selection of open workflow control 640 may open an instance of frontend user interface 112 of application platform 108 with the application data for the selected application already populated. Accordingly, the user may be able to view, edit, and/or otherwise facilitate traversal through the workflow. The user may select reminder control 642 to trigger the sending of a reminder (e.g., a reminder email, reminder text message, reminder alert, etc.) to the applicant that the workflow is in progress and still needs to be completed by the applicant.

Figure 7:
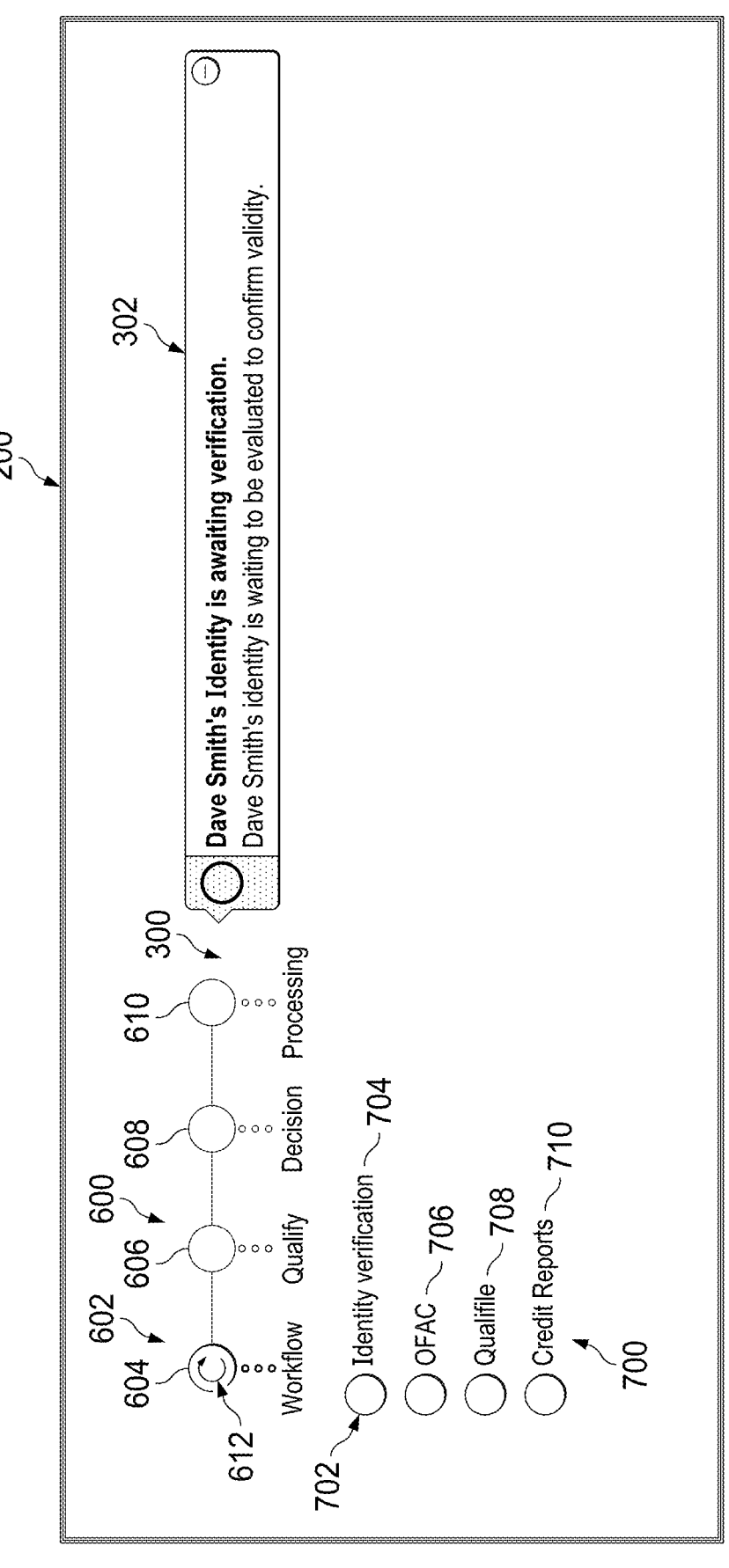
FIG. 7 is another illustration of an enlarged view of tracking information and a current status section of an application section within the backend user interface from FIG. 3 in accordance with one or more embodiments.

FIG. 7 is an illustration of an enlarged view of process tracker 300 and current status section 302 of application section 304 within backend user interface 200 from FIG. 3 in accordance with one or more embodiments. In one or more embodiments, a new user input may be received via backend user interface 200 that selects, via the application timeline 600, a different (e.g., a non-current) phase than workflow phase 604 of plurality of phases 602. Backend user interface 200 may remove workflow subphase progression 614 that was previously displayed in FIG. 6 and display a new subphase progression for the newly selected phase.

When the newly selected phase of plurality of phases 602 of application timeline 600 is qualify phase 606, qualify subphase progression 700 is displayed within process tracker 300. Qualify subphase progression 700 includes plurality of subphases 702. Each of plurality of subphases 702 may include one or more steps for determining whether the applicant qualifies for membership to financial institution 102.

Plurality of subphases 702 may include, for example, without limitation, identity verification 704, OFAC 706, qualifile 708, and credit report 710. Identity verification 704 may include one or more steps for verifying the identity of the applicant. OFAC 706 may include one or more steps for determining whether the applicant can be found on a watch list maintained by the Office of Foreign Assets Control ("OFAC"). Qualifile 708 may include one or more steps for determining the applicant's QualiFile® score and whether or not the QualiFile® score satisfies a set of criteria for membership qualification. Credit report 710 may include one or more steps for retrieving one or more credit reports for the applicant and/or determining whether or not the one or more credit reports satisfy a set of criteria for membership qualification.

In FIG. 7, current status section 302 has been updated based on the selection of qualify phase 606. Current status section 302 provides information about the status of the application with respect to qualify phase 606. For example, current status section 302 indicates that an identity verification, which is the first step(s) in qualify phase 606, still needs to be performed for the selected application.

Figure 8:
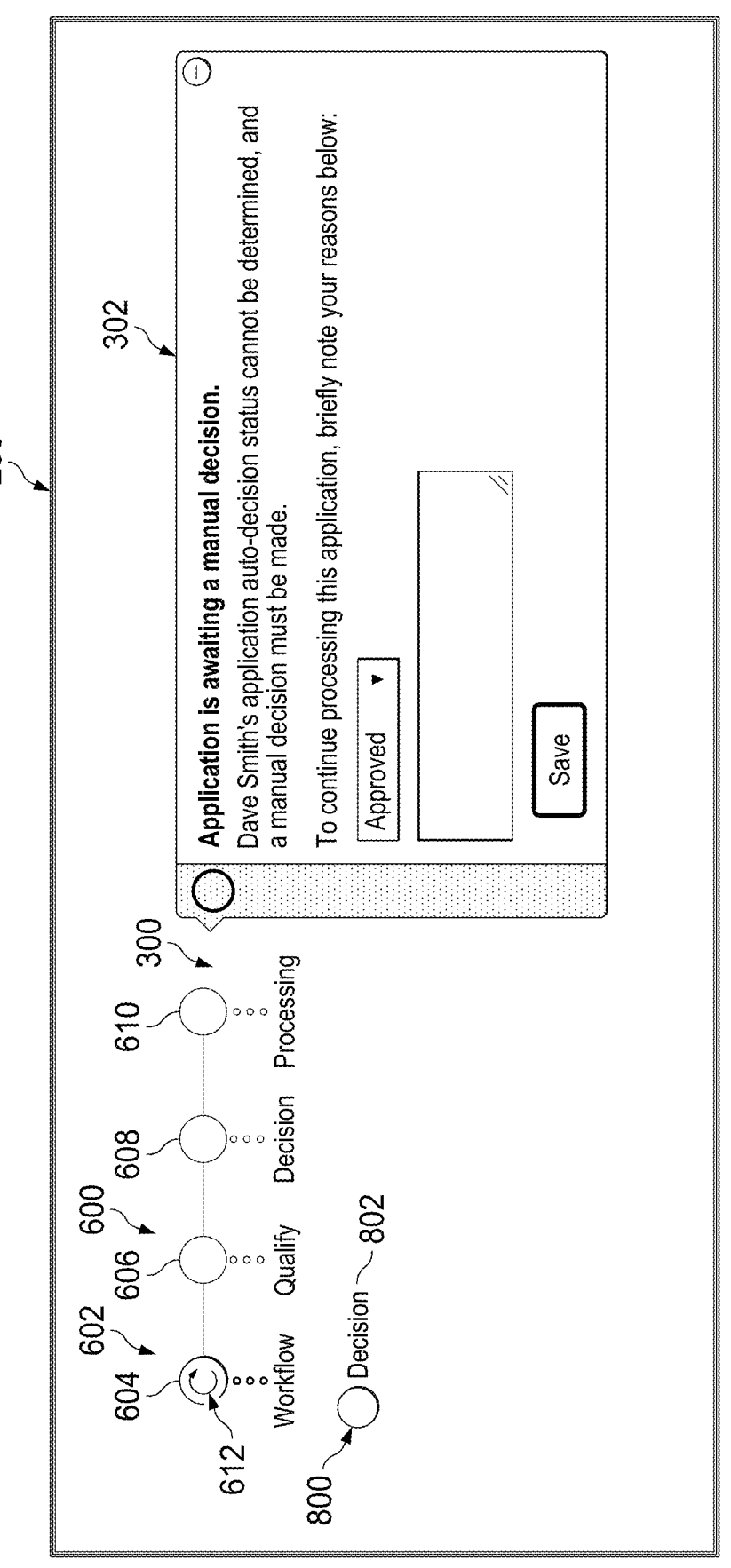
FIG. 8 is another illustration of an enlarged view of tracking information and a current status section of an application section within the backend user interface from FIG. 3 in accordance with one or more embodiments.

FIG. 8 is an illustration of an enlarged view of process tracker 300 and current status section 302 of application section 304 within backend user interface 200 from FIG. 3 in accordance with one or more embodiments. In FIG. 8, the selected phase of plurality of phases 602 of application timeline 600 is decision phase 608. The selection of decision phase 608 causes decision subphase progression 800 to be displayed within process tracker 300. Decision subphase progression 800 includes a single subphase, the decision subphase 802.

The selection of decision phase 608 further causes current status section 302 to be updated. Current status section 302 provides information about the status of the application with respect to decision phase 608. For example, current status section 302 indicates that a decision cannot yet be generated based on the status of the application, and if a decision is necessary, a manual decision is needed. Current status section 302 further allows this manual decision to be made. Current status section 302 makes this type of manual decision-making easy, fast, and efficient because the user does not need to navigate to another window or section of backend user interface 200 in order to quickly approve or deny the application.

Figure 9:
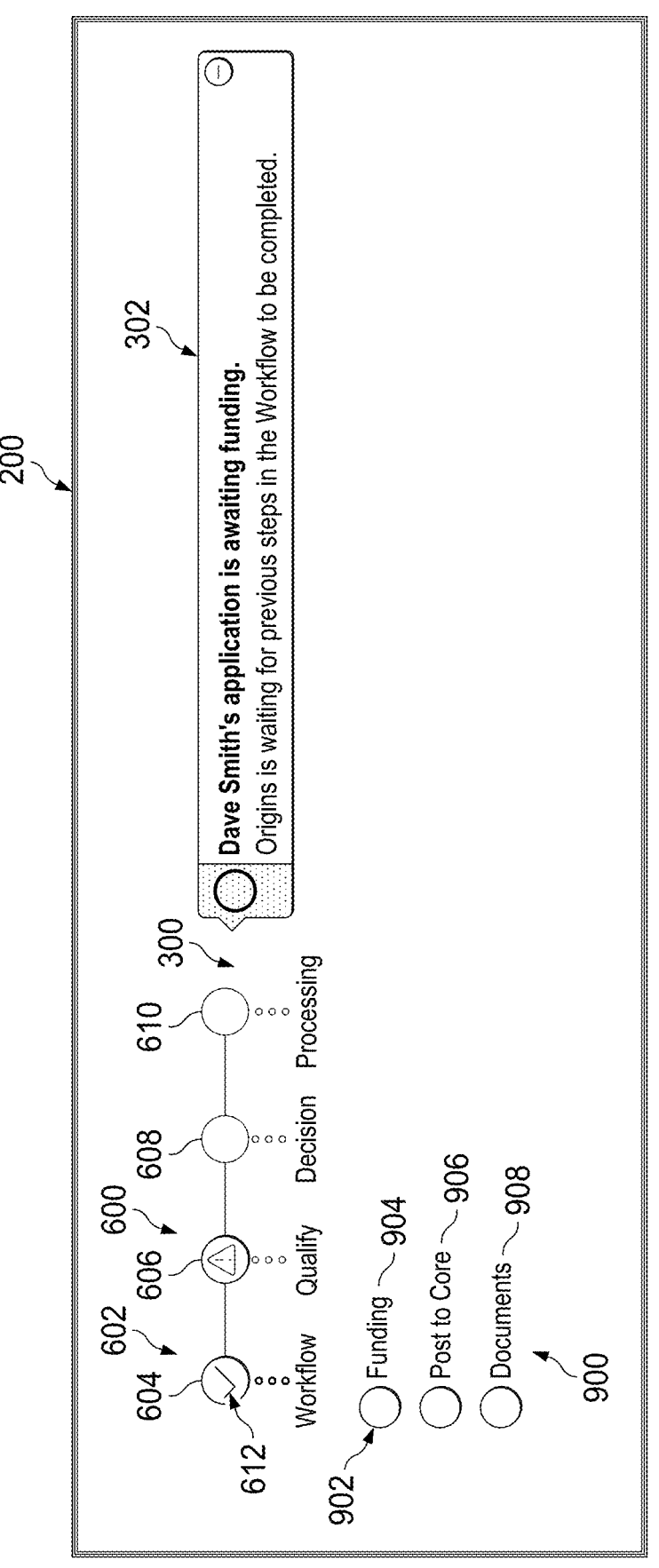
FIG. 9 is another illustration of an enlarged view of tracking information and a current status section of an application section within the backend user interface from FIG. 3 in accordance with one or more embodiments.

FIG. 9 is an illustration of an enlarged view of process tracker 300 and current status section 302 of application section 304 within backend user interface 200 from FIG. 3 in accordance with one or more embodiments. In FIG. 9, the selected phase of plurality of phases 602 of application timeline 600 is processing phase 610. The selection of processing phase 610 causes processing subphase progression 900 to be displayed within process tracker 300.

Processing subphase progression 900 includes plurality of subphases 902. Each of plurality of subphases 902 includes one or more steps that are part of the processing of the application after a decision has been made about the application. Plurality of subphases 902 may include, for example, without limitation, funding subphase 904, post to core subphase 906, documents subphase 908, and/or one or more other subphases. The selection of processing phase 610 further causes current status section 302 to be updated. Current status section 302 provides information about the status of the application with respect to processing phase 610. For example, current status section 302 indicates that the applicant is still awaiting funding as other steps in the application process have yet to be completed.

Figure 10:
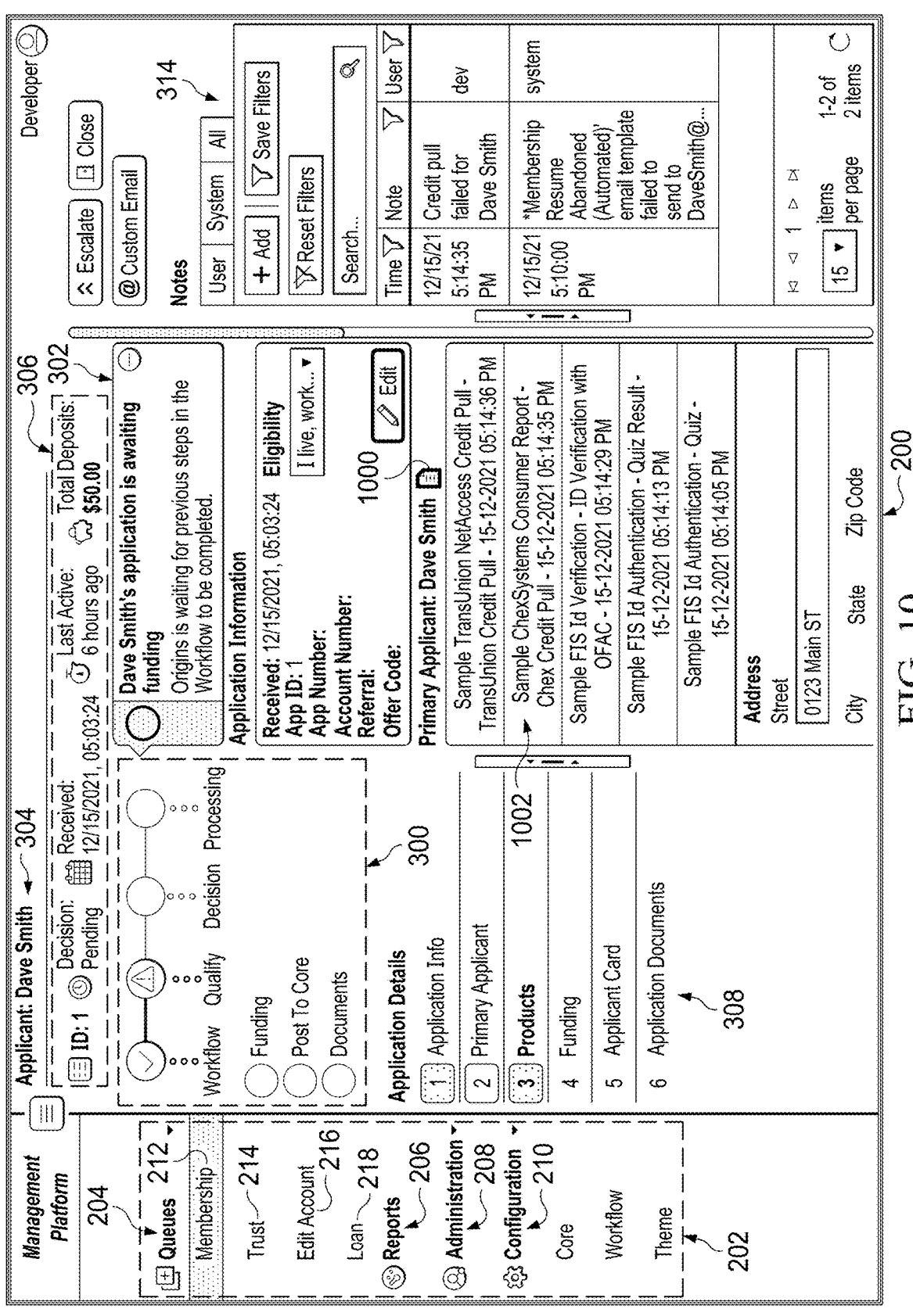
FIG. 10 is an illustration of the backend user interface from FIGS. 3-5 in accordance with one or more embodiments.

FIG. 10 is an illustration of backend user interface 200 from FIGS. 3-5 in accordance with one or more embodiments. Primary applicant information 312 includes action icon 1000 that can be selected. A selection of action icon 1000 may cause action listing 1002 to be generated. Action listing 1002 may identify one or more actions that have been taken or performed as part of the application process for the selected application. For example, action listing 1002 may identify any reports that have been generated, any documents that have been uploaded, any identity verifications that have been performed, any credit reports that have been pulled, and/or other types of actions. Action listing 1002 may also include a date and/or timestamp for any action included in action listing 1002.

Action icon 1000 and action listing 1002 provide an efficient way of presenting this information about the actions taken or performed without the user having to navigate to another window or section of backend user interface 200. For example, in some embodiments, the actions identified in action listing 1002 may include those taken or performed within different phases of plurality of phases 602 of application timeline 600.

Figure 11:
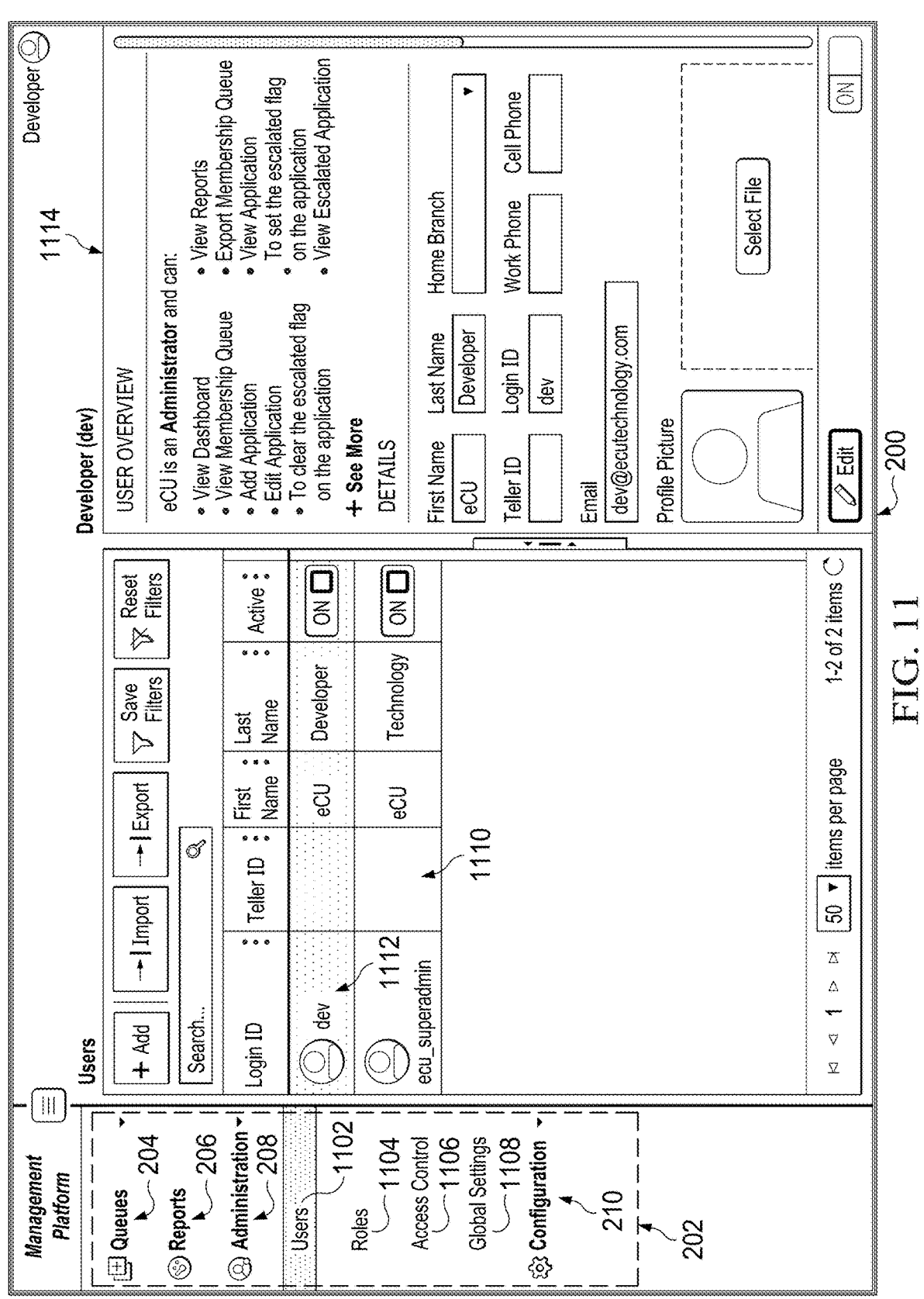
FIG. 11 is an illustration of the backend user interface from FIG. 2 in accordance with one or more embodiments.

FIG. 11 is an illustration of backend user interface 200 from FIG. 2 in accordance with one or more embodiments. In FIG. 11, administration option 208 has been expanded. Administration option 208, when expanded, includes a plurality of sub-options that include users sub-option 1102, roles sub-option 1104, access control sub-option 1106, global settings sub-option 1108, and/or one or more other sub-options.

Users sub-option 1102 is currently selected. The selection of users sub-option 1102 causes user listing 1110 to be presented within backend user interface 200. User listing 1110 identifies the various user accounts for those users who can access management platform 110 and thereby backend user interface 200. Any one of the user accounts identified in user listing 1110 may be selected to allow more detailed information for that user account to be viewed and/or edited.

For example, the selection of user account 1112 causes information about user account 1112 to be displayed within user information section 1114. User information section 1114 provides information about the corresponding user account, the various permissions and/or capabilities for the user account, a name for the user account, a login identifier for the user account, contact information (e.g., email) for the user account, a picture for the user account, and/or other information. User information section 1114 also allows the details for a user account to be edited.

Figure 12:
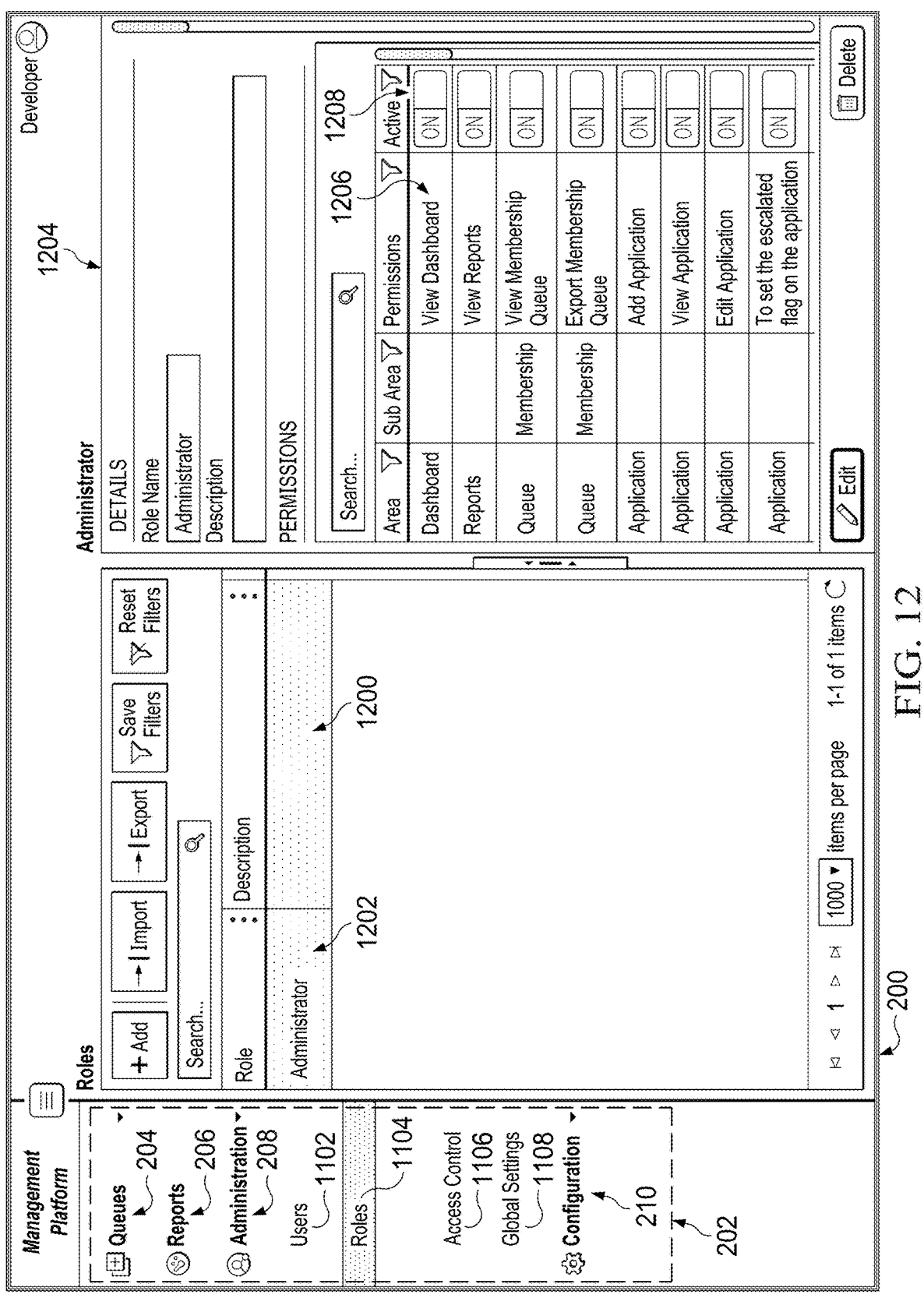
FIG. 12 is another illustration of the backend user interface from FIG. 11 in accordance with one or more embodiments.

FIG. 12 is an illustration of backend user interface 200 from FIG. 11 in accordance with one or more embodiments. In FIG. 12, roles sub-option 1104 has been selected. The selection of roles sub-option 1104 causes role listing 1200 to be presented within backend user interface 200. Role listing 1200 identifies the various types of roles that may be held by a given user. Each of these roles may be assigned different permissions and/or capabilities with respect to management platform 110, application platform 108, or both.

For example, role 1202 identified in role listing 1200 may be selected. This selection causes information about role 1202 to be displayed within role definition section 1204. Role definition section 1204 may include permissions 1206 and active controls 1208. Permissions 1206 identify the various types of permissions that could be assigned to a given role. Active controls 1208 are used to determine which of those permissions to activate and which to make inactive or deactivate.

Figure 13:
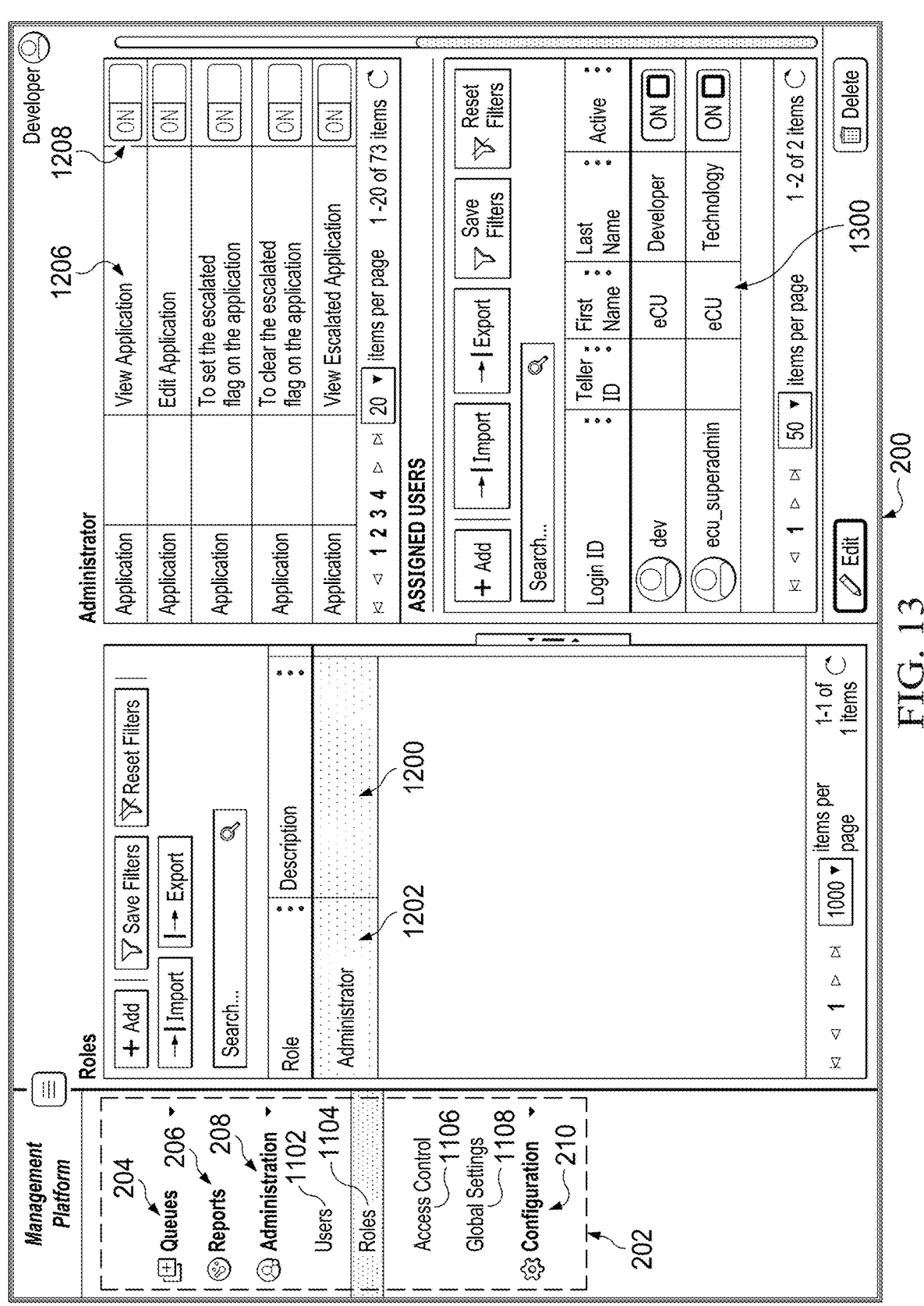
FIG. 13 is another illustration of the backend user interface from FIGS. 11-12 in accordance with one or more embodiments.

FIG. 13 is an illustration of backend user interface 200 from FIGS. 11-12 in accordance with one or more embodiments. In FIG. 13, another portion of role definition section 1204 is viewed. In addition to permissions 1206 and active controls 1208, role definition section 1204 may further include an assignments section 1300. Assignments section 1300 identifies those user account that have been assigned to the currently selected role.

Figure 14:
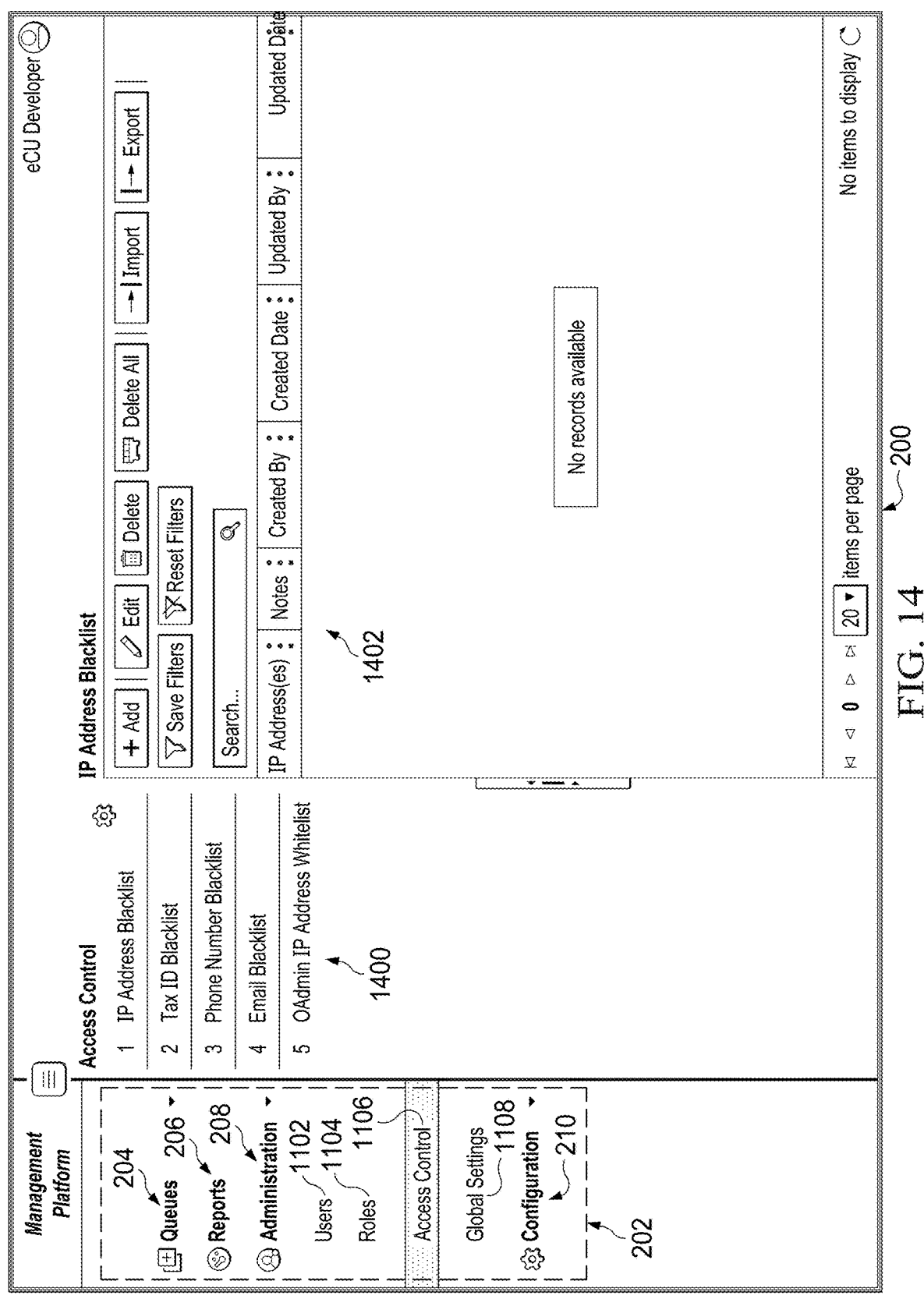
FIG. 14 is another illustration of the backend user interface from FIGS. 11-13 in accordance with one or more embodiments.

FIG. 14 is an illustration of backend user interface 200 from FIGS. 11-13 in accordance with one or more embodiments. In FIG. 14, access control sub-option 1106 has been selected. The selection of access control sub-option 1106 causes access control menu 1400 to be displayed. A user may select any of the options provided in access control menu 1400 to limit the access of applicant, financial institution agents, and/or other types of users to management platform 110 via backend user interface 200, application platform 108 via frontend user interface 112, or both.

In one or more embodiments, access control menu 1400 includes the following options: IP address blacklist, tax ID blacklist, phone number blacklist, email blacklist, and an administrator (e.g., OAdmin) IP address whitelist. The different blacklists limit access, while the whitelist allows access. A selection of one of the options within access control menu 1400 causes the corresponding "list" (e.g., blacklist or whitelist) to be displayed within access control information section 1402. These lists may then be modified within access control information section 1402. For example, a particular IP address, tax ID, phone number, or email may be added to the respective blacklist to prevent that particular IP address, tax ID, phone number, or email, respectively, from gaining access to application platform 108, management platform 110, or both. As another example, a particular IP address may be added to the administrator IP address whitelist to allow a user having that particular IP address administrative level access to application platform 108, management platform 110, or both.

Figure 15:
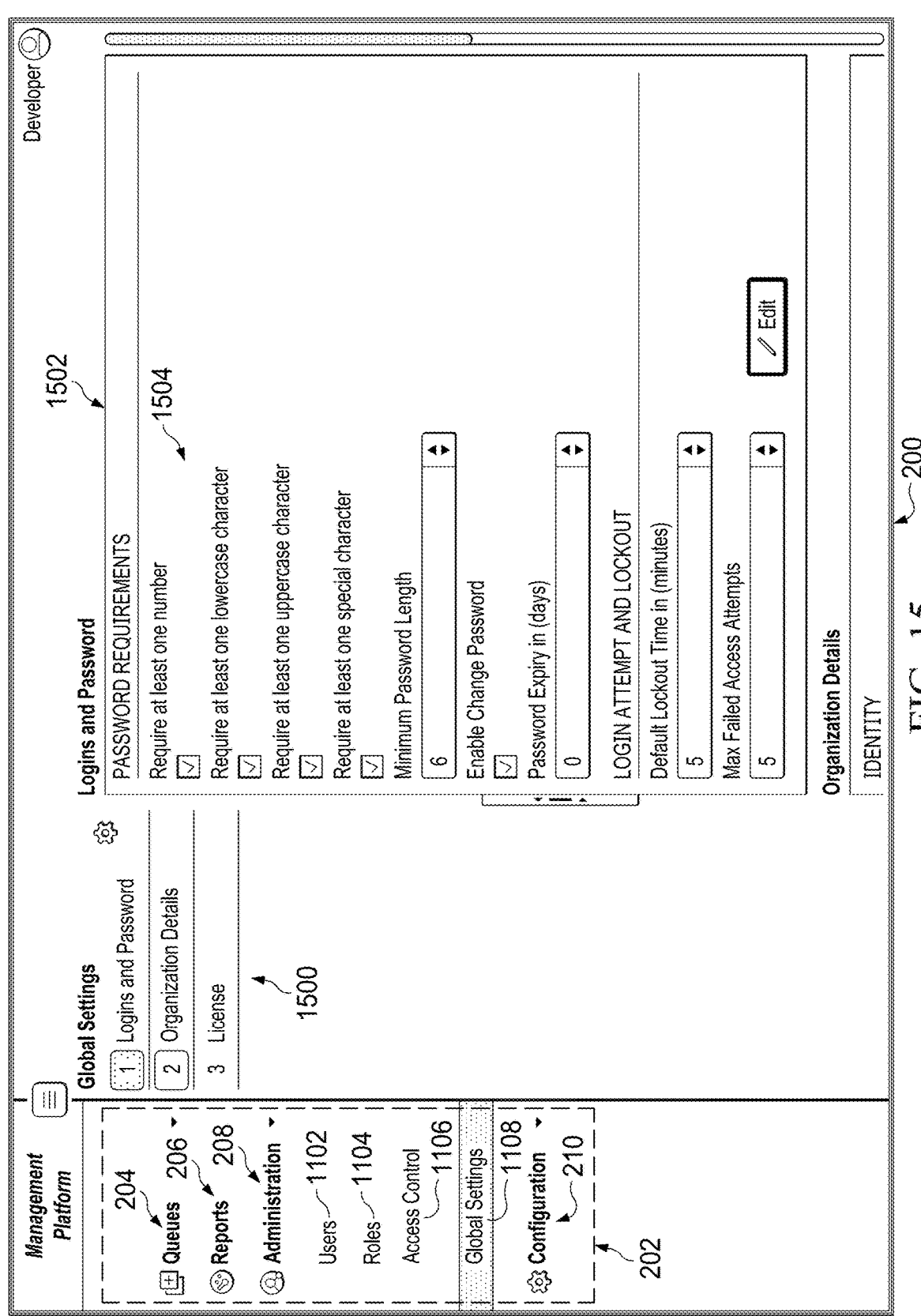
FIG. 15 is another illustration of the backend user interface from FIGS. 11-14 in accordance with one or more embodiments.

FIG. 15 is an illustration of backend user interface 200 from FIGS. 11-14 in accordance with one or more embodiments. In FIG. 15, global settings sub-option 1108 has been selected. The selection of global settings sub-option 1108 causes global settings navigator 1500 to be displayed. A user may navigate to any of the options identified in global settings navigator 1500 by selecting such an option or scrolling within settings section 1502 to customize one or more global settings for application platform 108, management platform 110, or both. Settings section 1502 includes logins and password section 1504 that allows the user to modify the requirements for logins and/or passwords needed for access to application platform 108, management platform 110, or both.

Figure 16:
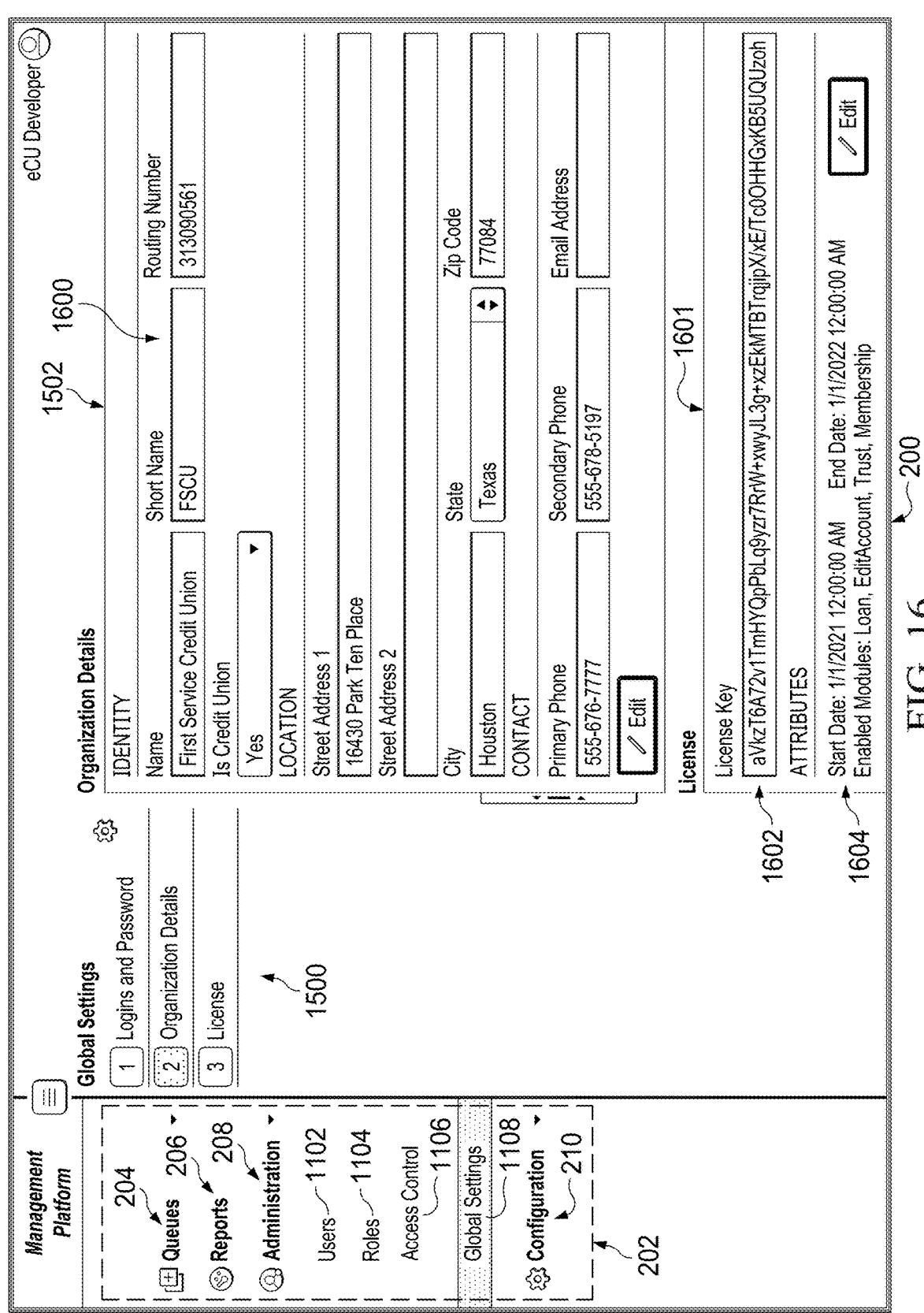
FIG. 16 is another illustration of the backend user interface from FIG. 15 in accordance with one or more embodiments.

FIG. 16 is an illustration of backend user interface 200 from FIG. 15 in accordance with one or more embodiments. In FIG. 16, a different portion of settings section 1502 is shown. Settings section 1502 includes organization details section 1600 and license section 1601. A user may use organization details section 1600 to modify details about financial institution 102. Such details may include, but are not limited to, a name, a short name, a routing number, a location, contact information, and/or other types of information.

License section 1601 may provide details about the license of management platform 110 to financial institution 102. For example, license section 1601 may identify the license key 1602 that provides financial institution 102 with authorized access to management platform 110 and thereby backend user interface 200. License section 1601 may also include attribute information 1604 about the license. Such attribute information may identify, for example, the types of workflows or modules that have been enabled within the version of backend user interface 200 licensed to financial institution 102.

Figure 17:
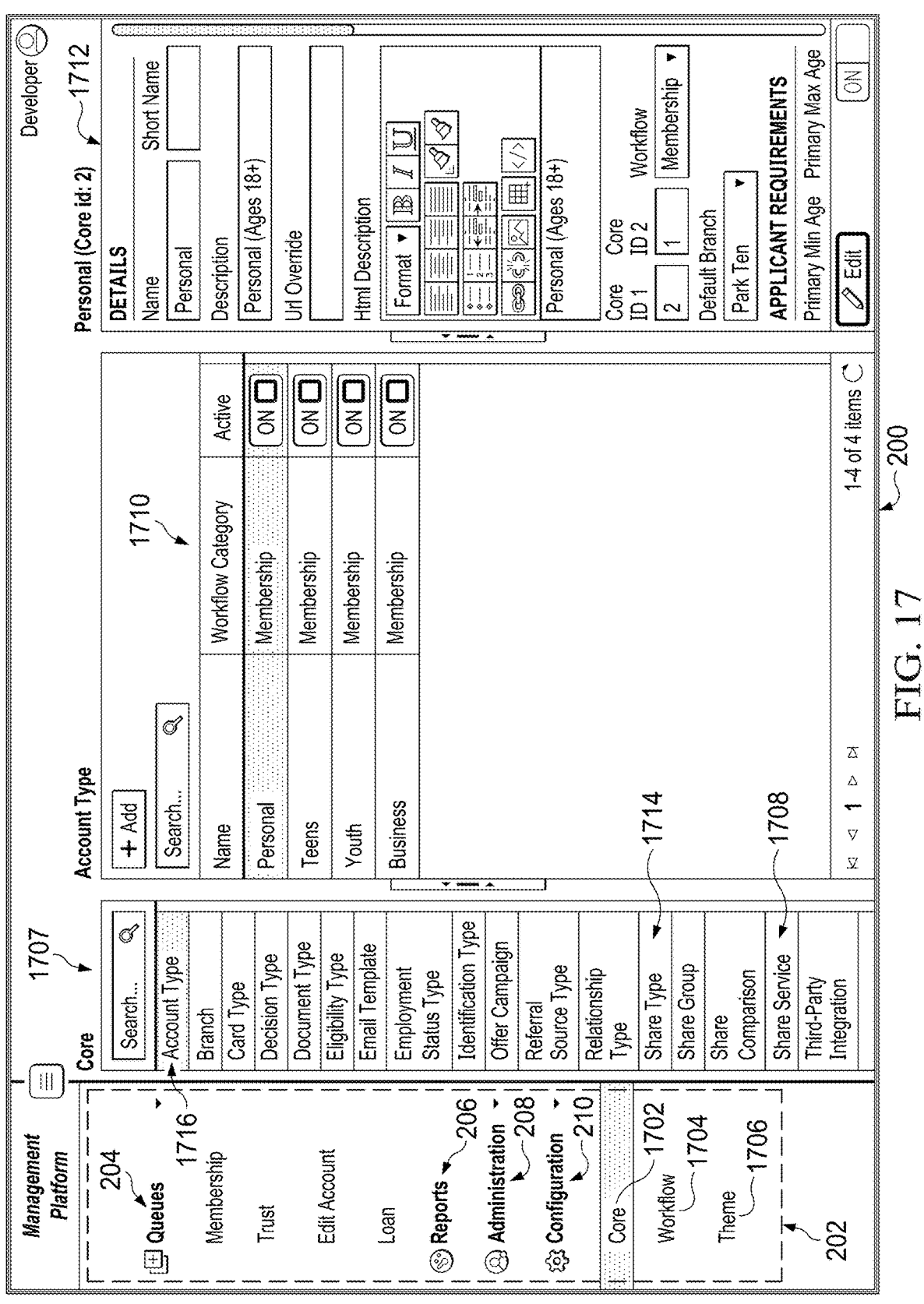
FIG. 17 is an illustration of the backend user interface from FIG. 2 in accordance with one or more embodiments.

FIG. 17 is an illustration of backend user interface 200 from FIG. 2 in accordance with one or more embodiments. In FIG. 17, configuration option 210 has been expanded. Configuration option 210, when expanded, includes a plurality of sub-options that include framework sub-option 1702 ("core"), workflow sub-option 1704, theme sub-option 1706, and/or one or more other sub-options.

Framework sub-option 1702, which may also be referred to as a core sub-option, is currently selected. The selection of framework sub-option 1702 presents framework tool 1707 to the user that the user can then use to customize the application framework of application platform 108. Framework tool 1707 may be one example of an implementation for framework tool 118 in FIG. 1. For example, framework tool 1707 may include framework section 1708, selected feature section 1710, and details section 1712.

Framework section 1708, which may be also referred to as a core section, includes plurality of framework features 1714, each of which may be customizable. Plurality of framework features 1714 may include, for example, account type 1716, which controls the types of accounts (e.g., membership accounts) that can be applied for via application platform 108. When account type 1716 is selected, selected feature section 1710 may display a list of predefined account types. The user may select a set of account types from the list of predefined account types. For example, the user may deselect (e.g., deactivate) an account type included in a default set of account types, select (e.g., activate) a new account type from the list of predefined account types not included in the default set of account types, or both. The user may add a new account type to the list of predefined account types and, for example, select (e.g., activate) the new account type. Details about each of the different account types may be customized in details section 1712.

Figure 18:
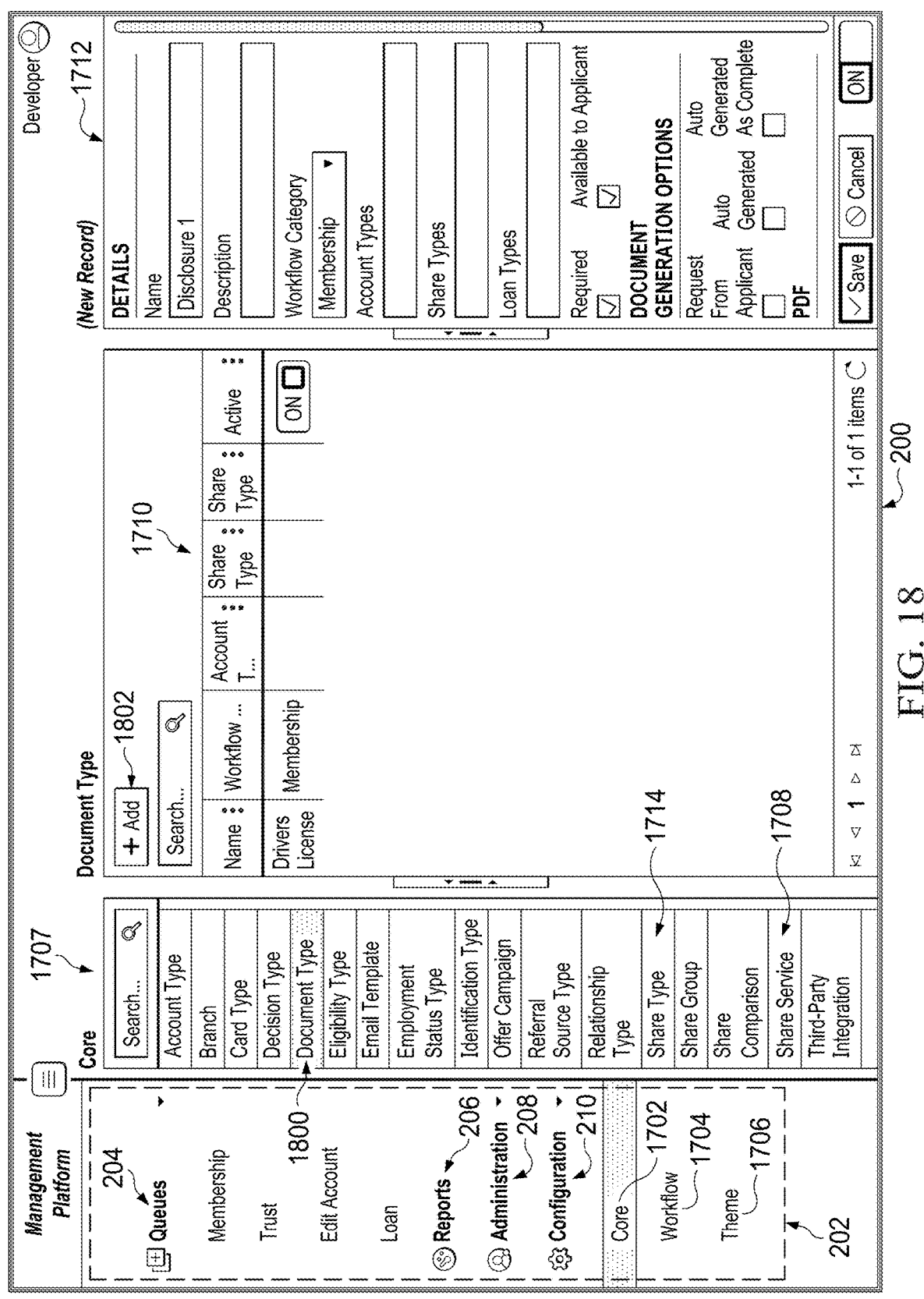
FIG. 18 is another illustration of the backend user interface from FIG. 17 in accordance with one or more embodiments.

FIG. 18 is an illustration of backend user interface 200 from FIG. 17 in accordance with one or more embodiments. In FIG. 18, document type 1800 of plurality of framework features 1714 has been selected. Document type 1800 controls the types of documents that can be uploaded to, imported into, and/or generated using application platform 108. The different types of document types already supported may be shown in selected feature section 1710. Details about a given document may be viewed within details section 1712.

The user may, for example, create a new document type using add control 1802, which creates a new document type record, the details of which can be customized within details section 1712. For example, a user may upload a PDF template of a document via details section 1712. When the PDF template of the document has a format that is compatible with management platform 110, management platform

110 may be able to seamlessly incorporate the document and associate various fields within the document with the database housing application data.

Figure 19:
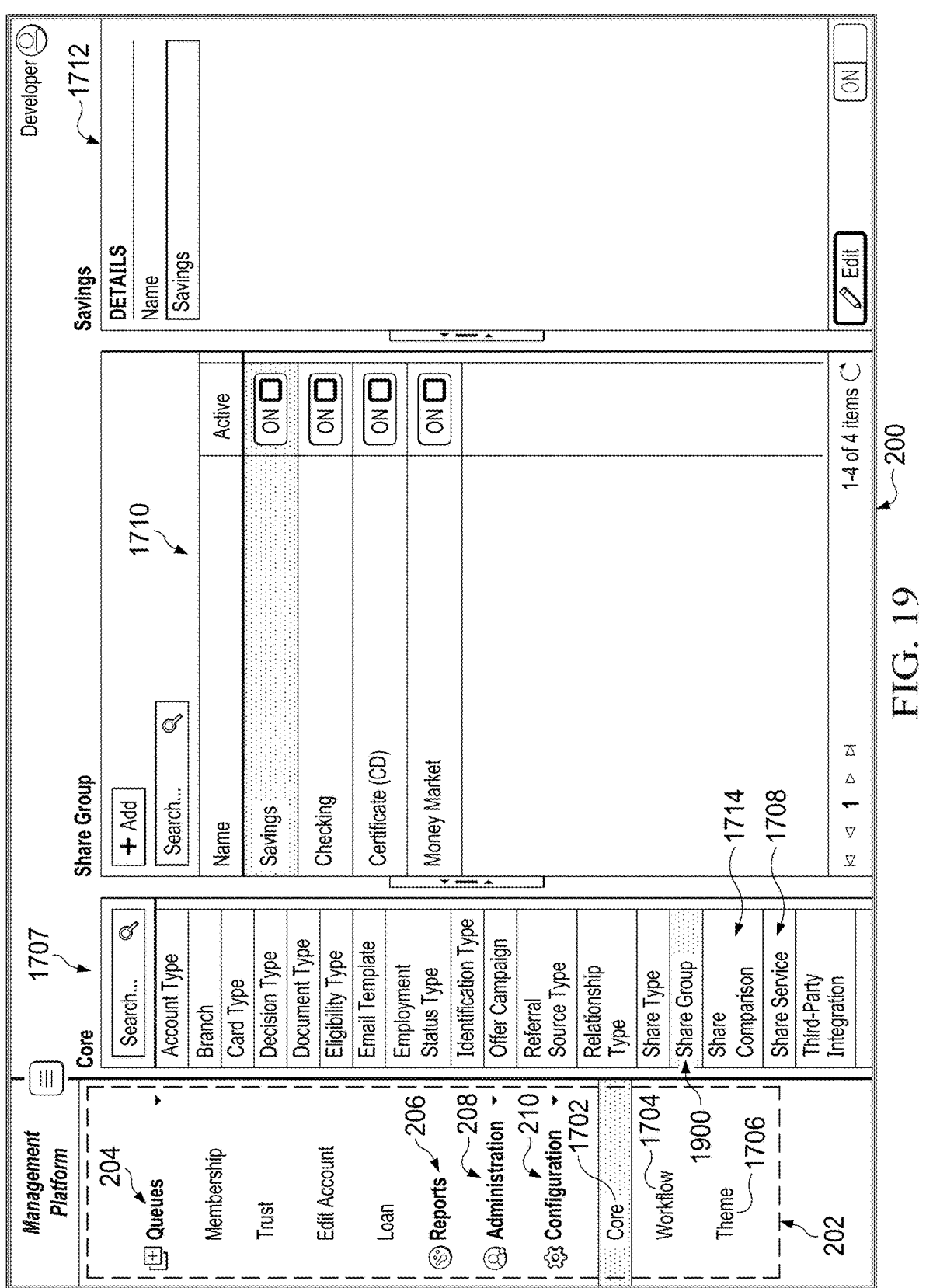
FIG. 19 is another illustration of the backend user interface from FIGS. 17-18 in accordance with one or more embodiments.

FIG. 19 is an illustration of backend user interface 200 from FIGS. 17-18 in accordance with one or more embodiments. In FIG. 19, product group (which may be also referred to as share group) 1900 of plurality of framework features 1714 has been selected. Product group 1900 controls the different groups (or categories) of products that may be offered via application platform 108. Each product group or category may itself include different types of products.

The different types of product groups available may be shown in selected feature section 1710. As one example, the product groups may include a savings group, a checking group, a certificate of deposit (CD) group, a money market group, and/or one or more other types of product groups. A user may select a set of product groups from the list of predefined product groups shown in selected feature section 1710. The user may, for example, modify a default set of product groups by deselecting (e.g., deactivating) a product group of the default set of product groups, selecting (e.g., activating) a product group in the list of predefined product groups that was not already present in the default set of product groups, or both. The user may, for example, add a new product group, providing details about the new product group in details section 1712. Details section 1712 may also be used to modify the details of one or more product groups.

Figure 20:
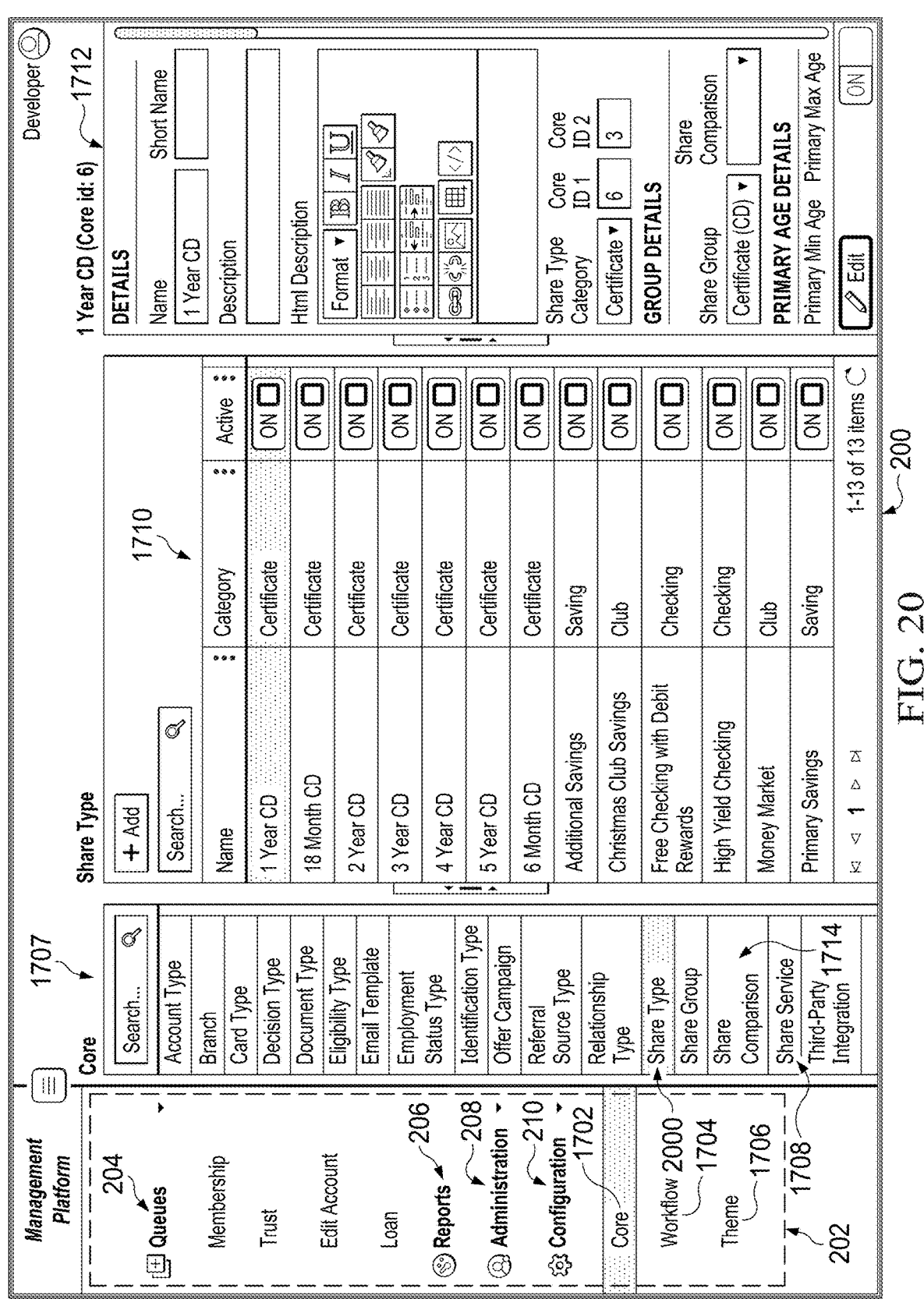
FIG. 20 is another illustration of the backend user interface from FIGS. 17-19 in accordance with one or more embodiments.

FIG. 20 is an illustration of backend user interface 200 from FIGS. 17-19 in accordance with one or more embodiments. In FIG. 20, product type (which may be also referred to as share type) 2000 of plurality of framework features 1714 has been selected. Product type 2000 controls the different types of financial products that may be offered via application platform 108. Each product type may, for example, belong to a corresponding one of the product groups described above with respect to FIG. 19.

The different types of products available may be shown in selected feature section 1710. As one example, the product types may include one or more savings accounts, one or more checking accounts, one or more money market accounts, one or more CDs, one or more loans, one or more trusts, and/or one or more other types of products.

A user may select a set of financial products from the list of predefined product types shown in selected feature section 1710. The list of predefined product types may include, for example, at least three selected from a group consisting of a checking account, a savings account, a money market account, a CD, a loan, or a trust. The user may, for example, modify a default set of financial products by deselecting (e.g., deactivating) a financial product of the default set of financial products, selecting (e.g., activating) a financial product in the list of predefined product groups that was not already present in the default set of financial products, or both. The user may, for example, add a new financial product, providing details about the new financial product in details section 1712. Details section 1712 may also be used to modify the details of one or more financial products.

Figure 21:
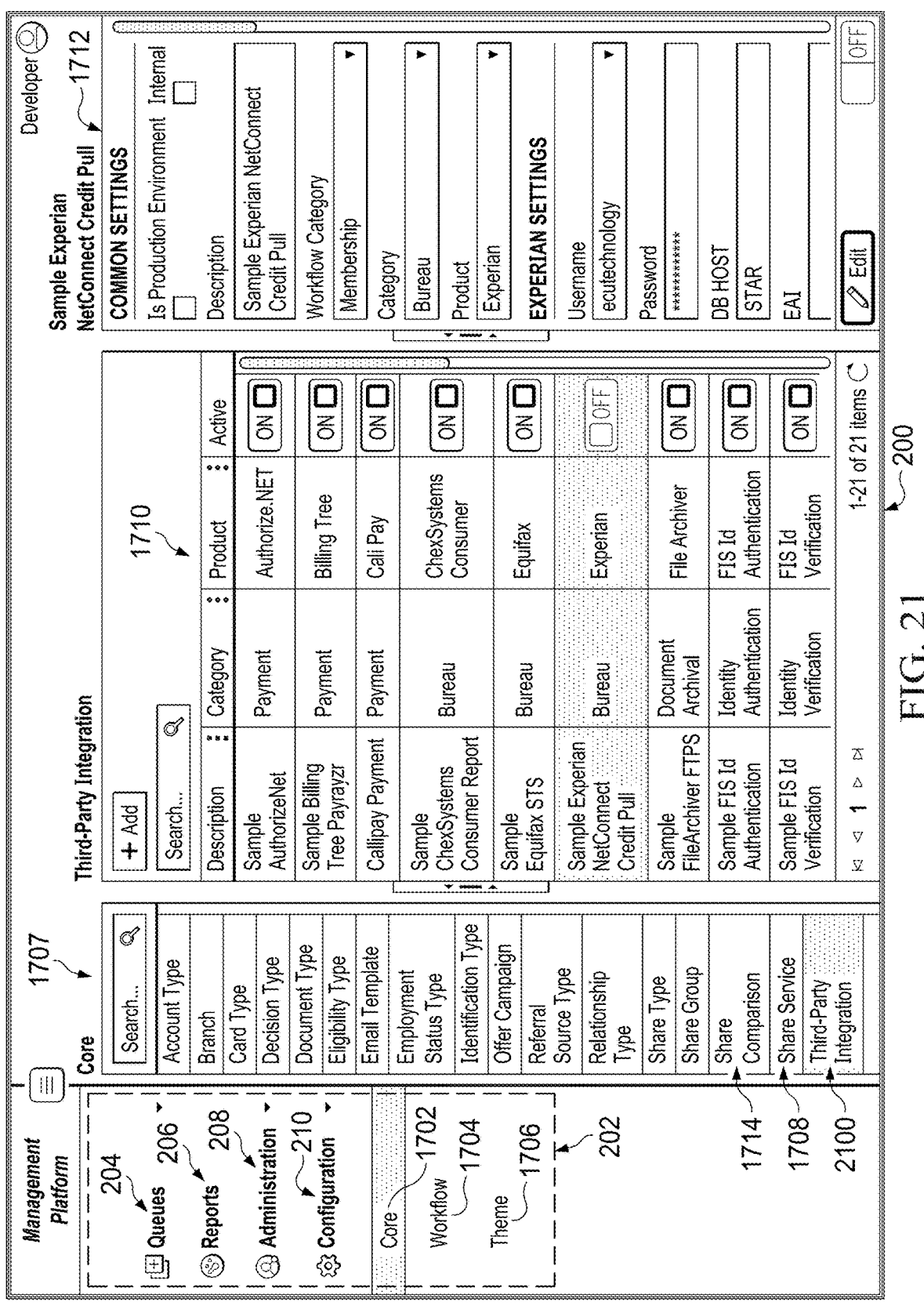
FIG. 21 is another illustration of the backend user interface from FIGS. 17-20 in accordance with one or more embodiments.

FIG. 21 is an illustration of backend user interface 200 from FIGS. 17-20 in accordance with one or more embodiments. In FIG. 21, third party integration 2100 of plurality of framework features 1714 has been selected. Third party integration 2100 controls the different types of third party services that may be accessible or set up for communication with application platform 108. The different types of third party services available may be shown in selected feature section 1710. The third party services may include, for example, but are not limited to, various types of credit reporting agencies, payment agencies, identity verification services, and/or other types of third party services. In one or more embodiments, a user may deselect and/or select various third party services and/or modify the details of various third party services to customize a default set of third party services selected from a list of predefined third party services. In one or more embodiments, the user may add a new third party service and the corresponding details for that third party service.

Figure 22:
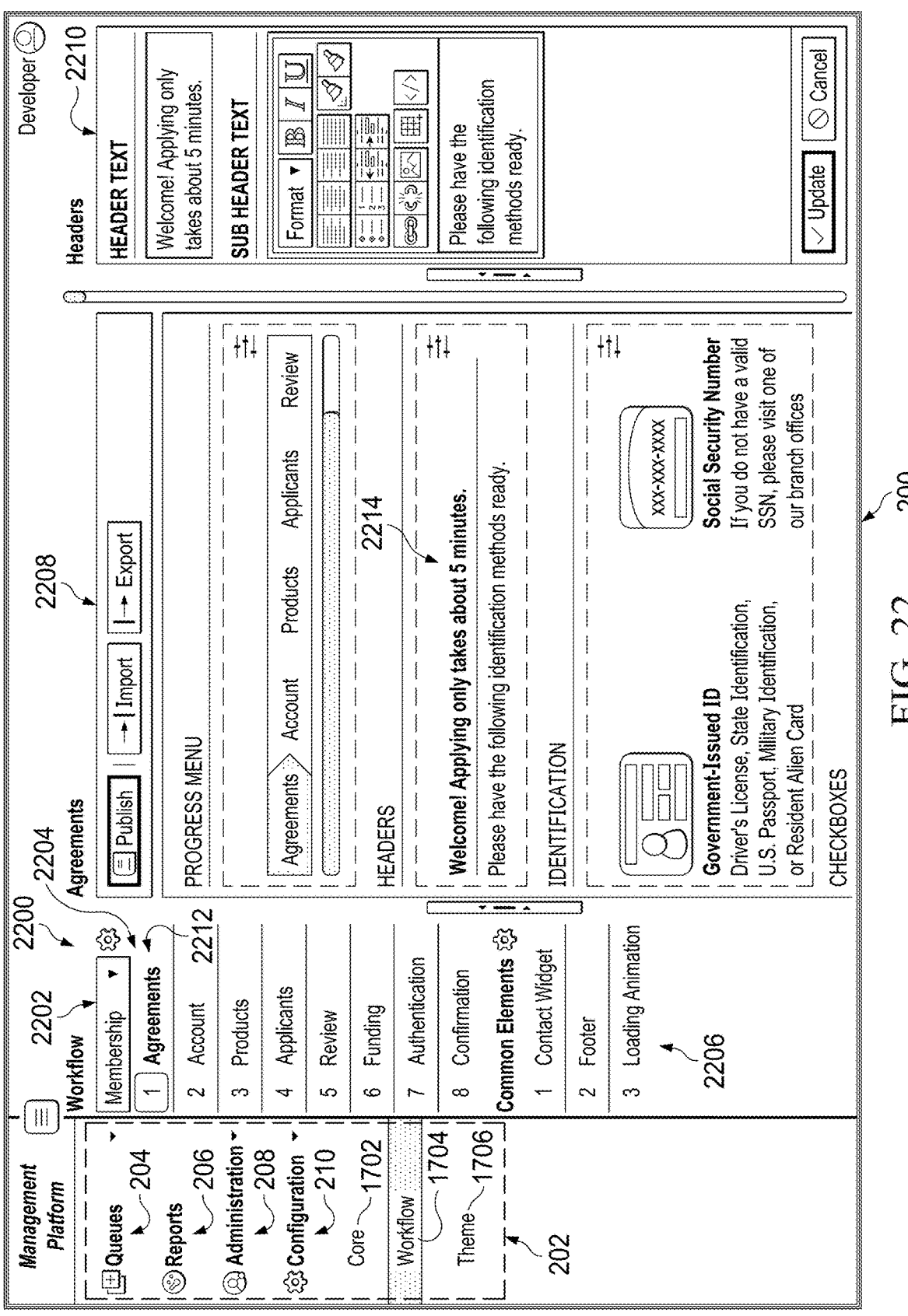
FIG. 22 is another illustration of the backend user interface from FIG. 17 in accordance with one or more embodiments.

FIG. 22 is an illustration of backend user interface 200 from FIG. 17 in accordance with one or more embodiments. In FIG. 22, workflow sub-option 1704, which may also be referred to as a workflow experience sub-option, is currently selected. The selection of workflow sub-option 1704 presents workflow experience tool 2200 to the user that the user can then use to customize the workflow that is presented to an applicant via frontend user interface 112 of application platform 108. Workflow experience tool 2200 may be one example of an implementation for workflow experience tool 120 in FIG. 1.

Workflow experience tool 2200 allows the user to customize an applicant's workflow experience via frontend user interface 112. For example, workflow experience tool 2200 allows the user to customize the visual cues, text, prompts, fields, and/or other pieces of information that direct an applicant through a workflow of an application process via frontend user interface 112 with respect to the various subphases of that workflow.

Workflow experience tool 2200 may include, for example, without limitation, workflow selection control 2202, subphase navigator 2204, common element navigator 2206, subphase experience section 2208, and/or subphase details section 2210. Workflow selection control 2202 allows the user to select the workflow type (e.g., membership, trust, loan, account editing, etc.). For the selected workflow type, subphase navigator 2204 allows the user to navigate to the different subphases corresponding to the workflow. Common element navigator 2206 allows the user to navigate to various elements that are common to the different workflow types. Such common elements may include, for example, a contact widget that appears in frontend user interface 112, a footer that appears in frontend user interface 112, a loading animation that appears in frontend user interface 112, and/or one or more other elements.

Subphase experience section 2208 provides a general architectural preview of the different elements specific to a corresponding subphase. For example, the user may select a subphase via subphase navigator 2204 or may scroll through subphase experience section 2208 to a particular subphase to view the different elements presented in frontend user interface 112 for that subphase. The user may then select any element or element group to view the details of that element or element group in subphase details section 2210. The user may modify these details (e.g., text, font, alignment, graphics, etc.) associated with the element or element group within subphase details section 2210. In this manner, each subphase of a workflow may be fully customizable.

In FIG. 22, agreements subphase 2212 has been selected for customization. In particular, headers 2214 of agreements subphase 2212 has been selected for customization. The user may modify the details for headers 2214 within subphase details section 2210 to change the corresponding display of headers in frontend user interface 112 for the corresponding agreements subphase of the workflow for a membership application.

Figure 23:
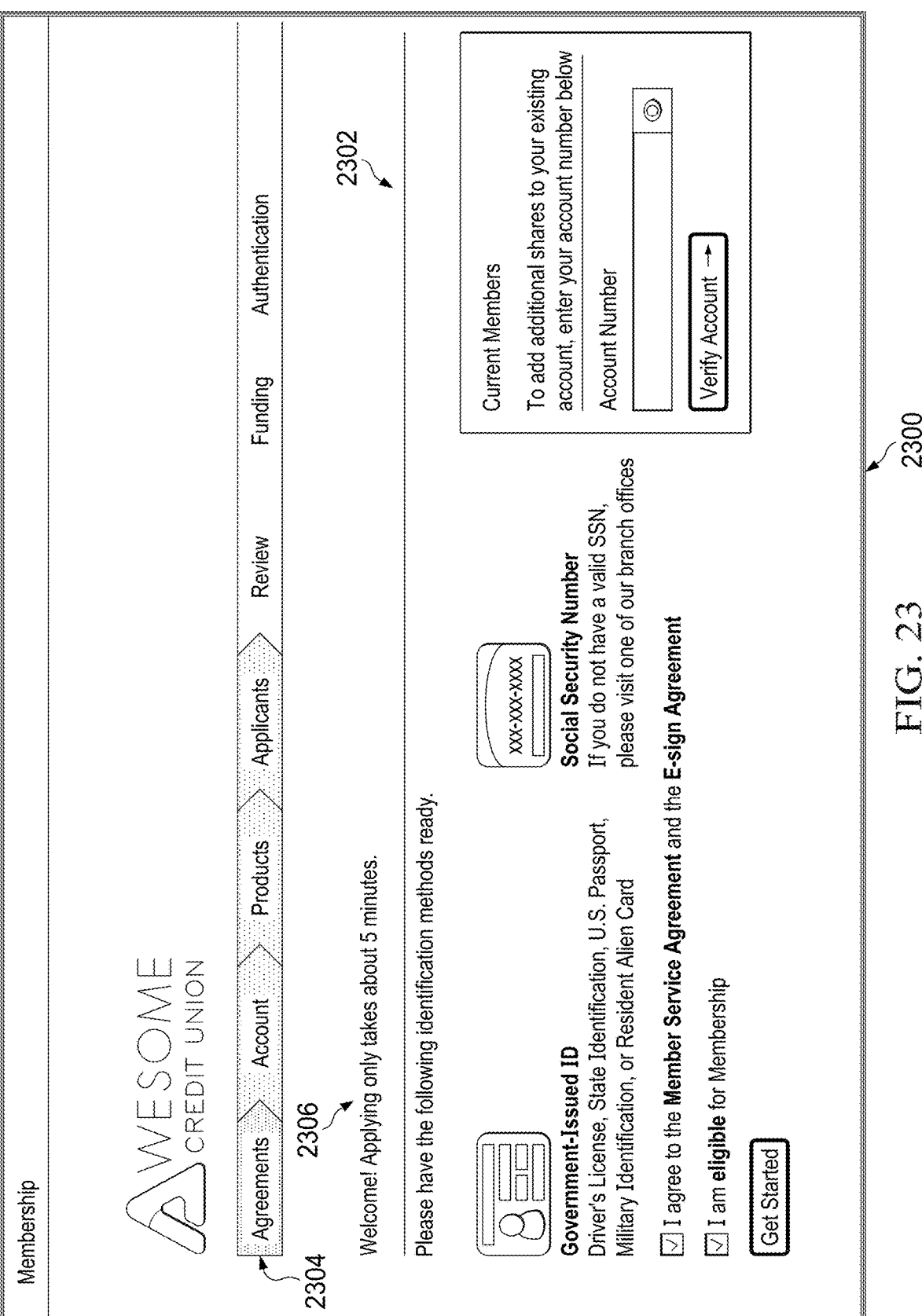
FIG. 23 is an illustration of a frontend user interface in accordance with one or more embodiments.

FIG. 23 is an illustration of a frontend user interface in accordance with one or more embodiments. Frontend user interface 2300 may be one example of an implementation for frontend user interface 112 in FIG. 1. Frontend user interface 2300 is currently displaying page 2302 that corresponds to agreements subphase 2304. Header section 2306 is one example of the type of header(s) that may be customized via headers 2214 in workflow experience tool 2200 in FIG. 22.

Figure 24:
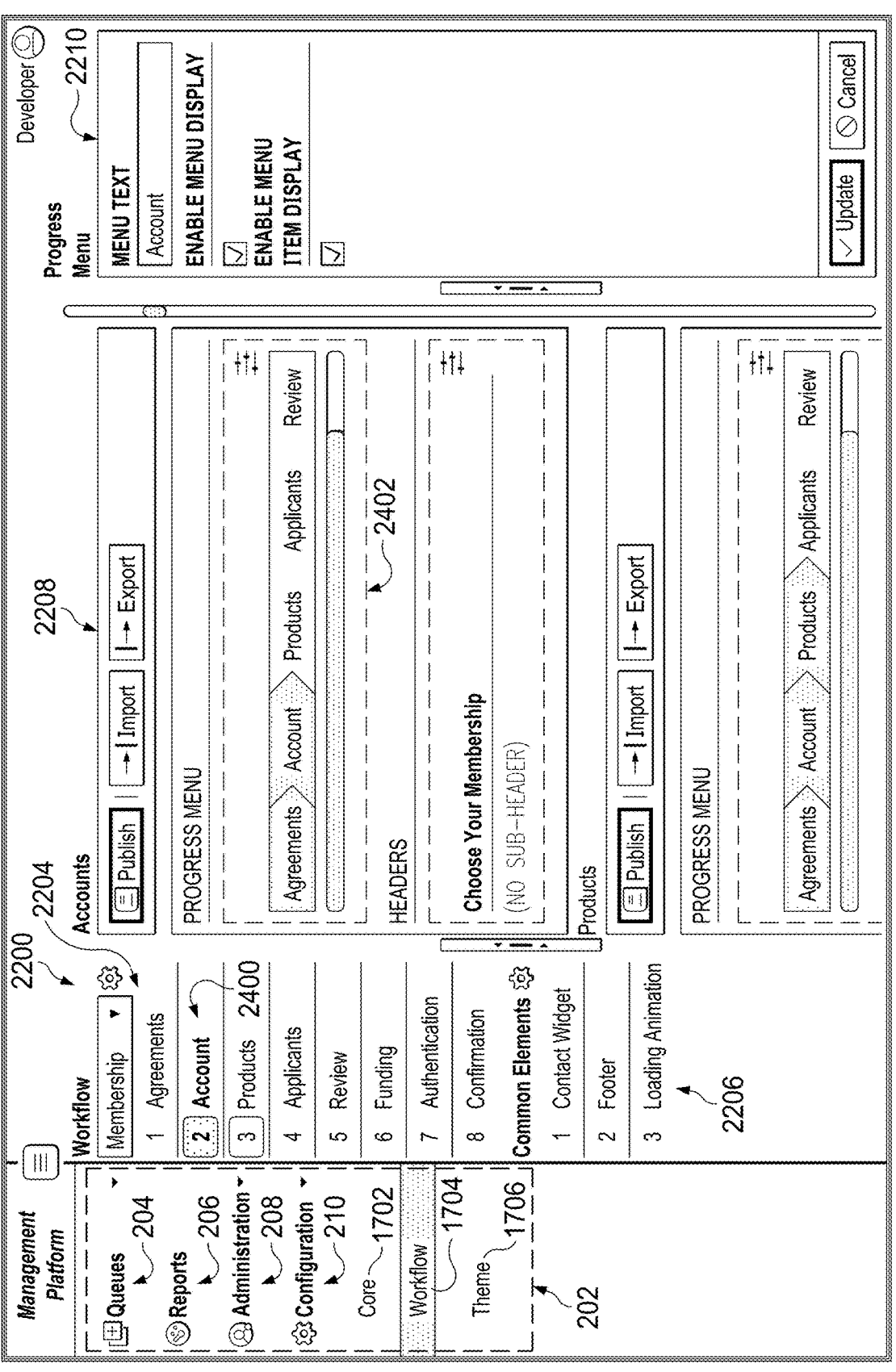
FIG. 24 is another illustration of the backend user interface from FIG. 22 in accordance with one or more embodiments.

FIG. 24 is an illustration of backend user interface 200 from FIG. 22 in accordance with one or more embodiments. In FIG. 24, account subphase 2400 has been selected for customization. In particular, progress menu 2402 of account subphase 2400 has been selected for customization. The user may modify the details for progress menu 2402 within subphase details section 2210 to change the corresponding display of a progress menu in frontend user interface 112 for the corresponding account subphase of the workflow for a membership application.

In some embodiments, workflow experience tool 2200, which may include subphase navigator 2204, of the backend user interface 200 simultaneously displays each subphase of the workflow and highlights which subphase that the user has started, displayed, and/or completed.

For example, progress menu 2402 of backend user interface 200 may simultaneously display each subphase of the workflow and indicate which subphase(s) that the user has started, displayed, and/or completed. For example, progress menu 2402 may graphically indicate (e.g., via color, highlighting, shading, pattern, a symbol, and/or some other type of graphical or visual indicator) the subphase that is being currently displayed on frontend user interface 2300, the current subphase that is being engaged by the applicant, the subphase most recently accessed by the applicant, etc. For example, progress menu 2402 may graphically indicate (e.g., via color, highlighting, shading, pattern, a symbol, and/or some other type of graphical or visual indicator) the subphase that is being currently displayed on frontend user interface 2300, the current subphase that is being engaged by the applicant, the subphase most recently accessed by the applicant, etc. In FIG. 24, progress menu 2402 graphically indicates that an account subphase is the most recent subphase accessed by the applicant. Progress menu 2402 may further graphically distinguish other subphases that have been previously displayed to or engaged by the applicant, whether or not these other subphases are earlier or later than accounts subphase according to progress menu 2402, from subphases that have yet to be displayed to or engaged by the applicant. In some embodiments, progress meu 2402 lists every subphase that is to be completed to finish the membership application and/or application for a financial product.

In one or more embodiments, progress menu 2402 of frontend user interface 2300 provides a technical improvement by visually linking the user to where the applicant is in the application process, visually linking the user to how many more subphases remain to be completed by the applicant, and visually linking backend user interface 200 to frontend user interface 2300.

Figure 25:
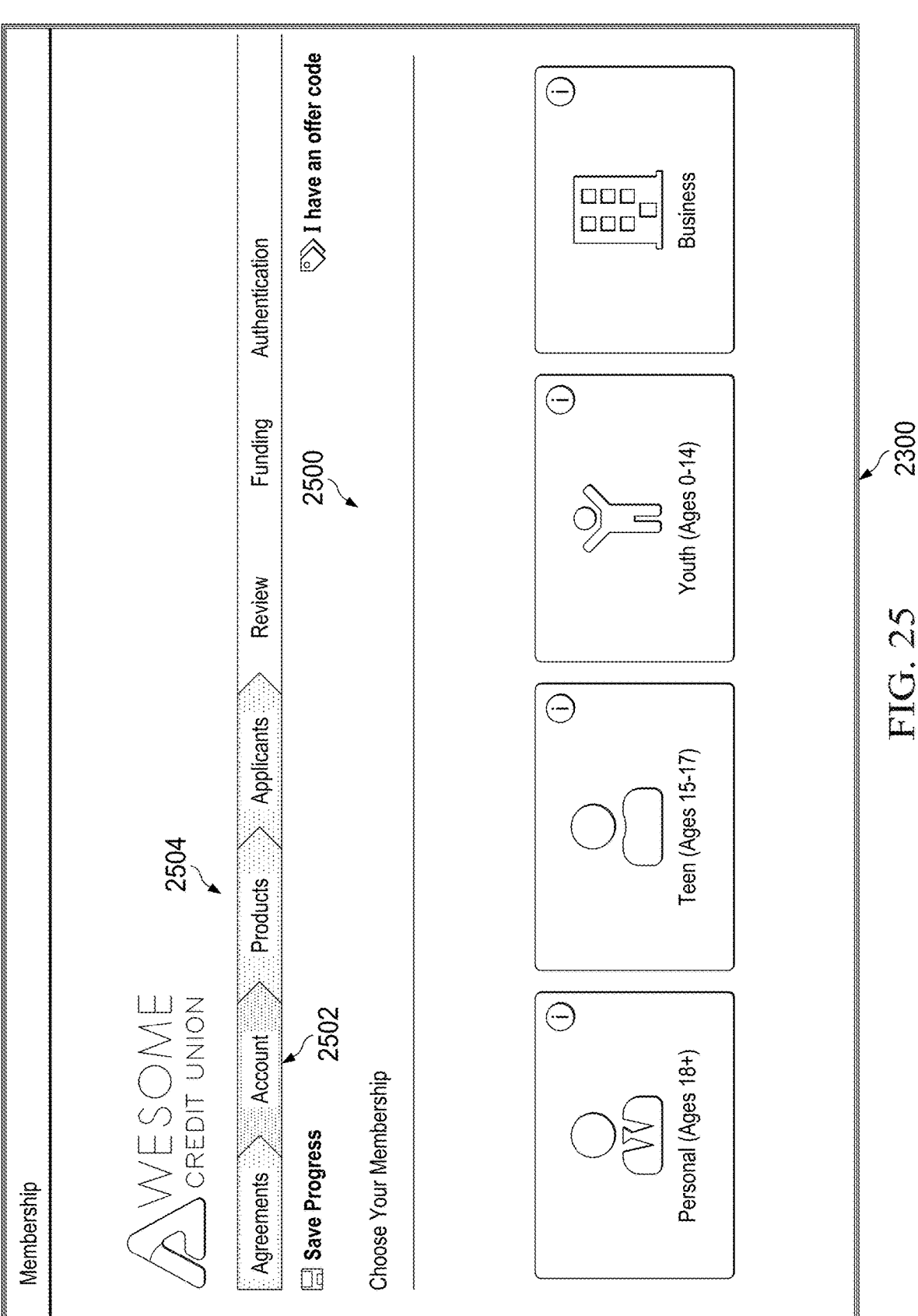
FIG. 25 is another illustration of the frontend user interface from FIG. 23 in accordance with one or more embodiments.

FIG. 25 is an illustration of frontend user interface 2300 from FIG. 23 in accordance with one or more embodiments. Frontend user interface 2300 is currently displaying page 2500 that corresponds to account subphase 2502. Progress menu 2504 is one example of the type of progress menu that may be customized via progress menu 2402 in workflow experience tool 2200 in FIG. 24.

The progress menu 2504 of frontend user interface 2300 may simultaneously display each subphase of the workflow and indicate which subphase(s) that the applicant has started, displayed, and/or completed. For example, progress menu 2504 may graphically indicate (e.g., via color, highlighting, shading, pattern, a symbol, and/or some other type of graphical or visual indicator) the subphase that is being currently displayed on frontend user interface 2300. In FIG. 25, progress menu 2504 graphically indicates that account subphase 2502 is the current subphase being displayed. Progress menu 2504 further graphically distinguishes other subphases (e.g., such as agreements subphase 2304) that have been previously displayed to or engaged by the applicant, whether these other subphases are earlier or later than accounts subphase 2502 according to progress menu 2504, from subphases that have yet to be displayed to or engaged by the applicant. In some embodiments, progress meu 2504 lists every subphase that is to be completed to finish the membership application and/or application for a financial product.

In one or more embodiments, progress menu 2504 of frontend user interface 2300 provides a technical improvement over conventional systems by visually linking the user to where the applicant is in the application process, visually linking the applicant to how many more subphases remain to be completed, and visually linking the frontend user interface 2300 to the backend user interface 200 (e.g., such as to progress menu 2402 in FIG. 24).

Figure 26:
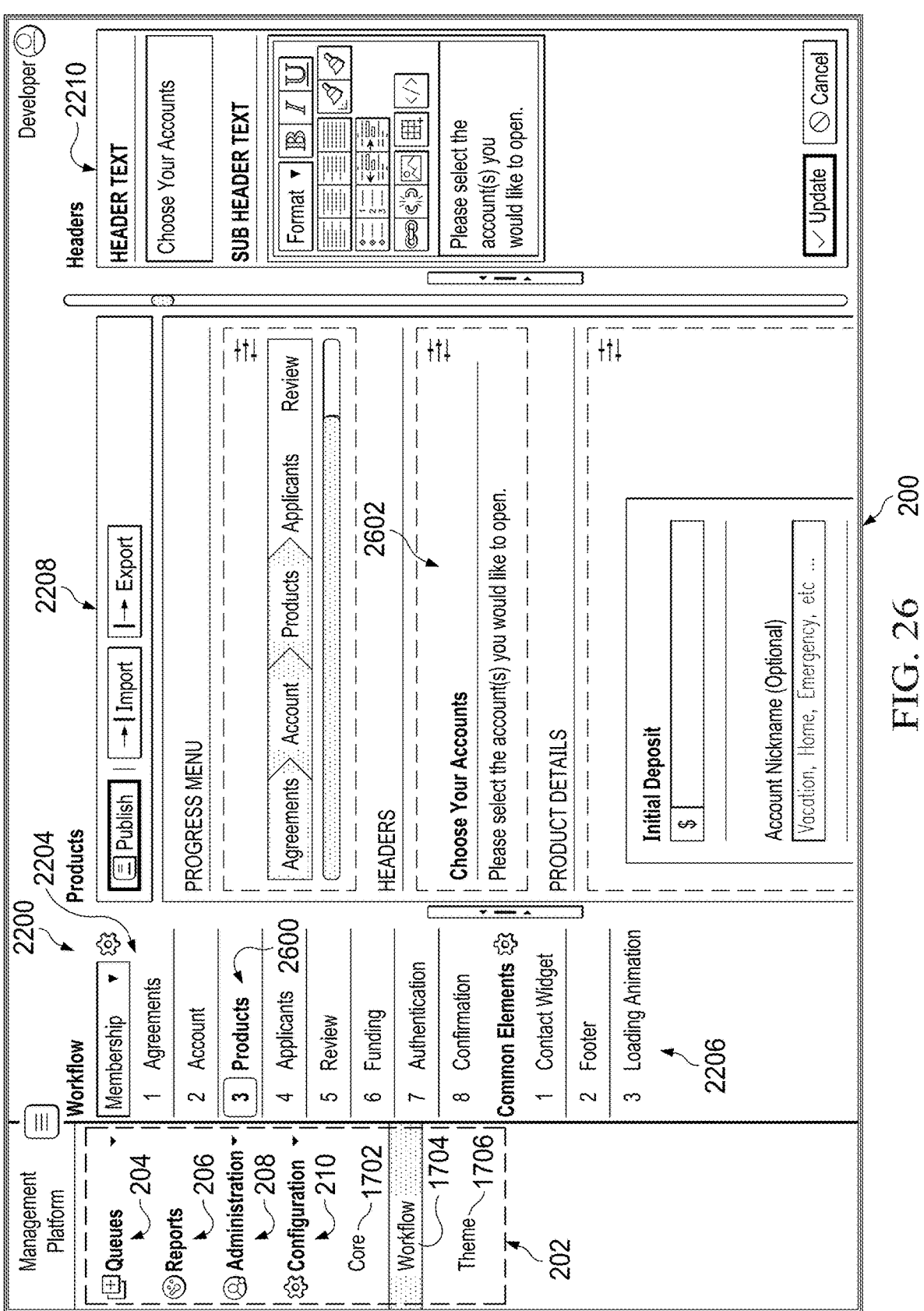
FIG. 26 is another illustration of the backend user interface from FIG. 22 in accordance with one or more embodiments.

FIG. 26 is an illustration of backend user interface 200 from FIG. 22 in accordance with one or more embodiments. In FIG. 26, products subphase 2600 has been selected for customization. In particular, headers 2602 of products subphase 2600 has been selected for customization. The user may modify the details for headers 2602 within subphase details section 2210 to change the corresponding display of one or more headers in frontend user interface 112 for the corresponding products subphase of the workflow for a membership application.

Figure 27:
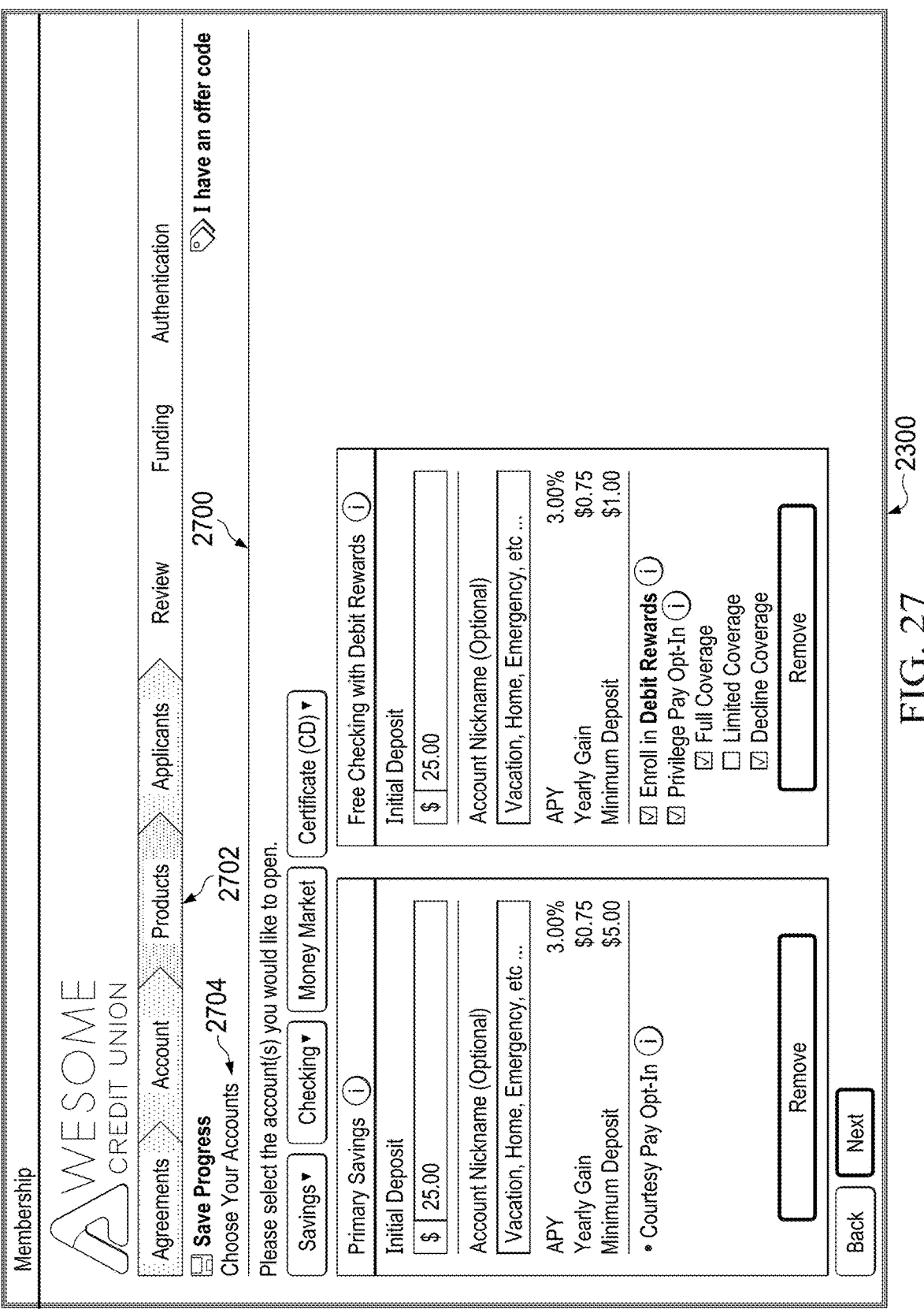
FIG. 27 is another illustration of the frontend user interface from FIG. 23 in accordance with one or more embodiments.

FIG. 27 is an illustration of frontend user interface 2300 from FIG. 23 in accordance with one or more embodiments. Frontend user interface 2300 is currently displaying page 2700 that corresponds to products subphase 2702. Header section 2704 is one example of the type of header(s) that may be customized via headers 2602 in workflow experience tool 2200 in FIG. 26.

Figure 28:
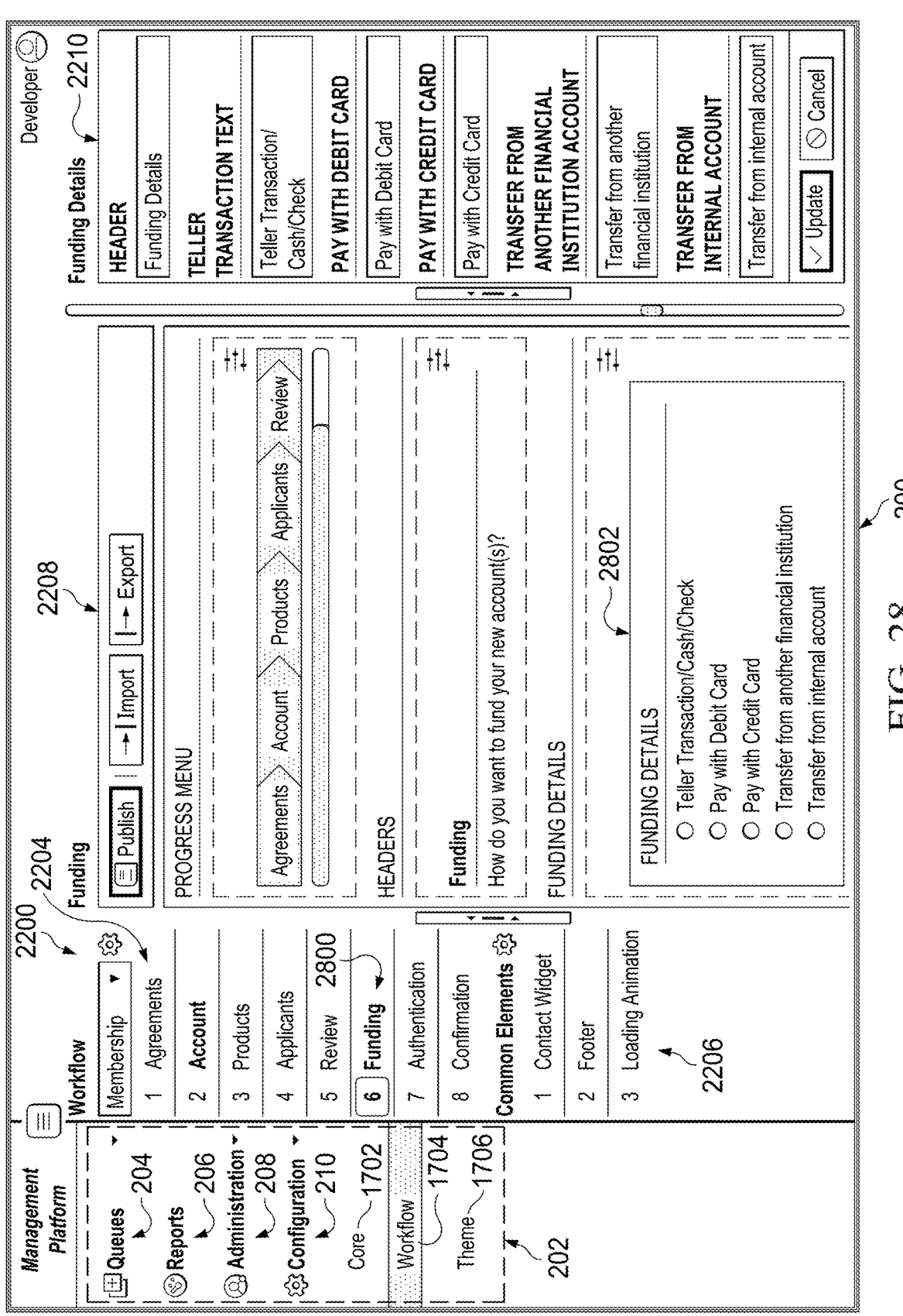
FIG. 28 is another illustration of the backend user interface from FIG. 22 in accordance with one or more embodiments.

FIG. 28 is an illustration of backend user interface 200 from FIG. 22 in accordance with one or more embodiments. In FIG. 28, funding subphase 2800 has been selected for customization. In particular, funding details 2802 for funding subphase 2800 has been selected for customization. The user may modify the various details of funding details 2802 within subphase details section 2210 to change the corresponding display of funding details in frontend user interface 112 for the corresponding funding subphase of the workflow for a membership application.

Figure 29:
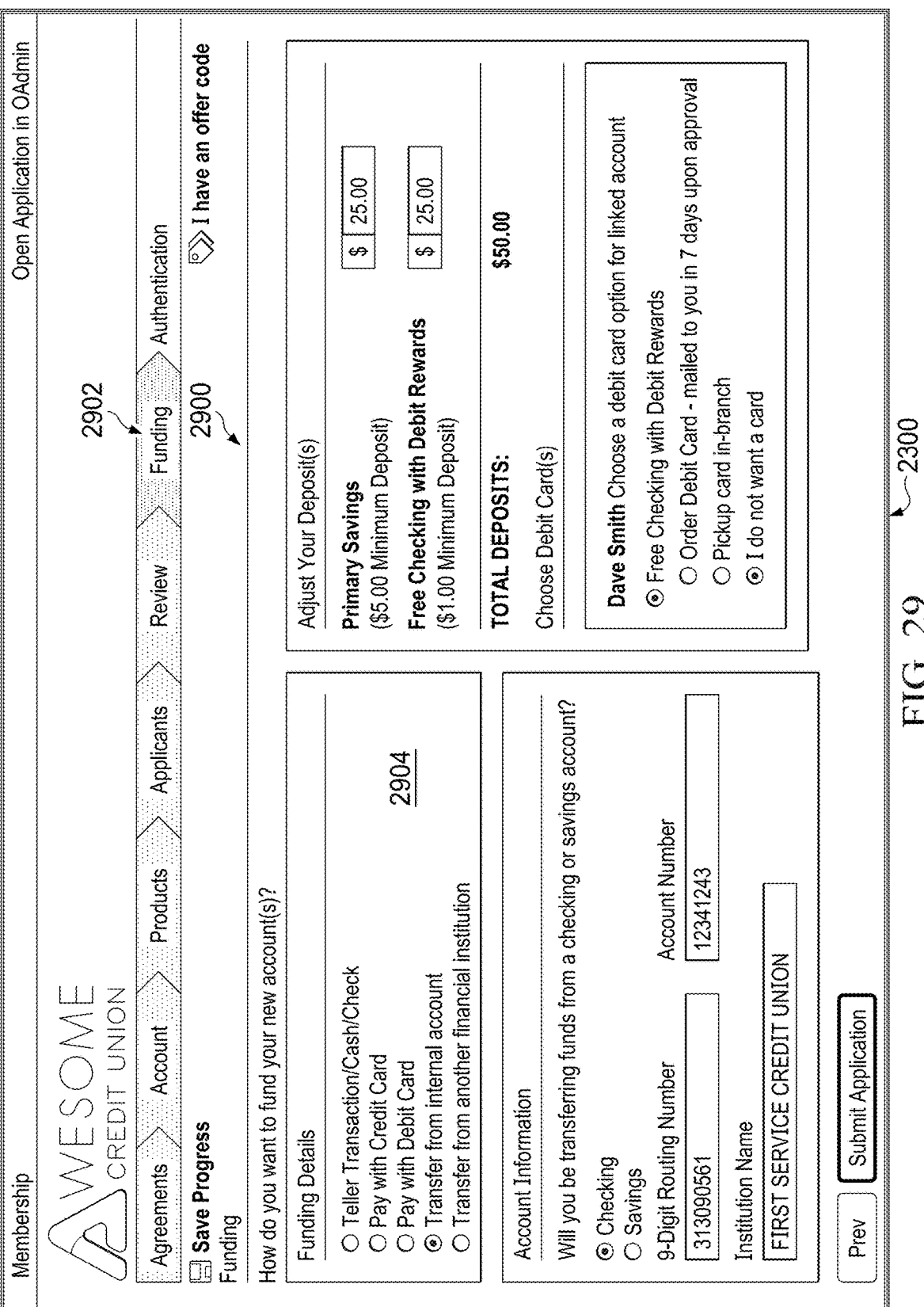
FIG. 29 is another illustration of the frontend user interface from FIG. 23 in accordance with one or more embodiments.

FIG. 29 is an illustration of frontend user interface 2300 from FIG. 23 in accordance with one or more embodiments. Frontend user interface 2300 is currently displaying page 2900 that corresponds to funding subphase 2902. Funding details section 2904 includes details that are one example of the type of details that may be customized via funding details 2802 in workflow experience tool 2200 in FIG. 28.

FIGS. 22, 24, 26, and 28 illustrate examples of the types of elements of a workflow experience that can be customized. However, the embodiments described herein enable other elements to be customized in a similar manner.

Figure 30:
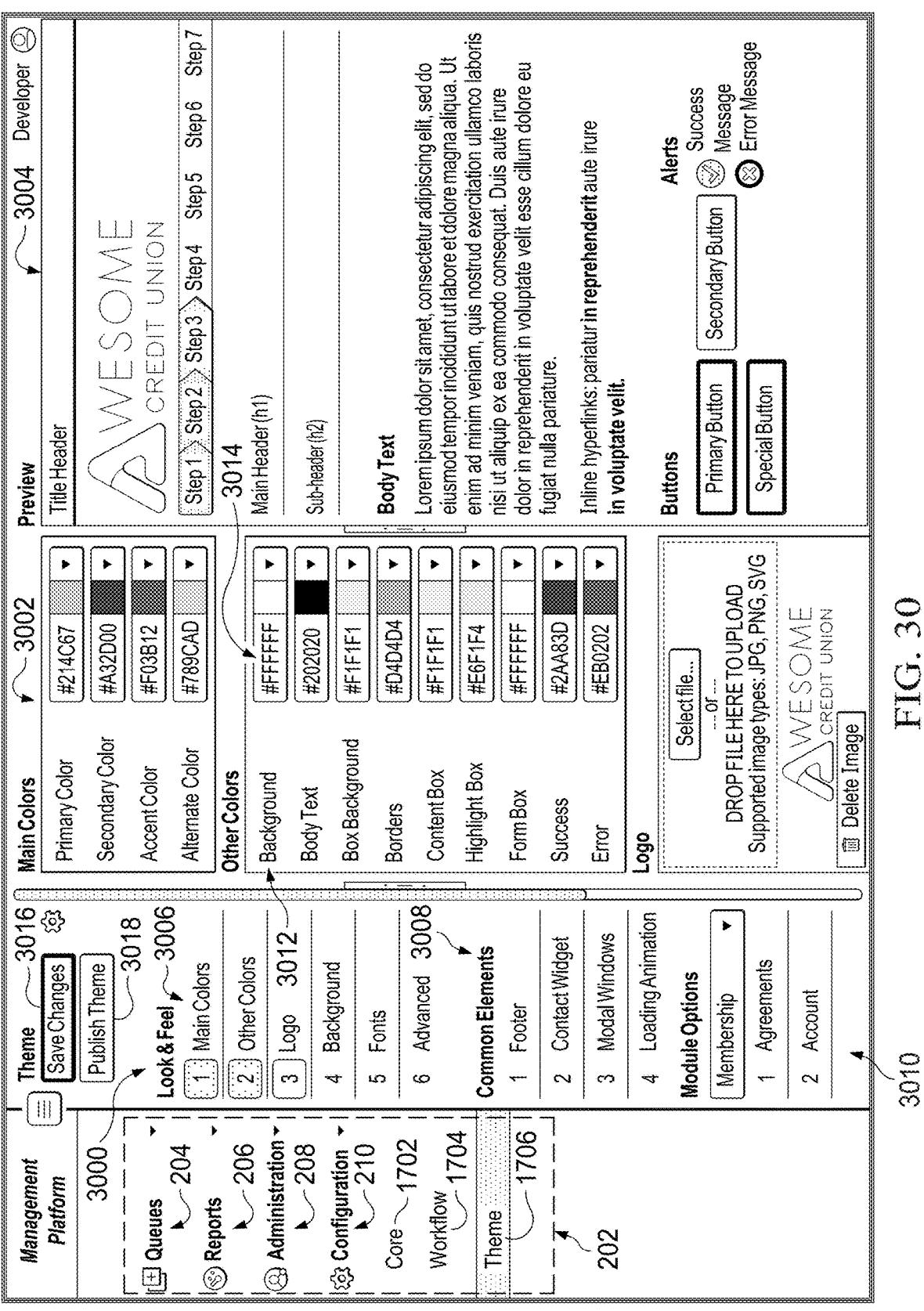
FIG. 30 is another illustration of the backend user interface from FIG. 22 in accordance with one or more embodiments.

FIG. 30 is an illustration of backend user interface 200 from FIG. 17 in accordance with one or more embodiments. In FIG. 30, theme sub-option 1706 is currently selected. The selection of theme sub-option 1706 presents theme tool 3000 to the user that the user can then use to customize the theme that is presented to an applicant via frontend user interface 112 of application platform 108. Theme tool 3000 may be one example of an implementation for theme tool 122 in FIG. 1.

Theme tool 3000 allows the user to customize the appearance of frontend user interface 112 of application platform 108. For example, theme tool 3000 allows the user to customize various characteristics (e.g., colors, logos, font, etc.) that form the overall appearance (e.g., "look and feel") of frontend user interface 112 of application platform 108.

Theme tool 3000 includes characteristic modifier 3002, preview section 3004, look and feel navigator 3006, common elements navigator 3008, and module options navigator 3010. Characteristic modifier 3002 includes various characteristics of the appearance that can be modified. These characteristics may include, for example, main colors (e.g., primary color, secondary color, accent color, etc.), other colors (e.g., background color, body text color, box background color, borders color, success color, error color, etc.), logo, fonts, and/or other types of characteristics. Each of these characteristics may be associated with a value that can be customized. The value for a characteristic that is a color may be, for example, without limitation, a hex code for the color. The value for a characteristic that is a font may be, for example, an identification of a font type. The value for a characteristic that is a logo may be, for example, without limitation, a graphic, an imported file that includes the graphic, or some other type of logo representation.

Background color 3012 is one example of a characteristic that can be modified using characteristic modifier 3002 by changing its value via value selector 3014. Preview section 3004 provides a preview of the appearance of frontend user interface 112 (e.g., frontend user interface 2300 in FIGS. 23, 25, 27, and/or 29) based on the values for characteristics selected in characteristic modifier 3002.

Characteristic modifier 3002 may be scrollable. In one or more embodiments, the user may use look and feel navigator 3006, common elements navigator 3008, and module options navigator 3010 to navigate to the different corresponding groupings of characteristics within characteristic modifier 3002.

In one or more embodiments, theme tool 3000 includes save control 3016 and publish control 3018. Save control 3016 allows the user to save any changes without those changes being officially implemented in frontend user interface 112. Publish control 3018 allows the user to both save and publish any changes such that those changes are implemented in substantially real-time in frontend user interface 112.

Theme tool 3000 allows the user (e.g., agent of financial institution 102) to customize the appearance of frontend user interface 112 such that the appearance corresponds with a branding of financial institution. Further, financial institution 102 may use theme tool 3000 to customize the appearance of frontend user interface 112 whenever financial institution 102 undergoes a rebranding.

The illustrations of backend user interface 200 in FIGS. 2-22, 24, 26, 28, and 30 and frontend user interface 2300 in FIGS. 23, 25, 27, and 29 are not meant to imply any physical or architectural limitations to the manner in which these user interfaces may be implemented. In one or more embodiments, FIG. 31 is a flowchart of a process for monitoring a set of applications for a set of financial products provided by a financial institution in accordance with one or more embodiments. Process 3100 may be implemented using, for example, application system 100 in FIG. 1. In one or more embodiments, process 3100 may be implemented using management platform 110 of application system 100 in FIG. 1.

Step 3102 includes displaying a set of applications via a management platform on a display system, wherein each application of the set of applications is associated with application data stored in an application database. The management platform, which may be, for example, management platform 110 in FIG. 1, may display the set of applications using a backend user interface (e.g., backend user interface 114 in FIG. 1), which may be also referred to as a management interface. The application database may be, for example, database 111 in FIG. 1.

In one or more embodiments, the set of applications is displayed via the backend user interface on a display system that is owned, operated by, and/or otherwise in use by a financial institution such as financial institution 102 in FIG. 1. In one embodiment, this display system (e.g., the screen of a mobile device, laptop, desktop, tablet, etc.) may be located remotely (with respect to the application database, which may be owned, operated by, and/or otherwise in use by an entity such as entity 103 in FIG. 1. In other embodiments, the display system may be located locally with respect to the application database. The management platform is in communication with the application database and capable of retrieving the application data from the application database.

Step 3104 includes receiving user input identifying a selected application from the set of applications. The user input may be entered by, for example, an agent of the financial institution. The user input may identify the selected application by, for example, without limitation, selecting an application record (e.g., application record 224 in FIG. 2) displayed in the backend user interface.

Step 3106 includes determining a current status of an application process corresponding to the selected application using the application data associated with the selected application. The current status may be determined based on, for example, whether the application is in progress, whether the application has completed a qualification process, whether a decision has been made regarding the application (e.g., approval/denial), whether the application has been processed post-decision, and/or other information. In one or more embodiments, the current status is determined in substantially real-time such that any "live" updates to the application data that may be made by an applicant of the financial institution or an agent assisting the applicant are reflected in the current status in substantially real-time.

Step 3108 includes displaying, via the management platform on the display system, an application timeline comprising a plurality of phases in the application process, wherein the application timeline indicates a current phase of the plurality of phases in the application process based on the current status. In one or more embodiments, the application timeline may be displayed within tracking information of an application section of the backend user interface (e.g., process tracker 300 of application section 304 of backend user interface 200 in FIG. 2). The plurality of phases of the application process may include, for example, a workflow phase, a qualify phase, a decision phase, and a processing phase. The current phase may be the phase of the application process that is currently in progress. In one or more embodiments, the application process is a sequential process such that only one phase of the application process may be "in progress" at a time.

The application timeline may be displayed with a plurality of graphical indicators for the plurality of phases in the application process. The current phase may be distinguished from non-current phases of the plurality of phases using, for example, an in-progress indicator. The in-progress indicator may be a graphical indicator that distinguishes the current phase using a certain color, text, highlighting, a certain pattern, a symbol, a graphical icon, an animation, or some other type of visual indication.

In one or more embodiments, the plurality of graphical indicators includes a completed indicator for any phase of the plurality of phases that has been completed. The completed indicator may be a graphical indicator that distinguishes the completed phase from not completed phases using a certain color, text, highlighting, a certain pattern, a symbol, a graphical icon, an animation, or some other type of visual indication.

In one or more embodiments, the plurality of graphical indicators includes a remaining indicator for any phase of the plurality of phases that has yet to be initiated or, in other words, remains to be entered. The remaining indicator may be a graphical indicator that distinguishes the phase that has yet to be initiated or entered from a completed or in-progress phase using a certain color, text, highlighting, a certain pattern, a symbol, a graphical icon, an animation, or some other type of visual indication.

Step 3110 includes displaying, via the management platform on the display system, a subphase progression comprising a plurality of subphases within the current phase, wherein the subphase progression indicates a current subphase of the plurality of subphases based on the current status. A phase in the application process may include one or more subphases. In one or more embodiments, the workflow phase, the qualify phase, and the processing phase include multiple subphases, while the decision phase includes a single subphase. The current subphase may be the subphase of the current phase that is currently in progress. In one or more embodiments, the subphases of a phase form a sequential process such that only one subphase of the phase may be "in progress" at a time.

In one or more embodiments, the workflow phase may include at least three subphases selected from a group consisting of an agreements subphase, an account subphase, a products subphase, an applicant's subphase, a review subphase, a funding subphase, an authentication subphase, and a confirmation subphase. In one or more embodiments, the qualify phase includes an identity verification subphase, an OFAC subphase, a qualifile subphase, and/or a credit reports subphase. In one or more embodiments, the processing phase includes a funding subphase, a post to core subphase, and/or a documents subphase.

The subphase progression may be displayed with a plurality of graphical indicators for the plurality of subphases. The current subphase may be distinguished from non-current subphases of the plurality of phases using, for example, an in-progress indicator. In one or more embodiments, a completed indicator may be used to distinguish a subphase that has been completed. In one or more embodiments, a remaining indicator may be used to distinguish a subphase that has yet to be initiated or, in other words, remains to be entered. The in-progress indicator, completed indicator, and remaining indicator used for the subphases may be the same types of indicators as those used for the phases or may be different. As discussed above, the in-progress indicator, the completed indicator, and the remaining indicator may each provide distinction between the subphases using a certain color, text, highlighting, a certain pattern, a symbol, a graphical icon, an animation, or some other type of visual indication.

In one or more embodiments, process 3100 optionally includes step 3112. Step 3112 may include displaying, via the management platform on the display system, a current status section based on the current status. The current status section (e.g., current status section 302 in FIGS. 3 and 6-9) may include information about at least one of the current phase or the current subphase within the current phase. The current status section may identify a most recent action of the applicant of the frontend user interface who is progressing through the application process for the selected application and whether the applicant has completed the selected application. The current status section may include one or more controls that allow the user of the backend user interface to perform various actions based on the current status.

Further, in some embodiments, process 3100 may further include changing an in-progress indicator displayed via the management platform on the display system for the current phase to a completed indicator in substantially real-time in response to an action that completes the current phase in the application process. The action may be performed by, for example, the applicant (e.g., user of the frontend user interface). The applicant may be the customer, potential customer, or an agent of the financial institution.

In this manner, process 3100 improves the ability of the management platform to provide an accurate snapshot of the current status of any selected application in substantially real-time. Providing the application timeline and subphase progression for the current phase of the application timeline (or for any selected phase of the application timeline), along with the current status section in various embodiments, allows the management platform to provide different pieces of information in a simple and visually concise way without requiring multiple windows or pop-up window and without requiring the user to extensively navigate through the management platform to discern all of the information about the current status for the selected application.

FIG. 32 is a flowchart of a process for monitoring an application of a user for a set of financial products provided by a credit union in accordance with one or more embodiments. Process 3200 may be implemented using, for example, application system 100 in FIG. 1. In one or more embodiments, process 3200 may be implemented using management platform 110 of application system 100 in FIG. 1. The credit union may be, for example, credit union 104 in FIG. 1.

Step 3202 includes receiving, via a management platform displayed on a display system, an input selecting the application, wherein the application is associated with application data stored in an application database. The management platform, which may be, for example, management platform 110 in FIG. 1, may receive the input via a backend user interface (e.g., backend user interface 114 in FIG. 1), which may be also referred to as a management interface. The application database may be, for example, database 111 in FIG. 1 and may be either remote or local to the display system.

In one or more embodiments, the input may be received via the backend user interface on a display system that is owned, operated by, and/or otherwise in use by a credit union such as credit union 104 in FIG. 1. This display system (e.g., the screen of a mobile device, laptop, desktop, tablet, etc.) may be located remotely with respect to, for example, application system 100, which may be owned, operated by, and/or otherwise in use by an entity such as entity 103 in FIG. 1. The management platform is in communication with the application database and capable of retrieving the application data from the application database.

Step 3204 includes determining a current status of an application process corresponding to the application using the application data associated with the selected application. The current status may be determined based on, for example, whether the application is in progress, whether the application has completed a qualification process, whether a decision has been regarding the application (e.g., approval/denial), whether the application has been processed post-decision, and/or other information. In one or more embodiments, the current status is determined in substantially real-time such that any "live" updates to the application data that may be made by an applicant of the credit union or an agent assisting the applicant are reflected in the current status in substantially real-time.

Step 3206 includes displaying, via the management platform, an application timeline comprising a plurality of phases in the application process. The plurality of phases includes a workflow phase and at least one of a qualify phase, a decision phase, or a processing phase. The application timeline may indicate, based on the current status, that the workflow phase is a current phase in the application process using a first in-progress indicator.

Step 3208 includes displaying, via the management platform on the display system, a subphase progression comprising a plurality of subphases within the workflow phase. This subphase progression may be referred to as, for example, a workflow subphase progression (e.g., workflow subphase progression 614 in FIG. 6). The plurality of subphases may include at least three selected from a group consisting of an agreements subphase, an account subphase, a products subphase, an applicant's subphase, a review subphase, a funding subphase, an authentication subphase, and a confirmation subphase. The subphase progression indicates, based on the current status, a current subphase of the plurality of subphases using a second in-progress indicator. The second in-progression indicator may be the same type of indicator as the first in-progress indicator (e.g., using the same color, same text, same highlighting, same pattern, same symbol, same graphical icon, same animation, etc.) or may be different.

In one or more embodiments, process 3200 optionally includes step 3210. Step 3210 may include displaying, via the management platform on the display system, a current status section based on the current status. The current status section may identify, for example, a most recent action of the applicant of the frontend user interface and whether the applicant has completed the selected application. The current station may include, for example, a graphical control that, when selected, opens a corresponding workflow for the application of the applicant. For example, selecting the graphical control may open a new window or new web browser that displays the frontend user interface with the application data for the application populated.

FIG. 33 is a flowchart of a process for building an online application platform for a client financial institution in accordance with one or more embodiments. Process 3300 may be implemented using, for example, application system 100 in FIG. 1. In one or more embodiments, process 3300 may be implemented using management platform 110 of application system 100 in FIG. 1. The online application platform may be, for example, application platform 108 in FIG. 1. Process 3300 may be used to customize a default configuration of the online application platform.

Step 3302 includes providing a default configuration for the online application platform. The default configuration may include a default application framework and a default theme. The default application framework defines a default set of account types and a default set of financial products for an application. The default theme defines an appearance of the online application platform. The default configuration for the online application platform is provided to a client financial institution (e.g., financial institution 102 in FIG. 1).

Step 3304 includes providing a management interface accessible by the client financial institution, the management interface including an application framework tool for customizing the default application framework and a theme tool for customizing the default theme. The management interface may be, for example, backend user interface 114 in FIG. 1 and/or backend user interface 200 in FIGS. 2-22, 24, 26, 28, and 30. The application framework tool may be, for example, framework tool 118 in FIG. 1 and/or framework tool 1707 in FIGS. 17-21. The theme tool may be, for example, theme tool 122 in FIG. 1 and/or theme tool 3000 in FIG. 30.

Step 3306 includes receiving, by the application framework tool, a first set of inputs that selects a set of financial products from a list of predefined financial products, wherein the set of financial products is to be offered by the client financial institution via the online application platform. The first set of inputs may be entered by, for example, an agent (e.g., administrator) of the financial institution. The list of predefined financial products may include, for example, without limitation, at least one type of savings account, at least one type of checking account, at least one type of CD, at least one type of money market account, at least one type of club account, or a combination thereof. In one or more embodiments, the list of predefined financial products includes at least three selected from a group consisting of a checking account, a savings account, a money market account, a certificate of deposit, a loan, and a trust. The default set of financial products included in the default application framework may include one, some, or all of the financial products in the list of predefined financial products.

In one or more embodiments, the first set of inputs includes an input that deselects a financial product in the default set of financial products. This deselection may not remove the financial product from the list of predefined financial products but may deactivate the financial product (e.g., prevent the financial product from being offered via the online application platform).

In one or more embodiments, the first set of inputs includes an input that selects a financial product from the list of predefined financial products that is not already present in the default set of financial products. This input may activate the financial product (e.g., making the financial product available via the online application platform).

In one or more embodiments, the first set of inputs includes an input or group of inputs that adds a new financial product to the list of predefined financial products, as well as corresponding details for the new financial product. The new financial product may be activated or deactivated.

Step 3308 includes converting, by the application framework tool, the default application framework into a customized application framework, the converting comprising modifying the online application platform to offer the set of financial products selected via the first set of inputs. This conversion changes the default set of financial products to the set of financial products to thereby customize the offerings of the financial institution.

In one or more embodiments, step 3308 may further include customizing based on one or more other sets of inputs received in step 3306 or in another optional step(s) before step 3308. For example, in response to a set of inputs received that select a set of account types form a list of predefined account types (the set of account types being different from the default set of account types) for the application framework, the conversion may include modifying the online application platform to make the set of account types available. In one or more embodiments, each account type may correspond to a different type of membership (e.g., a personal account/membership, a teen account/membership, a youth account/membership, a business account/membership, etc.) for the client financial institution.

In one or more embodiments, in response to receiving a set of inputs that add a set of document types to the application framework, the conversion may include modifying the online application platform to at least one of generate or an enable an upload of the set of document types. Adding a document type may include, for example, uploading a PDF template of a document type that will serve as the basis for a financial disclosure document to be generated during an application process. The PDF template may be uploaded in a format (e.g., with fields names and/or coded according to a set of rules, requirements, and/or other criteria) that allows the management platform to correctly populate fields in the generated financial disclosure document with application data retrieved from the application database.

In one or more embodiments, in response to receiving a set of inputs that select a set of product groups from a list of predefined product groups that is different from a default set of product groups included in the default application framework, the conversion may include modifying the online application platform to allow only financial products corresponding to the set of product groups to be offered.

In one or more embodiments, in response to receiving a set of inputs that select a set of third-party services from a list of predefined third-party services that is different from a default set of third party services included in the default application framework, the conversion includes modifying the online application platform to allow communication between the online application platform and the set of third-party services. One example of a third party service may be, for example, a credit reporting agency.

Step 3310 includes receiving, by the theme tool, a second set of inputs from the financial institution, each input of the second set of inputs selecting a value for a respective characteristic of the appearance of the online application platform, the value corresponding with a branding of the client financial institution. A characteristic may be, for example, a color, a font, a logo, or some other appearance-based characteristic. The theme tool may include, for example, a characteristic modifier for making changes to a plurality of characteristics and a preview section that previews the appearance of the online application platform (e.g., frontend user interface 112 of application platform 108) based on the changes.

In one or more embodiments, the second set of inputs includes at least one of an input selecting a value for a primary color of the appearance of the online application platform, an input selecting a value for a secondary color of the appearance of the online application platform, an input selecting a value for an accent color of the appearance of the online application platform, or an input selecting a value for an alternate color of the appearance of the online application platform. In one or more embodiments, the second set of inputs includes at least one of an input selecting a value for a background color of the appearance of the online application platform, an input selecting a value for a body text color of the appearance of the online application platform, an input selecting a value for a success color for the online application platform, or an input selecting a value for an error color for the online application platform.

In one or more embodiments, the second set of inputs includes an input that selects a value for the characteristic of a logo for the online application platform, where the value comprises an image for the logo. For example, an image file may be uploaded for the logo.

Step 3312 includes converting, by the theme tool, the default theme into a customized theme, the converting comprising modifying the appearance of the online application platform to reflect the value for the characteristic. In one or more embodiments, the customized theme may represent a branding of the client financial institution more closely than the default theme.

Step 3314 includes providing, via a network, a customized configuration of the online application platform to one or more applicants of the client financial institution, the customized configuration comprising the customized application framework and the customized theme. The network may include, for example, the Internet.

In this manner, process 3300 enables a fast, easy, and efficient way of building and deploying a customized online application platform. Process 3300 provides a customizable configuration of an online application platform to a financial institution, where the customizable configuration already includes workflows and features relevant to the financial institution-thus eliminating the need for the financial institution to build an online application platform from scratch. For example, using the framework tool and the theme tool may help reduce the computing resources used in the customization of the online application platform. Further, by providing a management interface (backend user interface) that includes both the framework tool and the theme tool, on-demand changes may be made to the online application platform. In other embodiments, a similar process may be used to convert a current configuration of the online application platform into a new configuration of the online application platform.

In one or more embodiments, the application system 100 and process 3300 improves the technical field of online application systems by improving the customization and processing of applications for membership and applications for financial products.

FIG. 34 is a flowchart of a process for customizing an application platform for a client financial institution in accordance with one or more embodiments. Process 3400 may be implemented using, for example, application system 100 in FIG. 1. In one or more embodiments, process 3400 may be implemented using management platform 110 of application system 100 in FIG. 1.

Step 3402 includes providing a default configuration for the online application platform, the default configuration comprising a default application framework and a default theme. The default application framework defines a default set of account types and a default set of financial products for an application.

Step 3404 includes providing a management interface accessible by the client financial institution, the management interface including a framework tool for customizing the default application framework.

Step 3406 includes receiving, by the framework tool, a first set of inputs that selects a set of account types from a list of predefined account types, wherein each of the set of account types corresponds to a different type of membership for the client financial institution.

Step 3408 includes receiving, by the framework tool, a second set of inputs that selects a set of financial products from a list of predefined financial products, wherein the set of financial products is to be offered by the client financial institution via the online application platform. In one or more embodiments, the list of predefined financial products may be based on the set of product groups.

Step 3410 includes receiving, by the framework tool, a third set of inputs that selects a set of third-party services from a list of predefined third-party services.

Step 3412 includes converting, by the framework tool, the default application framework into a customized application framework, the converting comprising modifying the online application platform based on the first set of inputs, the second set of inputs, and the third set of inputs.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 35:
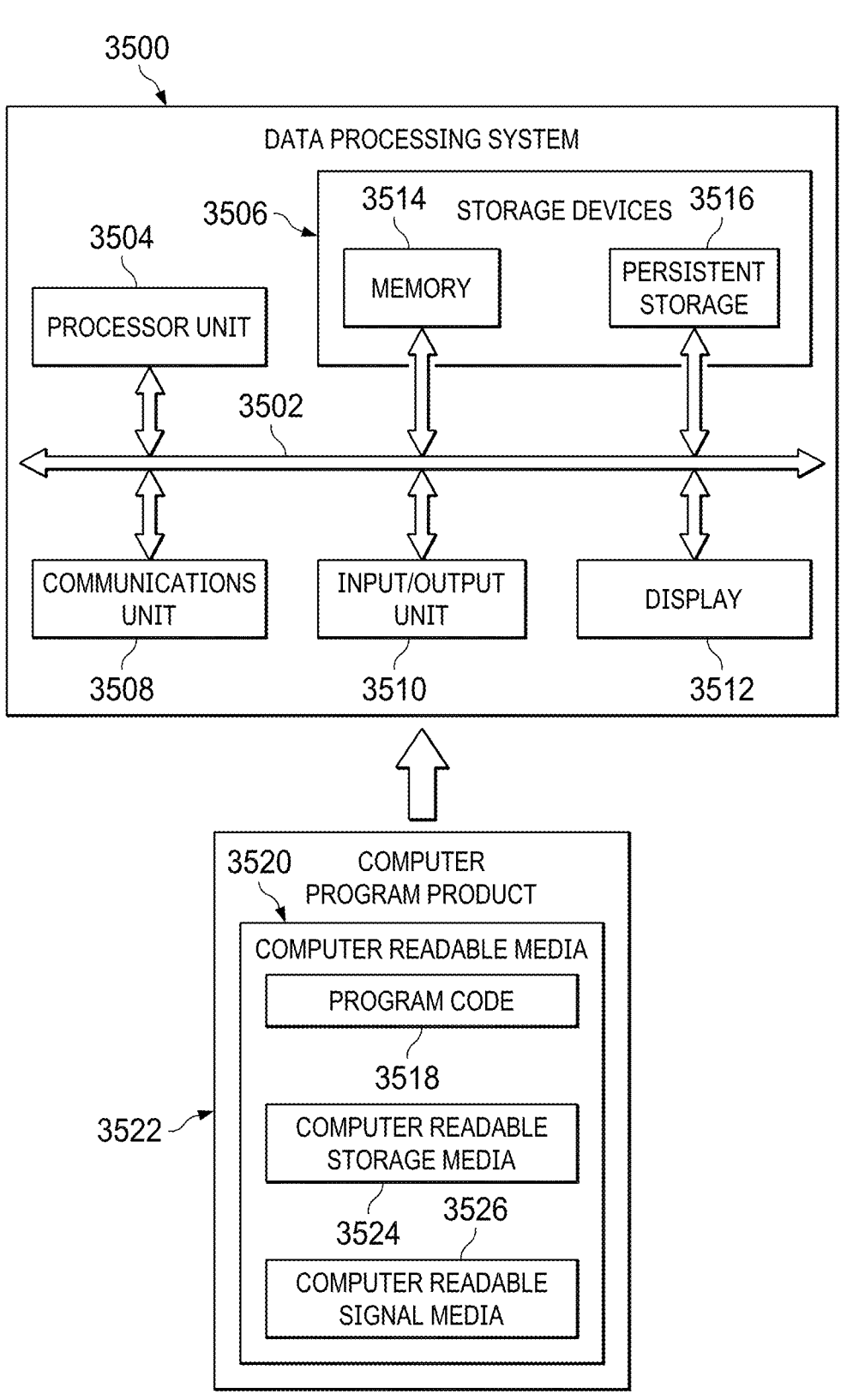
FIG. 35 is an illustration of a data processing system in the form of a block diagram is depicted in accordance with an illustrative embodiment.

Turning now to FIG. 35, an illustration of a data processing system in the form of a block diagram is depicted in accordance with one or more embodiments. Data processing system 3500 may be used to implement at least a portion of computing system 106 in FIG. 1. As depicted, data processing system 3500 includes communications framework 3502, which provides communications between processor unit 3504, storage devices 3506, communications unit 3508, input/output unit 3510, and display 3512. In some cases, communications framework 3502 may be implemented as a bus system.

Processor unit 3504 is configured to execute instructions for software to perform a number of operations. Processor unit 3504 may comprise a number of processors, a multiprocessor core, and/or some other type of processor, depending on the implementation. In some cases, processor unit 3504 may take the form of a hardware unit, such as a circuit system, an application specific integrated circuit (ASIC), a programmable logic device, or some other suitable type of hardware unit.

Instructions for the operating system, applications, and/or programs run by processor unit 3504 may be located in storage devices 3506. Storage devices 3506 may be in communication with processor unit 3504 through communications framework 3502. As used herein, a storage device, also referred to as a computer readable storage device, is any piece of hardware capable of storing information on a temporary and/or permanent basis. This information may include, but is not limited to, data, program code, and/or other information.

Memory 3514 and persistent storage 3516 are examples of storage devices 3506. Memory 3514 may take the form of, for example, a random access memory or some type of volatile or non-volatile storage device. Persistent storage 3516 may comprise any number of components or devices. For example, persistent storage 3516 may comprise a hard drive, a flash memory, a rewritable optical disk, a rewritable magnetic tape, or some combination of the above. The media used by persistent storage 3516 may or may not be removable.

Communications unit 3508 allows data processing system 3500 to communicate with other data processing systems and/or devices. Communications unit 3508 may provide communications using physical and/or wireless communications links.

Input/output unit 3510 allows input to be received from and output to be sent to other devices connected to data processing system 3500. For example, input/output unit 3510 may allow user input to be received through a keyboard, a mouse, and/or some other type of input device. As another example, input/output unit 3510 may allow output to be sent to a printer connected to data processing system 3500.

Display 3512 is configured to display information to a user. Display 3512 may comprise, for example, without limitation, a monitor, a touch screen, a laser display, a holographic display, a virtual display device, and/or some other type of display device.

In this illustrative example, the processes of the different illustrative embodiments may be performed by processor unit 3504 using computer-implemented instructions. These instructions may be referred to as program code, computer usable program code, or computer readable program code and may be read and executed by one or more processors in processor unit 3504.

In these examples, program code 3518 is located in a functional form on computer readable media 3520, which is selectively removable, and may be loaded onto or transferred to data processing system 3500 for execution by processor unit 3504. Program code 3518 and computer readable media 3520 together form computer program product 3522. In this illustrative example, computer readable media 3520 may be computer readable storage media 3524 or computer readable signal media 3526.

Computer readable storage media 3524 is a physical or tangible storage device used to store program code 3518 rather than a medium that propagates or transmits program code 3518. Computer readable storage media 3524 may be, for example, without limitation, an optical or magnetic disk or a persistent storage device that is connected to data processing system 3500.

Alternatively, program code 3518 may be transferred to data processing system 3500 using computer readable signal media 3526. Computer readable signal media 3526 may be, for example, a propagated data signal containing program code 3518. This data signal may be an electromagnetic signal, an optical signal, and/or some other type of signal that can be transmitted over physical and/or wireless communications links.

The illustration of data processing system 3500 in FIG. 35 is not meant to provide architectural limitations to the manner in which the illustrative embodiments may be implemented. The different illustrative embodiments may be implemented in a data processing system that includes components in addition to or in place of those illustrated for data processing system 3500. Further, components shown in FIG. 35 may be varied from the illustrative examples shown.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different embodiments has been presented for purposes of illustration and description and is not intended to be exhaustive or limited to the embodiments in the form disclosed. Modifications and variations will be apparent to those of ordinary skill in the art. Further, different embodiments may include different features as compared to other embodiments. The one or more embodiments described are chosen and described in order to best explain the principles of the various embodiments and practical application of these embodiments, and to enable others of ordinary skill in the art to understand the various modifications to the various embodiments that may be suited to the particular use(s) contemplated.

What is claimed is:

1. A method for building an online application platform for a client institution, the method comprising:

providing a default configuration for the online application platform stored in a computer memory, the default configuration comprising a default application framework and a default theme, the default application framework defining a default set of account types, a default set of products for an application, and default sets of application processes associated with each of the default set of account types and the default set of products; and the default theme defining an appearance of the online application platform;

providing a management platform executing on one or more processors and accessible via a backend user interface by the client institution, the management platform including a framework tool for customizing the default application framework and a theme tool for customizing the default theme;

receiving, by the framework tool via the backend user interface associated with the management platform, a first set of inputs associated with a selection of a set of products from a list of predefined products and a set of application processes associated with the selected set of products, wherein the selected set of products and the selected set of application processes associated with the selected set of products are to be accessible via the online application platform;

converting, by the framework tool executing on the one or more processors, the default application framework into a customized application framework, the converting comprising automatically modifying computer code associated with the online application platform stored in the computer memory such that the selected set of products and the selected set of application processes associated with the selected set of products are accessible via the online application platform;

receiving, by the theme tool via the backend user interface associated with the management platform, a second set of inputs, each input of the second set of inputs associated with a selection of a value for a respective characteristic of the appearance of the online application platform;

converting, by the theme tool executing on the one or more processors, the default theme into a customized theme, the converting comprising automatically modifying visual display code associated with the appearance of the online application platform stored in the computer memory to reflect the selected values for the respective characteristics; and providing, from the backend user interface to a frontend user interface located remotely from the backend user interface via a network, a customized configuration of the online application platform comprising the customized application framework and the customized theme by transmitting the modified computer code and the modified visual display code over the network to a remote computing device.

2. The method of claim 1, wherein the first set of inputs includes an input associated with a deselection of a product in the default set of products and a deselection of an application process in the default set of application processes associated with the deselected product.

3. The method of claim 1, wherein the first set of inputs includes an input associated with a selection of a product from the list of predefined products that is not already present in the default set of products and a selection of an application process associated with the selected product that is not already present in the default set of application processes.

4. The method of claim 1, further comprising:

receiving, by the framework tool via the backend user interface associated with the management platform, a third set of inputs associated with a selection of a set of account types from a list of predefined account types and a selection of a set of application processes associated with the selected set of account types, wherein each of the set of account types corresponds to a different type of membership for the client institution, wherein converting, by the framework tool, the default framework into the customized framework, further comprises modifying the online platform to make the selected set of account types and the selected set of application processes associated with the selected set of account types available to users via the online application platform.

5. The method of claim 1, further comprising:

receiving, by the framework tool via the backend user interface associated with the management platform, a third set of inputs associated with an addition of a set of document types; and wherein converting, by the framework tool, the default framework into the customized framework, further comprises modifying the online platform to at least one of generate or enable an upload of documents associated with the set of document types by the user via the frontend user interface.

6. The method of claim 1, further comprising:

receiving, by the framework tool via the backend user interface associated with the management platform, a third set of inputs associated with a selection of a set of product groups from a list of predefined product groups that is different from a default set of product groups included in the default framework; and wherein converting, by the framework tool, the default framework into the customized framework, further comprises modifying the online platform to allow only products corresponding to the set of product groups, and only application processes associated with those products, to be accessible via the online application platform.

7. The method of claim 1, further comprising:

receiving, by the framework tool via the backend user interface associated with the management platform, a third set of inputs associated with a selection of a set of third-party services from a list of predefined third-party services that is different from a default set of third party services included in the default application framework; and wherein converting, by the framework tool, the default framework into the customized framework, further comprises modifying the online application platform to allow communication between the online application platform and the set of third-party services.

8. The method of claim 1, wherein the second set of inputs includes at least one of:

a first input, wherein the value is selected for the respective characteristic of a primary color of the appearance of the online application platform;

a second input, wherein the value is selected for the respective characteristic of a secondary color of the appearance of the online application platform;

a third input, wherein the value is selected for the respective characteristic of an accent color of the appearance of the online application platform; or a fourth input, wherein the value is selected for the respective characteristic of an alternate color of the appearance of the online application platform.

9. The method of claim 1, wherein the second set of inputs includes at least one of:

a first input, wherein the value is selected for the respective characteristic of a background color of the appearance of the online application platform;

a second input, wherein the value is selected for the respective characteristic of a body text color of the appearance of the online application platform;

a third input, wherein the value is selected for the respective characteristic of a success color for the online application platform; or a fourth input, wherein the value is selected for the respective characteristic of an error color for the online application platform.

10. The method of claim 1, wherein the second set of inputs includes an input in which the value is selected for the respective characteristic of a logo for the online application platform, wherein the value comprises an image for the logo.

11. The method of claim 1, wherein the theme tool comprises a characteristic modifier for making changes to a plurality of characteristics that includes the respective characteristic and a preview section that previews the appearance of the online application platform based on the changes.

12. A system for building an online application platform for a client institution, the system comprising:

a memory containing a machine-readable medium containing instructions; and a processor coupled to the memory, the processor configured to execute the instructions to cause the processor to:

provide a default configuration for an online application platform, the default configuration comprising a default application framework and a default theme, the default application framework defining a default set of account types, a default set of products for an application, and default sets of application processes associated with each of the default set of account types and the default set of products; and the default theme defining an appearance of the online application platform;

provide a management platform accessible via a backend user interface by the client institution, the management platform including a framework tool for customizing the default application framework and a theme tool for customizing the default theme;

receive, by the framework tool via the backend user interface associated with the management platform, a first set of inputs associated with a selection of a set of products from a list of predefined products and a set of application processes associated with the selected set of products, wherein the selected set of products and the selected set of application processes associated with the selected set of products are to be accessible via the online application platform;

convert, by the framework tool, the default application framework into a customized application framework, the converting comprising modifying the online application platform such that the selected set of products and the selected set of application processes associated with the selected set of products are accessible via the online application platform;

receive, by the theme tool via the backend user interface associated with the management platform, a second set of inputs, each input of the second set of inputs associated with a selection of a value for a respective characteristic of the appearance of the online application platform;

convert, by the theme tool, the default theme into a customized theme, the converting comprising automatically modifying visual display code associated with the appearance of the online application platform to reflect the selected values for the respective characteristics; and provide, from the backend user interface to a frontend user interface located remotely from the backend user interface via a network, a customized configuration of the online application platform comprising the customized application framework and the customized theme.

13. The system of claim 12, wherein the first set of inputs includes an input associated with a deselection of a product in the default set of products and a deselection of an application process in the default set of application processes associated with the deselected product.

14. The system of claim 12, wherein the first set of inputs includes an input associated with a selection of a product from the list of predefined products that is not already present in the default set of products and a selection of an application process associated with the selected product that is not already present in the default set of application processes.

15. The system of claim 12, wherein the processor is further configured to execute the instructions to cause the processor to:

receive, by the framework tool via the backend user interface associated with the management platform, a third set of inputs associated with a selection of a set of account types from a list of predefined account types and a selection of a set of application processes associated with the selected set of account types, wherein each of the set of account types corresponds to a different type of membership for the client financial institution; and wherein the conversion, by the framework tool, of the default application framework into the customized application framework further comprises modifying the online application platform to make the selected set of account types and the selected set of application processes associated with the selected set of account types accessible via the online application platform.

16. The system of claim 13, wherein the processor is further configured to execute the instructions to cause the processor to:

receive, by the framework tool via the backend user interface associated with the management platform, a third set of inputs associated with an addition of a set of document types; and wherein the conversion, by the framework tool, of the default application framework into the customized application framework further comprises modifying the online application platform to at least one of generate or enable an upload of documents associated with the set of document types by the applicants via the frontend user interface.

17. The system of claim 12, wherein the processor is further configured to execute the instructions to cause the processor to:

receive, by the framework tool via the backend user interface associated with the management platform, a third set of inputs associated with a selection of a set of third-party services, from a list of predefined third-party services, that is different from a default set of third party services included in the default application framework; and convert, by the framework tool, the default application framework into the customized application framework, by modifying the online application platform to allow communication between online application platform and the set of third-party services.

* * * * *